United States Patent
Sandou

(10) Patent No.: US 9,556,770 B2
(45) Date of Patent: Jan. 31, 2017

(54) ENGINE DEVICE

(71) Applicant: YANMAR CO., LTD., Osaka (JP)

(72) Inventor: Yoshiyuki Sandou, Osaka (JP)

(73) Assignee: YANMAR CO., LTD., Osaka-shi (JP)

( * ) Notice: Subject to any disclaimer, the term of this patent is extended or adjusted under 35 U.S.C. 154(b) by 0 days.

(21) Appl. No.: 14/779,626

(22) PCT Filed: Mar. 26, 2014

(86) PCT No.: PCT/JP2014/058431
§ 371 (c)(1),
(2) Date: Sep. 24, 2015

(87) PCT Pub. No.: WO2014/157286
PCT Pub. Date: Oct. 2, 2014

(65) Prior Publication Data
US 2016/0053645 A1 Feb. 25, 2016

(30) Foreign Application Priority Data

Mar. 28, 2013 (JP) .................................. 2013-069568
Mar. 28, 2013 (JP) .................................. 2013-069569
(Continued)

(51) Int. Cl.
*F01N 3/00* (2006.01)
*F01N 3/035* (2006.01)
(Continued)

(52) U.S. Cl.
CPC ............. *F01N 3/035* (2013.01); *F01N 3/2066* (2013.01); *F01N 13/009* (2014.06);
(Continued)

(58) Field of Classification Search
USPC .......... 60/274, 286, 289, 293, 295, 301, 303
See application file for complete search history.

(56) References Cited

U.S. PATENT DOCUMENTS 5,606,857 A 3/1997 Harada
6,192,677 B1 * 2/2001 Tost .................... B01D 53/9431
60/286
(Continued)

FOREIGN PATENT DOCUMENTS

EP 0696677 A1 2/1996
JP 6-212967 8/1994
(Continued)

OTHER PUBLICATIONS

JPS54-53121 = Microfilm of the specification and drawings annexed to the request of Japanese Utility Model Application No. 127916/1977 (Laid-open No. 53121/1979) (Daihatsu Motor Co., Ltd.) Apr. 12, 1979 (Apr. 12, 1979), specification, p. 2, line 14 to p. 4, line 9; Fig. 1 (Family: none).
(Continued)

*Primary Examiner* — Binh Q Tran
(74) *Attorney, Agent, or Firm* — Norris McLaughlin & Marcus, P.A.

(57) ABSTRACT

An engine device is provided with an urea mixing pipe which injects urea water into exhaust gas of an engine, and an exhaust gas purification case which removes nitrogen oxide in the exhaust gas of the engine, and is structured such that an exhaust gas inlet pipe of the exhaust gas purification case is connected to an outlet of the urea mixing pipe via a flange body. Exhaust gas outlet side end portions of an outer pipe and an inner pipe of the urea mixing pipe having a double-pipe structure are connected to exhaust gas inlet side end portions of an outer pipe and an inner pipe of the exhaust gas inlet pipe having a double-pipe structure. Fitting small-diameter portions are formed in an end portion of the inner pipe of the urea mixing pipe, and the fitting small-diameter portions are inward insert to an inner portion of the inner pipe of the exhaust gas inlet pipe.

9 Claims, 47 Drawing Sheets

(30) Foreign Application Priority Data

Mar. 28, 2013 (JP) ................................. 2013-069570
Mar. 28, 2013 (JP) ................................. 2013-069571

(51) Int. Cl.
| | | |
|---|---|---|
| *F01N 3/20* | (2006.01) | |
| *F01N 13/18* | (2010.01) | |
| *F01N 13/00* | (2010.01) | |
| *F16L 39/00* | (2006.01) | |

(52) U.S. Cl.
CPC ..... *F01N 13/0097* (2014.06); *F01N 13/1838* (2013.01); *F01N 2340/04* (2013.01); *F01N 2590/08* (2013.01); *F01N 2610/02* (2013.01); *F01N 2610/1453* (2013.01); *F16L 39/005* (2013.01); *Y02T 10/24* (2013.01)

(56) References Cited

U.S. PATENT DOCUMENTS

| | | | | |
|---|---|---|---|---|
| 7,842,266 | B2* | 11/2010 | Takahashi | B01D 53/9409 422/172 |
| 8,033,714 | B2* | 10/2011 | Nishioka | B01D 53/8631 137/888 |
| 8,225,602 | B2* | 7/2012 | Cavanagh | F01N 3/2066 60/295 |
| 8,407,990 | B2* | 4/2013 | Bruck | B01B 1/005 60/286 |
| 8,938,954 | B2* | 1/2015 | De Rudder | F01N 3/00 60/286 |
| 2009/0084088 | A1 | 4/2009 | Ichikawa et al. | |

FOREIGN PATENT DOCUMENTS

| | | |
|---|---|---|
| JP | 2000-051930 | 2/2000 |
| JP | 2012-127311 | 9/2000 |
| JP | 2000-282858 A | 10/2000 |
| JP | 2001-132872 | 5/2001 |
| JP | 2005-226528 | 8/2005 |
| JP | 2006-322343 | 11/2006 |
| JP | 2007-198225 A | 8/2007 |
| JP | 2009-085050 | 4/2009 |
| JP | 2009-114910 | 5/2009 |
| JP | 2012-002085 | 1/2012 |
| JP | 2012-127311 | 7/2012 |

OTHER PUBLICATIONS

JPS52-102511 = Microfilm of the specification and drawings annexed to the request of Japanese Utility Model Application No. 9235/1976 (Laid-open No. 102511/1977) (Suzuki Motor Co., Ltd.) Aug. 4, 1977 (Aug. 4, 1977), specification, p. 2, line 15 to p. 5, line 3; Fig. 1 (Family: none).

\* cited by examiner

ENGINE DEVICE

TECHNICAL FIELD

The present invention relates to an engine device such as a diesel engine which is mounted to an agricultural machine (a tractor or a combine harvester) or a construction machine (a bulldozer, a hydraulic excavator or a loader), and more particularly to an engine device mounting thereon an exhaust gas purification device which removes a particulate matter (soot or particulate) included in exhaust gas or nitrogen oxide (NOx) included in the exhaust gas.

BACKGROUND OF THE INVENTION

In a working vehicle such as the tractor or a wheel loader, an opening and closing supporting point shaft is arranged in a rear portion of a hood for covering an engine, and the hood is turned around the opening and closing supporting point shaft, in order to streamline a maintenance work of the engine which is arranged in a front portion of the travel machine body. Further, there has been conventionally known a technique of purifying exhaust gas discharged from a diesel engine by arranging a case (hereinafter, refer to as DPF case) which is inward provided with a diesel particulate filter, and a case (hereinafter, refer to as SCR case) which is inward provided with an urea selective reduction type catalyst, as an exhaust gas purification device (an exhaust gas post-treatment device) in an exhaust passage of the diesel engine, and introducing the exhaust gas to the DPF case and the SCR case (refer, for example, to Patent Documents 1 to 3).

CITATION LIST

Patent Literature

Patent Document 1: Japanese Unexamined Patent Publication No. 2006-322343
Patent Document 2: Japanese Unexamined Patent Publication No. 2009-114910
Patent Document 3: Japanese Unexamined Patent Publication No. 2012-127311

SUMMARY OF THE INVENTION

In the case that an inlet of the SCR case is connected to an outlet of an urea mixing pipe via a flange body shown as the Patent Documents 1 to 3, a temperature of an inner hole surface of the flange body cannot be maintained at high temperature since a contact area of the flange body with the exhaust gas is small. In other words, in the case that the exhaust gas comes into contact with the inner hole surface of the flange body, the temperature of the exhaust gas is lowered, and a crystalline lump of urea component is formed in the inner hole surface of the flange body, and there is a problem that a transfer resistance of the exhaust gas tends to be greater.

Consequently, the present invention intends to provide an engine device to which an improvement is applied by making a study of these actual condition.

In order to achieve the object mentioned above, the invention according to a first aspect of the invention is an engine device having an urea mixing pipe which injects urea water into exhaust gas of an engine, and an exhaust gas purification case which removes nitrogen oxide in the exhaust gas of the engine, and structured such that an exhaust gas inlet pipe of the exhaust gas purification case is connected to an outlet of the urea mixing pipe via a flange body, wherein exhaust gas outlet side end portions of an outer pipe and an inner pipe of the urea mixing pipe having a double-pipe structure are connected to exhaust gas inlet side end portions of an outer pipe and an inner pipe of the exhaust gas inlet pipe having a double-pipe structure, a fitting small-diameter portion is formed in an end portion of the inner pipe of the urea mixing pipe, and the fitting small-diameter portion is inward insert to an inner portion of the inner pipe of the exhaust gas inlet pipe.

The invention according to a second aspect of the invention is the engine device described in the first aspect, wherein the outer pipe of the exhaust gas inlet pipe and the outer pipe of the urea mixing pipe are formed by a pipe having the same diameter, and the inner pipe of the exhaust gas inlet pipe and the inner pipe of the urea mixing pipe are formed by a pipe having the same diameter.

The invention according to a third aspect of the invention is the engine device described in the first aspect, wherein a pipe thickness of the inner pipe of the urea mixing pipe is formed thinner than a pipe thickness of the outer pipe of the urea mixing pipe.

The invention according to a fourth aspect of the invention is an engine device having an urea mixing pipe which injects urea water into exhaust gas of an engine, and an exhaust gas purification case which removes nitrogen oxide in the exhaust gas of the engine, and structured such that an exhaust gas inlet pipe of the exhaust gas purification case is connected to an outlet of the urea mixing pipe via a flange body, wherein exhaust gas outlet side end portions of an outer pipe and an inner pipe of the urea mixing pipe having a double-pipe structure are connected to exhaust gas inlet side end portions of an outer pipe and an inner pipe of the exhaust gas inlet pipe having a double-pipe structure, an exhaust gas inlet side end portion of the inner pipe of the exhaust gas inlet pipe is fitted to an exhaust gas outlet side end portion of the inner pipe of the urea mixing pipe, and an exhaust gas outlet side end portion of the inner pipe of the urea mixing pipe is supported to the outer pipe of the urea mixing pipe.

The invention according to a fifth aspect of the invention is the engine device described in the fourth aspect, wherein the exhaust gas outlet side end portion of the urea mixing pipe is provided with a support body which connects an outer peripheral surface of the inner pipe to an inner peripheral surface of the outer pipe of the urea mixing pipe.

The invention according to a sixth aspect of the invention is the engine device described in the fourth aspect, wherein an inner diameter of the inner pipe of the exhaust gas inlet pipe is formed larger than an outer diameter of the inner pipe of the urea mixing pipe, the outer pipe and the inner pipe of the exhaust gas inlet pipe are firmly fixed to an inlet side flange body serving as the flange body, the outer pipe of the urea mixing pipe is firmly fixed to an outlet side flange body serving as the flange body, and the inlet side flange body and the outlet side flange body are fastened.

The invention according to a seventh aspect of the invention is an engine device having an urea mixing pipe which injects urea water into exhaust gas of an engine, and an exhaust gas purification case which removes nitrogen oxide in the exhaust gas of the engine, and structured such that an exhaust gas inlet pipe of the exhaust gas purification case is connected to an outlet of the urea mixing pipe via a flange body, wherein exhaust gas outlet side end portions of an outer pipe and an inner pipe of the urea mixing pipe having a double-pipe structure are connected to exhaust gas inlet side end portions of an outer pipe and an inner pipe of the exhaust gas inlet pipe having a double-pipe structure, a ring-like pinching piece portion is formed in the exhaust gas inlet side end portion of the inner pipe of the exhaust gas inlet pipe by folding the exhaust gas inlet side end portion of the inner pipe of the exhaust gas inlet pipe toward an outer side, and a ring-like pinching piece portion is formed in the exhaust gas outlet side end portion of the inner pipe of the urea mixing pipe by folding the exhaust gas outlet side end portion of the inner pipe of the urea mixing pipe toward an outer side.

The invention according to an eighth aspect of the invention is the engine device described in the seventh aspect, wherein ring-like pinching piece portions are formed in the exhaust gas inlet side end portions of the outer pipe and the inner pipe of the exhaust gas inlet pipe by folding the exhaust gas inlet side end portions of the outer pipe and the inner pipe of the exhaust gas inlet pipe toward outer sides, and ring-like pinching piece portions are formed in the exhaust gas outlet side end portions of the outer pipe and the inner pipe of the urea mixing pipe by folding the exhaust gas outlet side end portions of the outer pipe and the inner pipe of the urea mixing pipe.

The invention according to a ninth aspect of the invention is the engine device described in the seventh aspect, wherein the exhaust gas inlet side end portion of the outer pipe of the exhaust gas inlet pipe or the exhaust gas outlet side end portion of the outer pipe of the urea mixing pipe is brought into contact with an outer peripheral surface of the inner pipe by being folded toward an inner side.

On the basis of the invention according to the first aspect of the invention, in the engine device having the urea mixing pipe which injects the urea water into the exhaust gas of the engine, and the exhaust gas purification case which removes the nitrogen oxide in the exhaust gas of the engine, and structured such that the exhaust gas inlet pipe of the exhaust gas purification case is connected to the outlet of the urea mixing pipe via the flange body, the exhaust gas outlet side end portions of the outer pipe and the inner pipe of the urea mixing pipe having the double-pipe structure are connected to the exhaust gas inlet side end portions of the outer pipe and the inner pipe of the exhaust gas inlet pipe having the double-pipe structure, the fitting small-diameter portion is formed in the end portion of the inner pipe of the urea mixing pipe, and the fitting small-diameter portion is inward insert to the inner portion of the inner pipe of the exhaust gas inlet pipe. As a result, the fitting small-diameter portion can inhibit the exhaust gas from coming into contact with the inner hole surface of the flange body, and it is possible to prevent the crystalline lump of the urea component from being formed in the inner hole surface of the flange body. The exhaust gas can be smoothly moved to the urea mixing pipe or the exhaust gas inlet pipe.

On the basis of the invention according to the second aspect of the invention, the outer pipe of the exhaust gas inlet pipe and the outer pipe of the urea mixing pipe are formed by the pipe having the same diameter, and the inner pipe of the exhaust gas inlet pipe and the inner pipe of the urea mixing pipe are formed by the pipe having the same diameter. As a result, it is possible to suppress change of a flow resistance of the exhaust gas which moves from the urea mixing pipe to the exhaust gas inlet pipe, and it is possible to smoothly move the exhaust gas.

On the basis of the invention according to the third aspect of the invention, the pipe thickness of the inner pipe of the urea mixing pipe is formed thinner than the pipe thickness of the outer pipe of the urea mixing pipe. As a result, it is possible to easily execute a drawing process of forming the fitting small-diameter portion in the end portion of the inlet pipe of the urea mixing pipe. It is possible to reduce a manufacturing cost of the urea mixing pipe.

On the basis of the invention according to the fourth aspect of the invention, in the engine device having the urea mixing pipe which injects the urea water into the exhaust gas of the engine, and the exhaust gas purification case which removes the nitrogen oxide in the exhaust gas of the engine, and structured such that the exhaust gas inlet pipe of the exhaust gas purification case is connected to the outlet of the urea mixing pipe via the flange body, the exhaust gas outlet side end portions of the outer pipe and the inner pipe of the urea mixing pipe having the double-pipe structure are connected to the exhaust gas inlet side end portions of the outer pipe and the inner pipe of the exhaust gas inlet pipe having the double-pipe structure, the exhaust gas inlet side end portion of the inner pipe of the exhaust gas inlet pipe is fitted to the exhaust gas outlet side end portion of the inner pipe of the urea mixing pipe, and the exhaust gas outlet side end portion of the inner pipe of the urea mixing pipe is supported to the outer pipe of the urea mixing pipe. As a result, it is possible to shield the inner hole surface of the flange body by the exhaust gas outlet side end portion of the inner pipe of the urea mixing pipe, it is possible to inhibit the exhaust gas from coming into contact with the inner hole surface of the flange body, and it is possible to prevent the crystalline lump of the urea component from being formed in the inner hole surface of the flange body. In spite of the above, it is possible to simplify the connecting structure between the exhaust gas inlet pipe and the urea mixing pipe having the double-pipe structures which are excellent in a heat insulating property.

On the basis of the invention according to the fifth aspect of the invention, the exhaust gas outlet side end portion of the urea mixing pipe is provided with the support body which connects the outer peripheral surface of the inner pipe to the inner peripheral surface of the outer pipe of the urea mixing pipe. As a result, it is possible to properly maintain an attaching distance between the outer pipe and the inner pipe of the urea mixing pipe by the support body, and it is possible to easily form the shape of the exhaust gas outlet side end portion of the urea mixing pipe, for example, by forming the support body by a ring-like piece or a glass wool filling material. Further, it is possible to improve a rigidity of the urea mixing pipe by the support body in spite of a matter that the urea mixing pipe can be structured at a low cost.

On the basis of the invention according to the sixth aspect of the invention, the inner diameter of the inner pipe of the exhaust gas inlet pipe is formed larger than the outer diameter of the inner pipe of the urea mixing pipe, the outer pipe and the inner pipe of the exhaust gas inlet pipe are firmly fixed to the inlet side flange body serving as the flange body, the outer pipe of the urea mixing pipe is firmly fixed to the outlet side flange body serving as the flange body, and the inlet side flange body and the outlet side flange body are fastened. As a result, it is possible to easily combine the outer pipe and the inner pipe of the exhaust gas inlet pipe, and the outer pipe and the inner pipe of the urea mixing pipe, by the inlet side flange body and the outlet side flange body, it is possible to improve a connecting workability of the exhaust gas inlet pipe and the urea mixing pipe, and it is possible to easily secure a strength of the connection portion between the exhaust gas inlet pipe and the urea mixing pipe.

On the basis of the invention according to the seventh aspect of the invention, in the engine device having the urea mixing pipe which injects the urea water into the exhaust gas of the engine, and the exhaust gas purification case which removes the nitrogen oxide in the exhaust gas of the engine, and structured such that the exhaust gas inlet pipe of the exhaust gas purification case is connected to the outlet of the urea mixing pipe via the flange body, the exhaust gas outlet side end portions of the outer pipe and the inner pipe of the urea mixing pipe having the double-pipe structure are connected to the exhaust gas inlet side end portions of the outer pipe and the inner pipe of the exhaust gas inlet pipe having the double-pipe structure, the ring-like pinching piece portion is formed in the exhaust gas inlet side end portion of the inner pipe of the exhaust gas inlet pipe by folding the exhaust gas inlet side end portion of the inner pipe of the exhaust gas inlet pipe toward the outer side, and the ring-like pinching piece portion is formed in the exhaust gas outlet side end portion of the inner pipe of the urea mixing pipe toward the outer side by folding the exhaust gas outlet side end portion of the inner pipe of the urea mixing pipe toward the outer side. As a result, the flange body can be arranged in the outer peripheral side of the inner pipe of the urea mixing pipe, each of the pinching piece portions can inhibit the exhaust gas from coming into contact with the inner hole surface of the flange body by shielding the inner hole surface of the flange body by each of the pinching portions, and it is possible to prevent the crystalline lump of the urea component from being formed in the inner hole surface of the flange body.

On the basis of the invention according to the eighth aspect of the invention, the ring-like pinching piece portions are formed in the exhaust gas inlet side end portions of the outer pipe and the inner pipe of the exhaust gas inlet pipe by folding the exhaust gas inlet side end portions of the outer pipe and the inner pipe of the exhaust gas inlet pipe toward the outer sides, and the ring-like pinching piece portions are formed in the exhaust gas outlet side end portions of the outer pipe and the inner pipe of the urea mixing pipe by folding the exhaust gas outlet side end portions of the outer pipe and the inner pipe of the urea mixing pipe. As a result, it is possible to pinch and fix the outer pipe and the inner pipe of the exhaust gas inlet pipe, and the outer pipe and the inner pipe of the urea mixing pipe by the flange body via each of the pinching piece portions, and it is possible to easily connect the exhaust gas inlet pipe and the urea mixing pipe in which the heat insulating properties (warmth retaining properties) are improved by the double-pipe structures, for example, by a connecting structure in which a welding process man hour is reduced.

On the basis of the invention according to the ninth aspect of the invention, the exhaust gas inlet side end portion of the outer pipe of the exhaust gas inlet pipe or the exhaust gas outlet side end portion of the outer pipe of the urea mixing pipe is brought into contact with the outer peripheral surface of the inner pipe by being folded toward the inner side. As a result, it is possible to position and connect the inner pipe by the outer pipe end portion, it is possible to easily maintain a distance between the outer pipe and the inner pipe at a predetermined dimension, and it is possible to improve a connecting workability of the exhaust gas inlet pipe and the urea mixing pipe. In spite of the above, it is possible to easily improve the connection portion between the exhaust gas inlet pipe and the urea mixing pipe.

DESCRIPTION OF THE PREFERRED EMBODIMENTS

Figure 1:
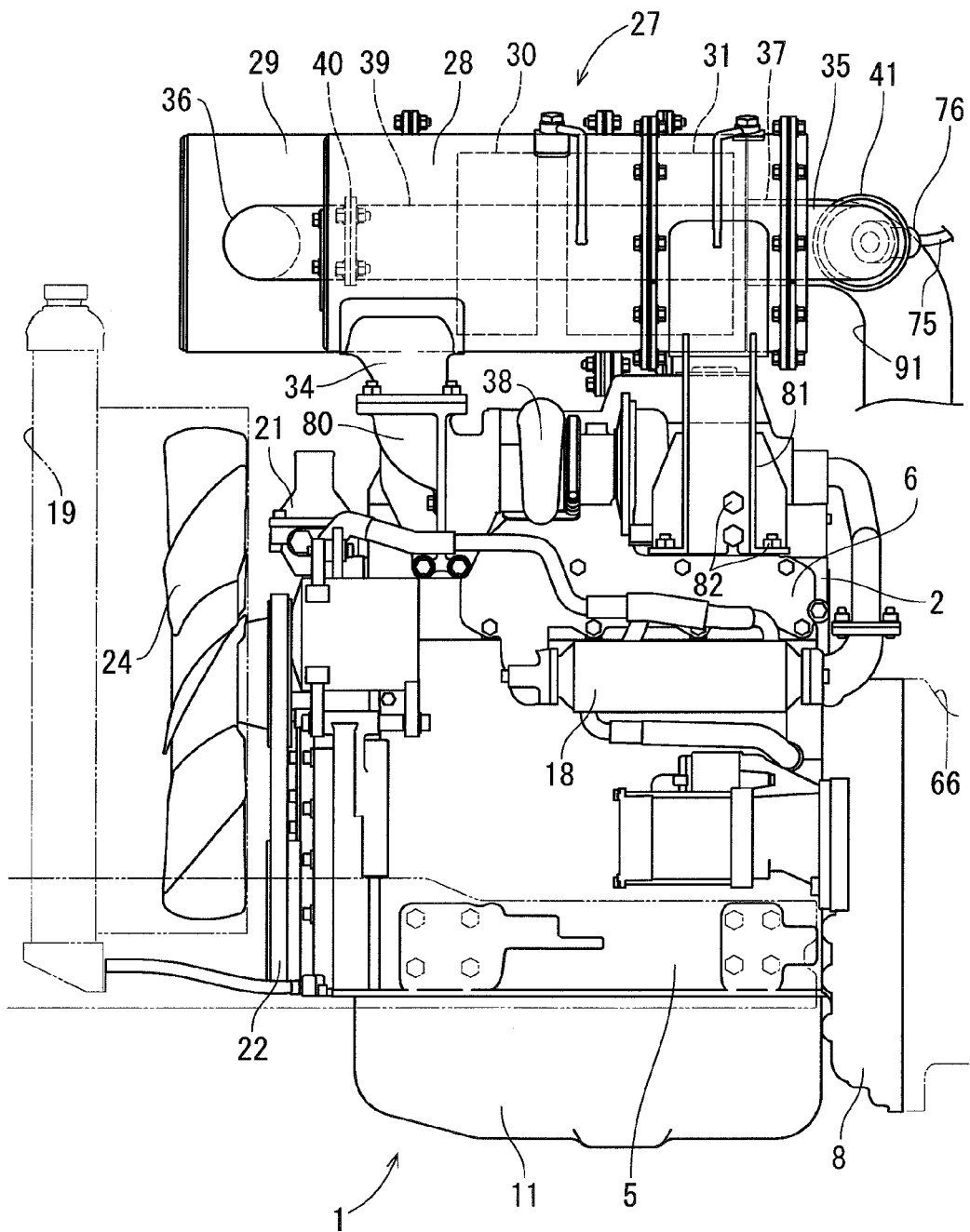
FIG. 1 is a left side elevational view of a diesel engine showing a first embodiment.
Figure 2:
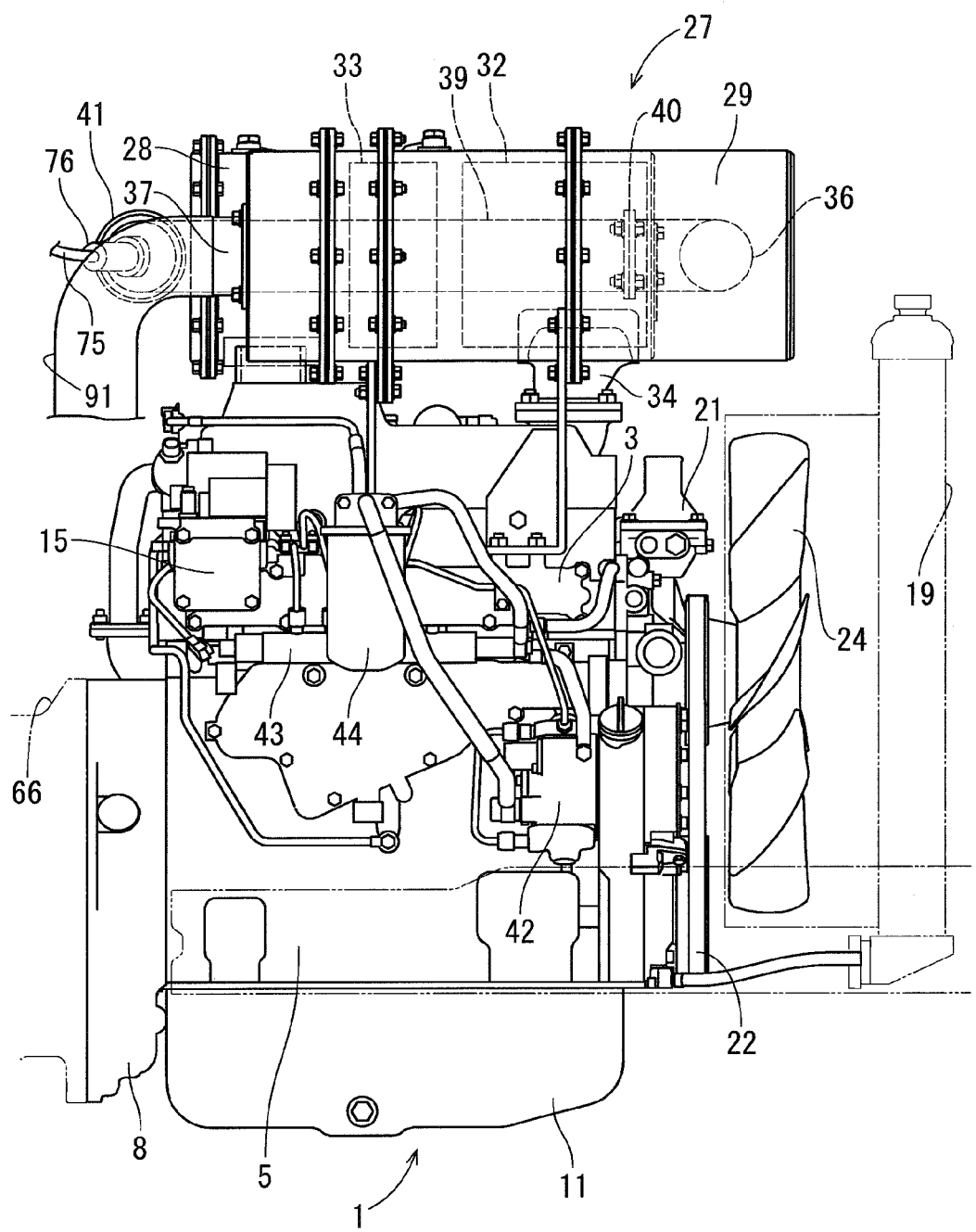
FIG. 2 is a right side elevational view of the same.
Figure 3:
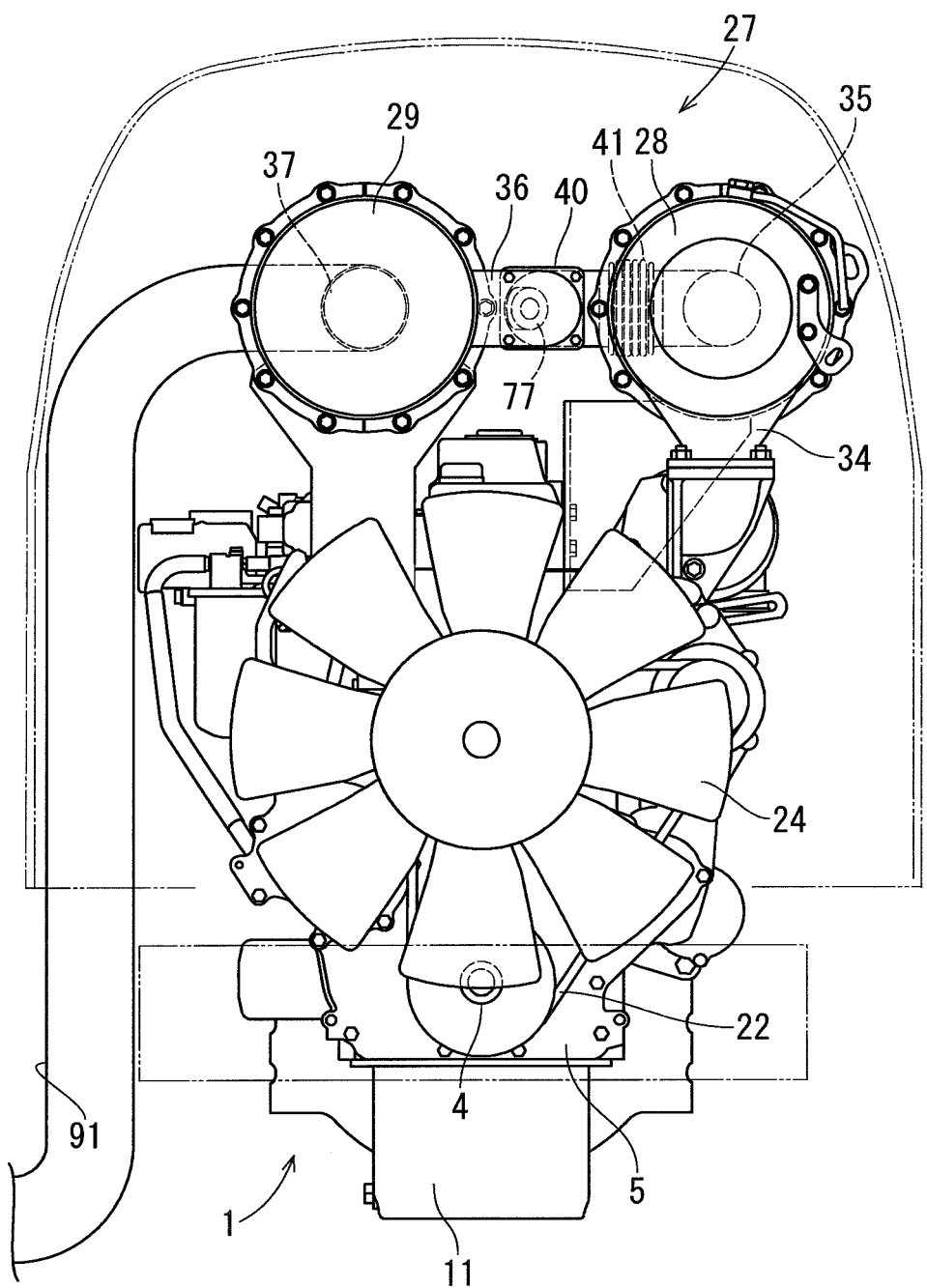
FIG. 3 is a front elevational view of the same.

A description will be given below of a first embodiment obtained by embodying the present invention with reference to the accompanying drawings (FIGS. 1 to 11). FIG. 1 is a left side elevational view in which an exhaust manifold of a diesel engine is installed, FIG. 2 is a right side elevational view in which an intake manifold of the diesel engine is installed, and FIG. 3 is a front elevational view in which a cooling fan of the diesel engine is installed. A description will be given of an overall structure of a diesel engine 1 with reference to FIGS. 1 to 3.

As shown in FIGS. 1 to 3, an intake manifold 3 is arranged in one side surface of a cylinder head 2 of the diesel engine 1. The cylinder head 2 is mounted on a cylinder block 5 which has an engine output shaft 4 (a crank shaft) and a piston (not shown) built-in. An exhaust manifold 6 is arranged in the other side surface of the cylinder head 2. A front end and a rear end of the engine output shaft 4 are protruded out of a front face and a rear face of the cylinder block 5.

As shown in FIGS. 1 to 3, a flywheel housing 8 is firmly fixed to a rear face of the cylinder block 5. A flywheel (not shown) is provided within the flywheel housing 8. The flywheel is axially supported to a rear end side of the engine output shaft 4. The diesel engine 1 is structured such that its power is taken out via the flywheel. Further, an oil pan 11 is arranged in a lower face of the cylinder block 5.

Figure 4:
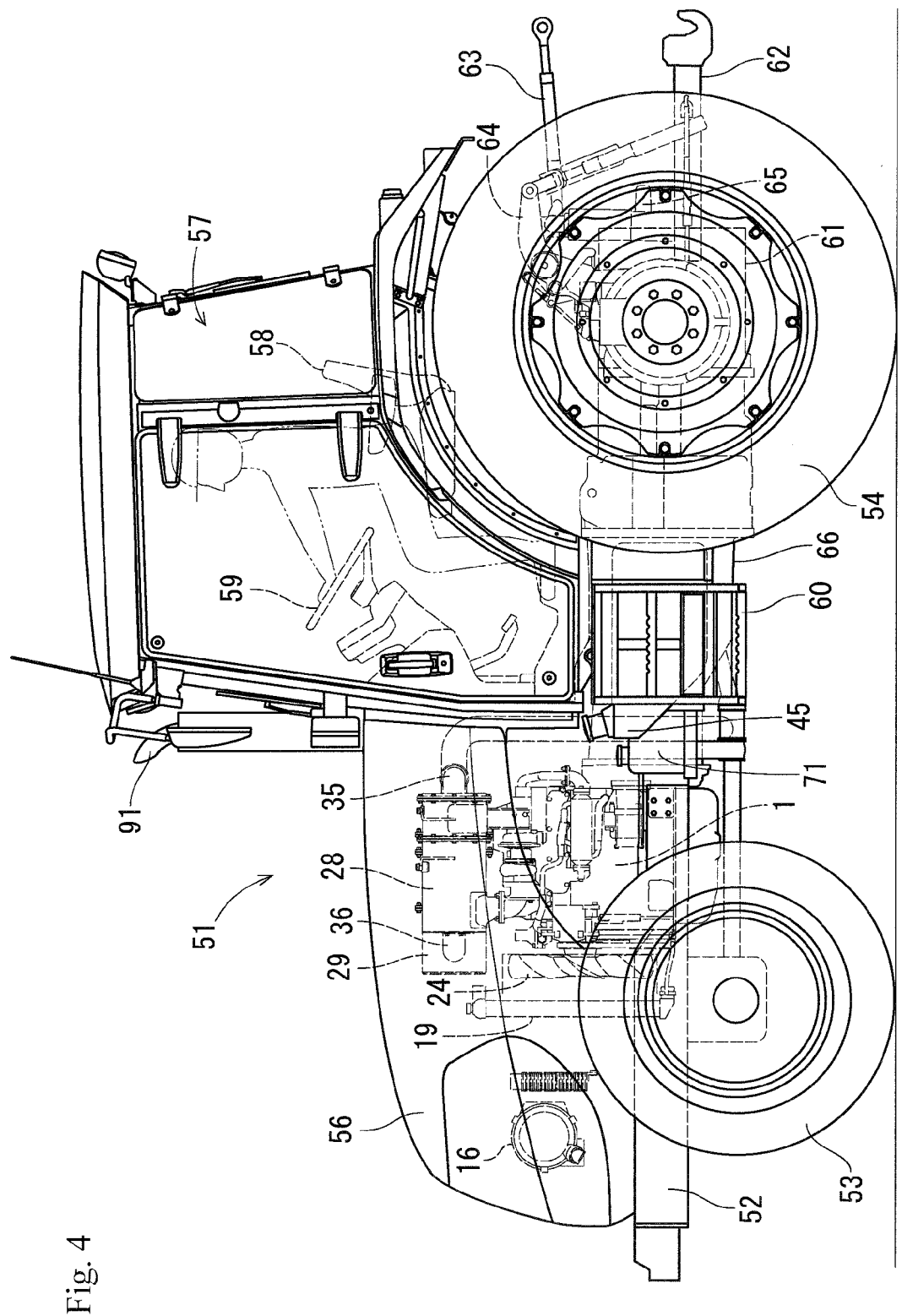
FIG. 4 is a left side elevational view of a tractor which mounts a diesel engine thereon.

As shown in FIGS. 1 and 3, an exhaust gas recirculation device (EGR) 15 taking the exhaust gas for recirculation therein is arranged in the intake manifold 3. An air cleaner 16 shown in FIG. 4 is connected to the intake manifold 3. External air which is dust removed and purified by the air cleaner 16 is fed to the intake manifold 3, and be supplied to each of the cylinders of the diesel engine 1.

According to the structure mentioned above, since a part of the exhaust gas discharged out of the diesel engine 1 to the exhaust manifold 6 is flowed back to each of the cylinders of the diesel engine 1 from the intake manifold 3 via the exhaust gas recirculation device 15, a combustion temperature of the diesel engine 1 decreases, a discharge amount of nitrogen oxide (NOx) from the diesel engine 1 is reduced, and a fuel consumption of the diesel engine 1 is improved.

There is provided a cooling water pump 21 which circulates cooling water into the cylinder block 5 and a radiator 19 shown in FIG. 4. The cooling water pump 21 is arranged in an installation side of a cooling fan 24 in the diesel engine 1. The cooling water pump 21 and the cooling fan 24 are connected to the engine output shaft 4 via a V-belt 22 or the like, and the cooling water pump 21 and the cooling fan 24 are driven. The cooling water is fed into the cylinder block 5 from the cooling water pump 21 via an EGR cooler 18 of the exhaust gas recirculation device 15, and the diesel engine 1 is cooled by wind of the cooling fan 24.

As shown in FIGS. 1 to 3, there are provided a first case 28 which serves as a diesel particulate filter (DPF) removing particulate matter in the exhaust gas of the diesel engine 1, and a second case 29 which serves as an urea selective catalyst reduction (SCR) system removing nitrogen oxide in the exhaust gas of the diesel engine 1, as an exhaust gas purification device 27 for purifying the exhaust gas which is discharged out of each of the cylinders of the diesel engine 1. As shown in FIGS. 1 and 2, the first case 28 is inward provided with an oxidation catalyst 30 and a soot filter 31. The second case 29 is inward provided with an SCR catalyst 32 for urea selective catalyst reduction, and an oxidation catalyst 33.

The exhaust gas discharged out of each of the cylinders of the diesel engine 1 to the exhaust manifold 6 is discharged to outside via the exhaust gas purification device 27. The exhaust gas purification device 27 is structured such as to reduce carbon monoxide (CO), carbon hydride (HC), particulate matter (PM) and nitrogen oxide (NOx) in the exhaust gas of the diesel engine 1.

Figure 9:
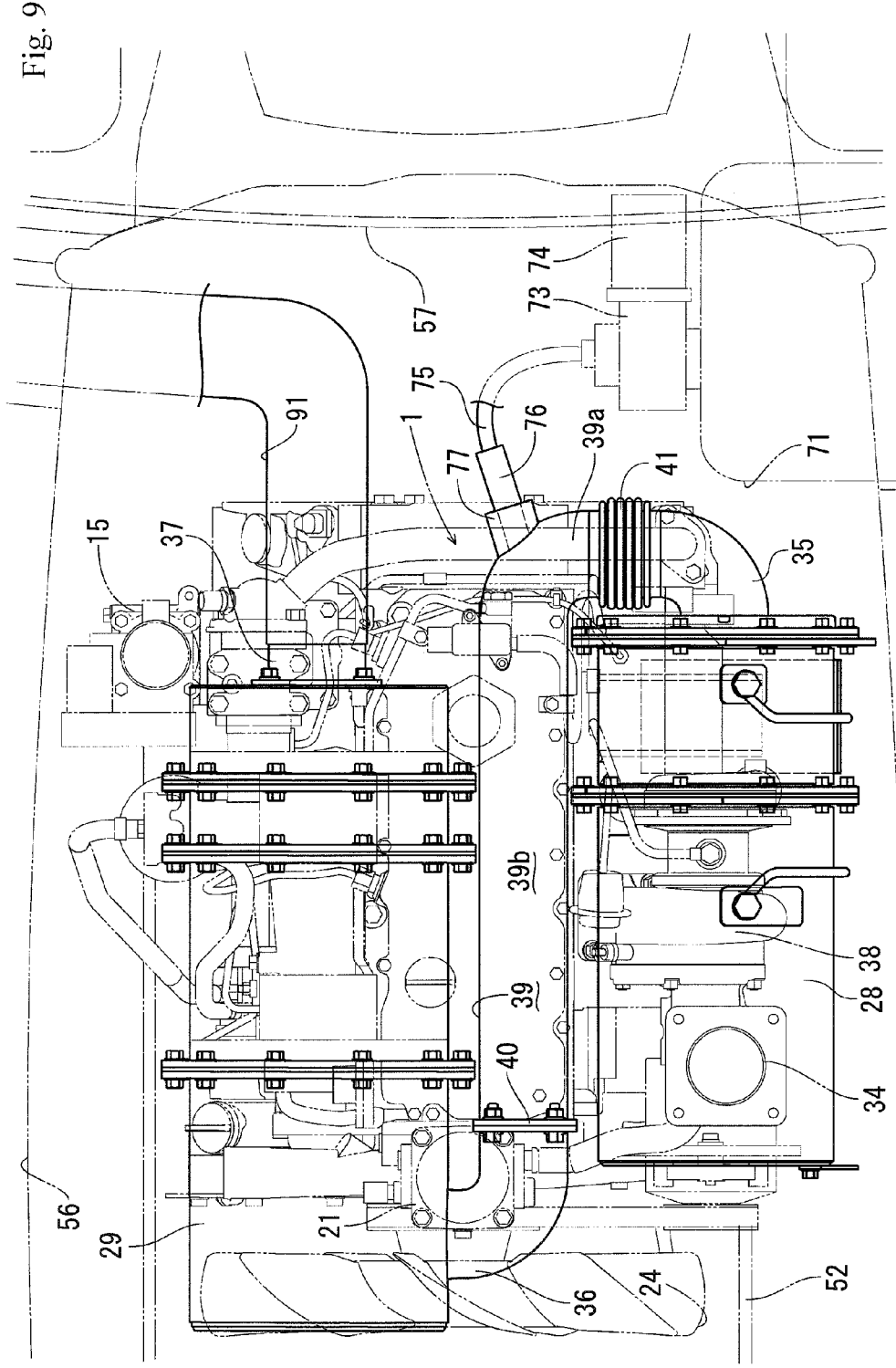
FIG. 9 is an enlarged explanatory view of FIG. 8.

The first case 28 and the second case 29 are constructed as a long cylindrical shape extending long in a direction which is parallel to the output shaft (the crank shaft) 4 of the diesel engine 1 in a plan view (refer to FIG. 9). A DPF inlet pipe 34 taking the exhaust gas therein, and a DPF outlet pipe 35 discharging the exhaust gas are provided in both sides (one end side and the other end side in an exhaust gas moving direction) of a cylindrical shape of the first case 28. In the same manner, an SCR inlet pipe 36 taking the exhaust gas therein, and an SCR outlet pipe 37 discharging the exhaust gas are provided in both sides (one end side and the other end side in the exhaust gas moving direction) of the second case 29.

Further, a supercharger 38 forcibly feeding the air to the diesel engine 1 is arranged in an exhaust gas outlet of the exhaust manifold 6. The DPF inlet pipe 34 is communicated with the exhaust manifold 6 via the supercharger 38, and the exhaust gas of the diesel engine 1 is introduced into the first case 28. Meanwhile, the SCR inlet pipe 36 is connected to the DPF outlet pipe 35 via an urea mixing pipe 39, and the exhaust gas of the first case 28 is introduced into the second case 29. In addition, the DPF outlet pipe 35 and the urea mixing pipe 39 are connected by a bellows-like connection pipe 41 which is foldable and can extend and contract. A base end side of a pipe bracket 40 is firmly fixed to an outer peripheral surface of the second case 29, and the SCR inlet pipe 36 and the urea mixing pipe 39 are firmly fixed by the pipe bracket 40 so as to be detachable.

As shown in FIG. 1, there are provided a fuel pump 42 and a common rail 43 which connect a fuel tank 45 shown in FIG. 4 to each of injectors (not shown) for multiple cylinders of the diesel engine 1. The common rail 43 and a fuel filter 44 are arranged in an installation side of the intake manifold 3 of the cylinder head 2, and the fuel pump 42 is arranged in the cylinder block 5 below the intake manifold 3. Each of the injectors has an electromagnetic opening and closing control type fuel injection valve (not shown).

The fuel within the fuel tank 45 is sucked into the fuel pump 42 via the fuel filter 44, the common rail 43 is connected to a discharge side of the fuel pump 42, and the cylindrical common rail 43 is connected to each of the injectors of the diesel engine 1. Surplus of the fuel pressure fed to the common rail 43 from the fuel pump 42 is returned to the fuel tank 45, the high-pressure fuel is temporarily stored within the common rail 43, and the high-pressure fuel within the common rail 43 is supplied to an inner portion of each of the cylinders of the diesel engine 1.

According to the structure mentioned above, the fuel in the fuel tank 45 is pressure fed to the common rail 43 by the fuel pump 42, the high-pressure fuel is stored in the common rail 43, and the fuel injection valve of each of the injectors is controlled to be opened and closed. As a result, the high-pressure fuel within the common rail 43 is injected to each of the cylinders of the diesel engine 1. In other words, it is possible to precisely control an injection pressure, an injection timing and an injection period (an injection amount) of the fuel by electronically controlling the fuel injection valve of each of the injectors. Therefore, it is possible to reduce the nitrogen oxide (NOx) discharged out of the diesel engine 1.

Figure 5:
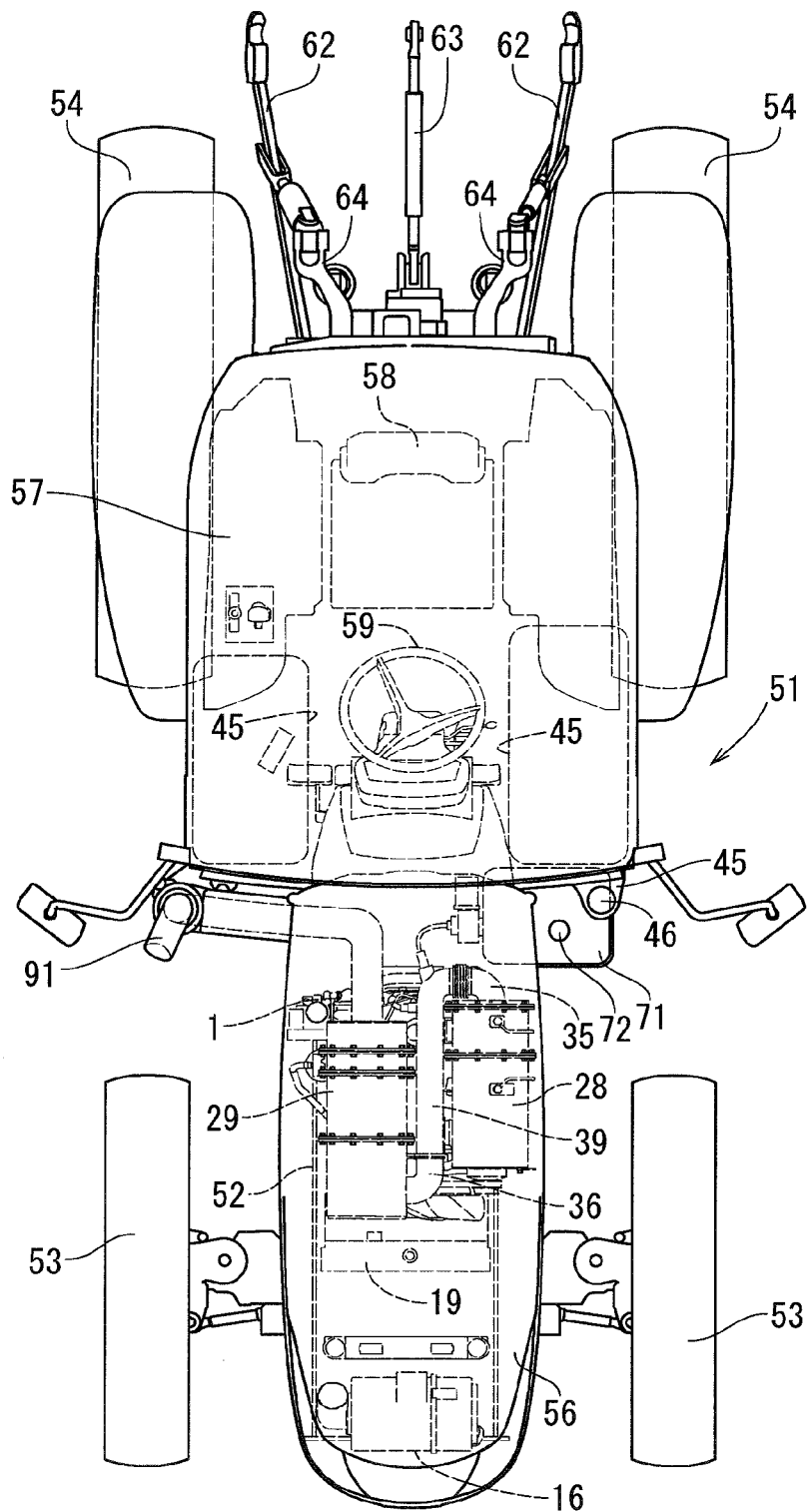
FIG. 5 is a plan view of the same.
Figure 6:
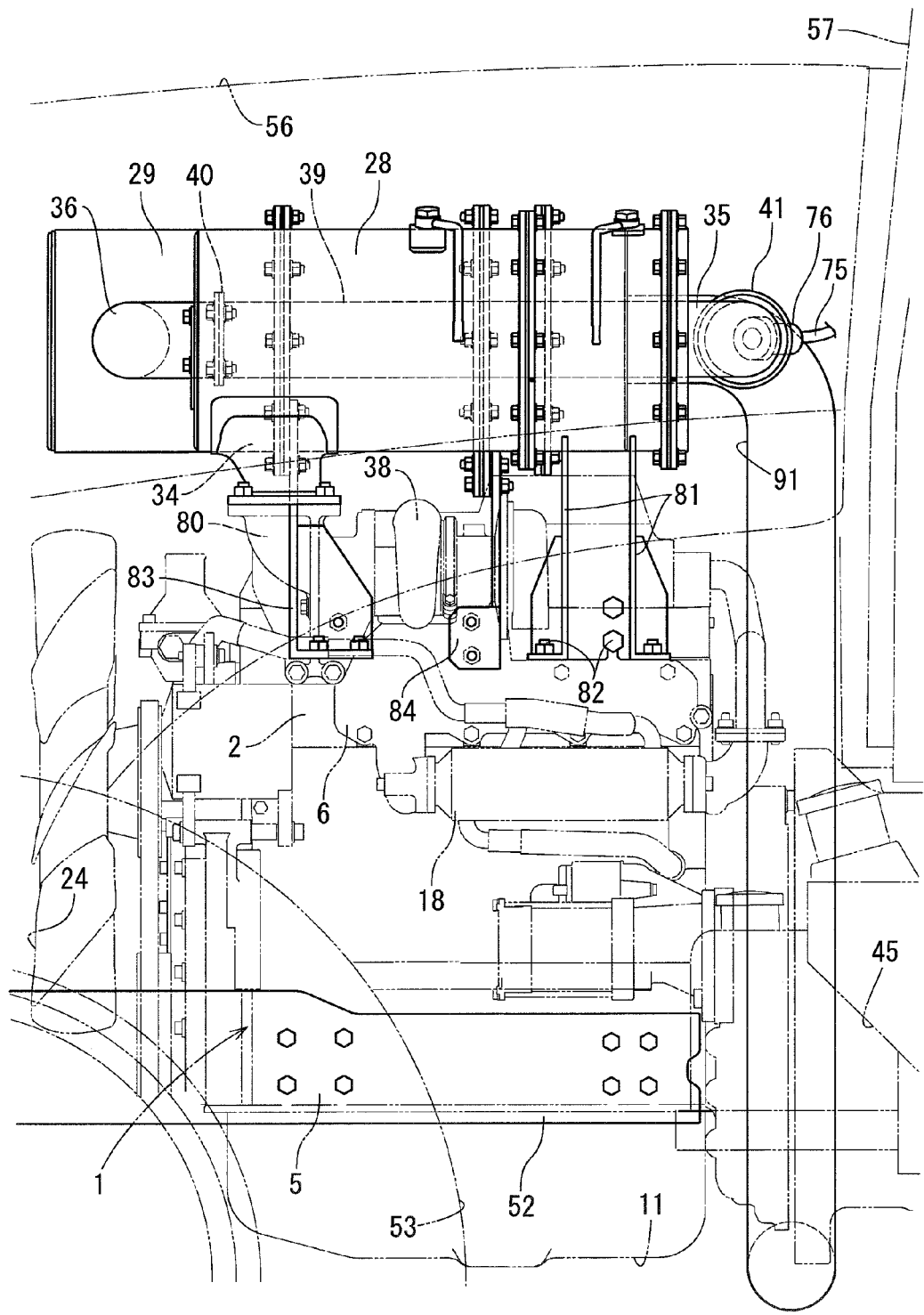
FIG. 6 is a left side elevational view of an exhaust gas purification device.
Figure 7:
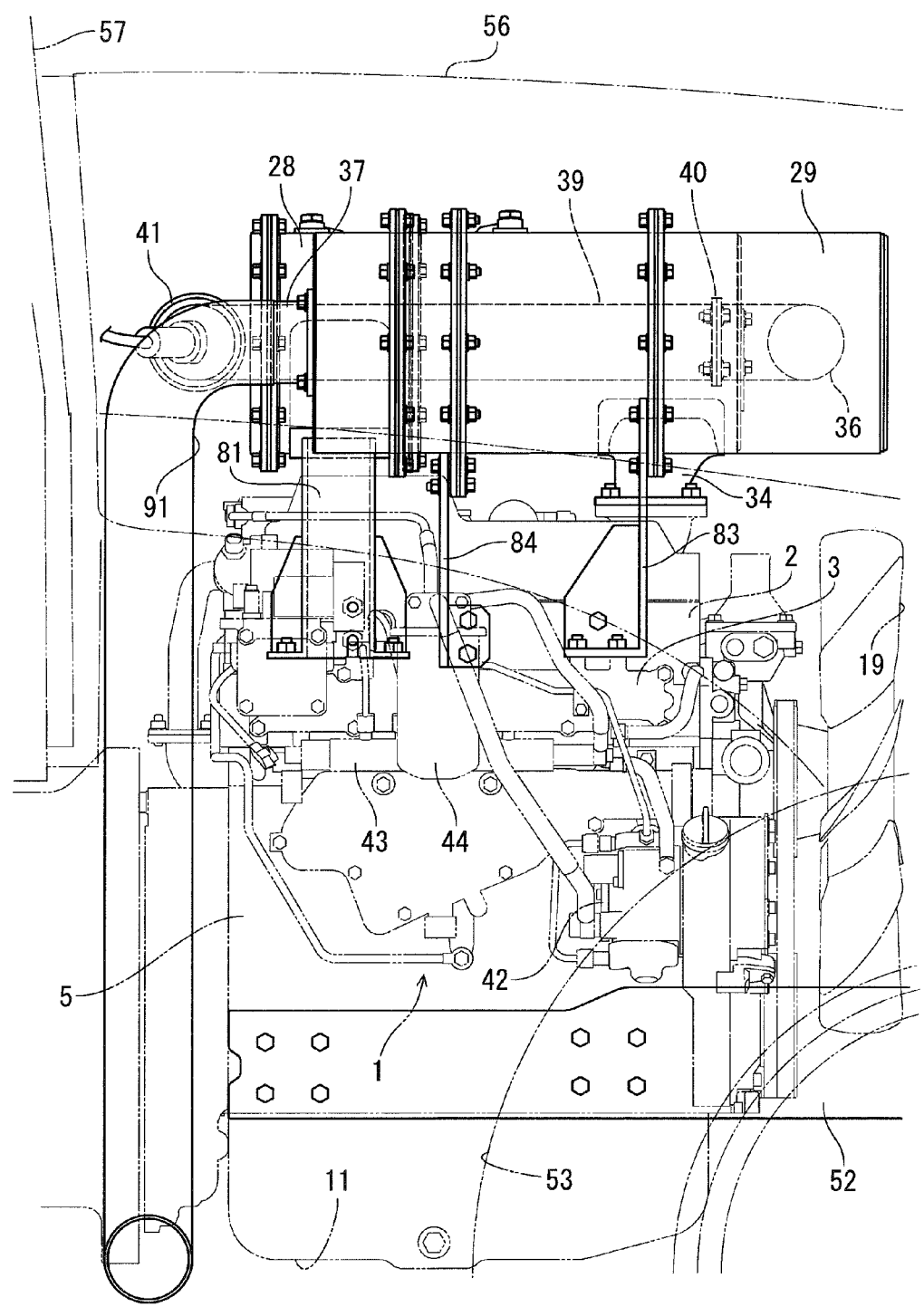
FIG. 7 is a right side elevational view of the same.
Figure 8:
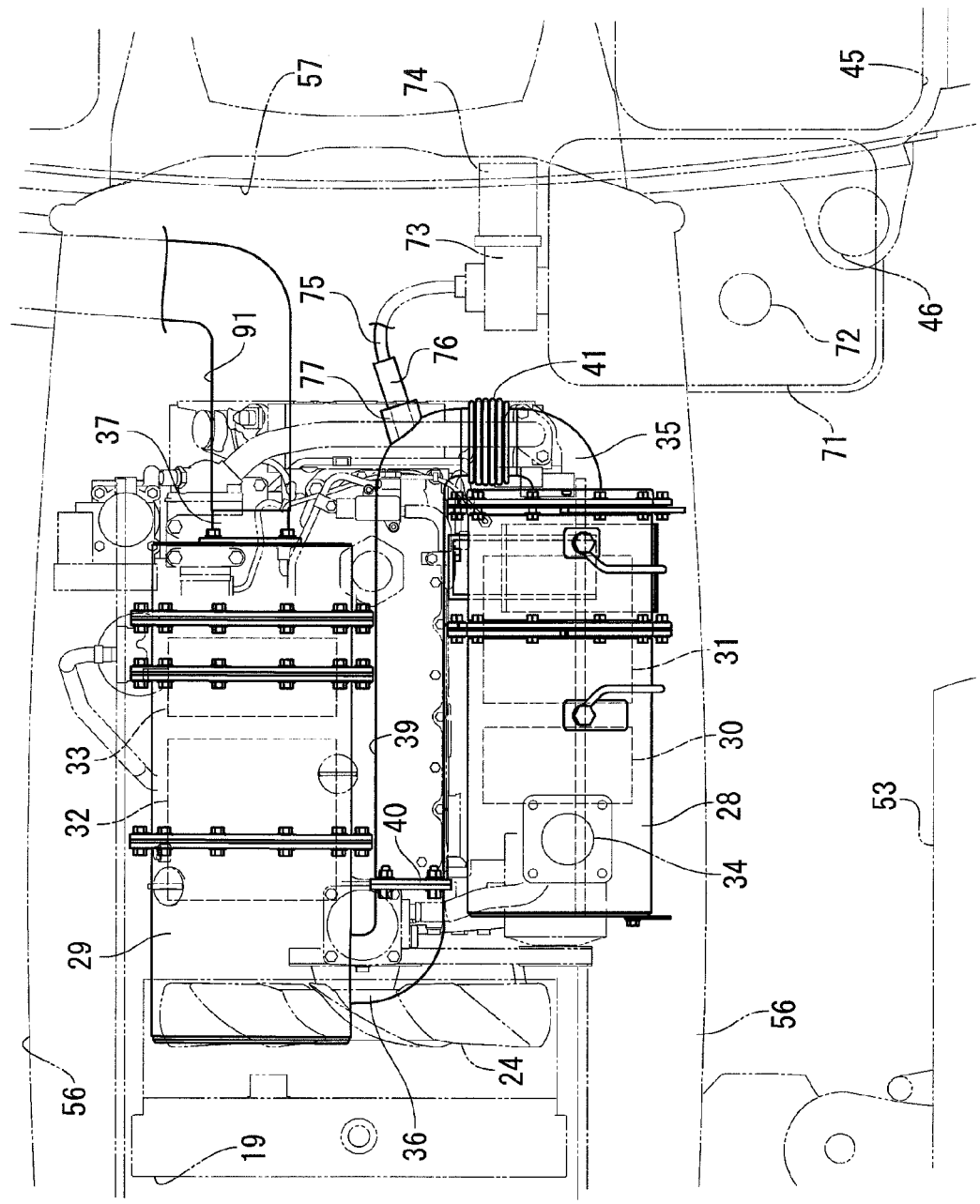
FIG. 8 is a plan view of the same.

Next, a description will be given of a tractor 51 mounting the diesel engine 1 thereon with reference to FIGS. 4 to 9. The tractor 51 serving as a working vehicle shown in FIGS. 4 to 9 is structured such that a tilling working machine (not shown) and the like is installed thereto, and the tractor carries out a tilling work tilling farm fields. FIG. 4 is a side elevational view of a tractor for agricultural work, FIG. 5 is a plan view of the same, FIG. 6 is a left side elevational view of an engine portion, FIG. 7 is a right side elevational view of the same portion, FIG. 8 is a plan view of the same portion, and FIG. 9 is an enlarged plan view of FIG. 8. In the following description, a left side as facing a forward moving direction of the tractor is simply called as a left side, and a right side as facing the forward moving direction is simply called as a right side in the same manner.

As shown in FIGS. 4 and 5, the tractor 51 for the agricultural work serving as the working vehicle is structured such that a travel machine body 52 is supported by a pair of right and left front wheels 53 and a pair of right and left rear wheels 54, the diesel engine 1 is mounted to a front portion of the travel machine body 52, and the tractor 51 carries out a forward and backward moving travel by driving the rear wheels 54 and the front wheels 53 by the diesel engine 1. An upper face side and right and left side faces of the diesel engine 1 are covered by an openable hood 56.

Further, a cabin 57 on which an operator gets is installed in a rear side of the hood 56 in an upper face of the travel machine body 52. An inner portion of the cabin 57 is provided with a control seat 58 on which the operator seats, and a control device such as a control steering wheel 59 which serves as a steering means. Further, a pair of right and left steps 60 for the operator to get on and off are provided in right and left outer portions of the cabin 57, and a fuel tank 45 supplying fuel to the diesel engine 1 is provided in an inner side than the step 60 and in a lower side than a bottom portion of the cabin 57.

Further, the travel machine body 52 is provided with a transmission case 61 for shifting an output of the diesel engine 1 so as to transmit to the rear wheels 54 (the front wheels 53). A tilling working machine (not shown) is connected to a rear portion of the transmission case 61 via a lower link 62, a top link 63 and a lift arm 64 so as to be movable up and down. Further, a rear side surface of the transmission case 61 is provided with a PTO shaft 65 which drives the tilling working machine. The travel machine body 52 of the tractor 51 is constructed by the diesel engine 1, the transmission case 61 and a clutch case 66 connecting them.

Further, as shown in FIGS. 4 to 7, the DPF inlet pipe 34 is detachably fastened by bolts to an exhaust gas outlet pipe 80 of the supercharger 38. Further, an upper end side of a DPF support leg body 81 is fixed by welding to an outer peripheral surface of an end portion in the DPF outlet pipe 35 side, in the outer peripheral surface of the first case 28, and a lower end side of the DPF support leg body 81 is detachably fastened by bolts 82 to a side surface of the cylinder head 2 or an upper face of the exhaust manifold 6. In other words, the first case 28 is attached to an upper face side of the diesel engine 1 via the exhaust gas outlet pipe 80 and the DPF support leg body 81. The first case 28 is supported in parallel to the exhaust manifold 6 so that a longitudinal direction of the cylindrical first case 28 is directed to a back-and-forth direction of the diesel engine 1.

As shown in FIGS. 6 to 9, there are provided an SCR first support leg body 83 and an SCR second support leg body 84 which support the second case 29 in the upper face side of the diesel engine 1. A flange portion of the second case 29 is detachably fastened by bolts to each of upper end sides of the SCR first support leg body 83 and the SCR second support leg body 84, and each of lower end sides of the SCR first support leg body 83 and the SCR second support leg body 84 is detachably fastened by bolts to the side surface of the cylinder head 2 or the upper face of the intake manifold 3. Therefore, since the first case 28 and the second case 29 are arranged in parallel to the back-and-forth direction in the upper face side of the diesel engine 1, the first case 28 is positioned in a left side of the upper face of the diesel engine 1, and the second case 29 is positioned in a right side of the upper face of the diesel engine 1.

In addition, the urea mixing pipe 39 is arranged between the first case 28 and the second case 29 in parallel to them. The first case 28, the second case 29 and the urea mixing pipe 39 are supported at a higher position than the cooling air path of the cooling fan 24, and right and left lateral sides of the urea mixing pipe 39 are closed by the first case 28 and the second case 29. A temperature of the exhaust gas within the urea mixing pipe 39 is prevented from being lowered, and the urea water supplied into the urea mixing pipe 39 is prevented from being crystallized. Further, the urea water supplied into the urea mixing pipe 39 is mixed as ammonia into the exhaust gas which leads to the second case 29 from the first case 28.

As shown in FIGS. 4 to 9, a tail pipe 91 is provided in a rising manner in a front face of a right corner portion of the cabin 57 in the front face of the cabin 57, a lower end side of the tail pipe 91 is extended to an inner portion of the hood 56, the lower end side of the tail pipe 91 is connected to the SCR outlet pipe 37, and the exhaust gas purified by the second case 29 is discharged out of the tail pipe 91 toward an upward side of the cabin 57. Further, an urea water tank 71 is installed in a left lateral portion of the hood 56 in an opposite side to the right lateral portion where the tail pipe 91 is arranged, in the front face of the cabin 57. In other words, the tail pipe 91 is arranged in the right lateral portion in the rear portion of the hood 56 and the urea water tank 71 is arranged in the left lateral portion in the rear portion of the hood 56.

Further, the urea water tank 71 is mounted to the travel machine body 52 (the bottom frame of the cabin 57) in the left rear portion of the hood 56. An oil filling port 46 of the fuel tank 45 and a water filling port 72 of the urea water tank 71 are provided adjacently in the front face lower portion in the left side of the cabin 57. The tail pipe 91 is arranged in the right front face of the cabin 57 where the operator gets on and off at a low frequency, and the oil filling port 46 and the water filling port 72 are arranged in the left front face of the cabin 57 where the operator gets on and off at a high frequency. The cabin 57 is structured such that the operator can get on and off the control seat 58 from any of the left side and the right side.

Further, there are provided an urea water injection pump 73 which pressure feeds urea aqueous solution within the urea water tank 71, an electric motor 74 which drives the urea water injection pump 73, and an urea water injection nozzle 76 which is connected to the urea water injection pump 73 via an urea water injection pipe 75. The urea water injection nozzle 76 is attached to the urea mixing pipe 39 via an injection pedestal 77, and the urea aqueous solution is sprayed into an inner portion of the urea mixing pipe 39 from the urea water injection nozzle 76.

According to the structure mentioned above, carbon monoxide (CO) and carbon hydride (HC) in the exhaust gas of the diesel engine 1 are reduced by the oxidation catalyst 30 and the soot filter 31 within the first case 28. Next, the urea water from the urea water injection nozzle 7 is mixed into the exhaust gas from the diesel engine 1, in the inner portion of the urea mixing pipe 39. Further, nitrogen oxide (NOx) in the exhaust gas into which the urea water is mixed as the ammonia is reduced by the SCR catalyst 32 and the oxidation catalyst 33 within the second case 29, and is discharged externally from the tail pipe 91.

As shown in FIGS. 1 to 9, in the engine device of the working vehicle having the first case 28 which removes the particulate matter in the exhaust gas of the diesel engine 1, and the second case 29 which removes the nitrogen oxide in the exhaust gas of the diesel engine 1, and structured such that the diesel engine 1 is mounted to the machine body frame (the travel machine body 52) in which the right and left traveling wheels (the front wheels 53 and the rear wheels 54) are arranged, the first case 28 and the second case 29 are arranged in a direction which is parallel to an axis of the output shaft of the diesel engine 1. Therefore, the first case 28 and the second case 29 can be compactly installed by making good use of the upper face side or the lateral surface of the diesel engine 1 in such a manner that the longitudinal direction of the first case 28 and the second case 29 are parallel to the output shaft 4 of the diesel engine 1. Further, the first case 28 and the second case 29 can be firmly fixed to the upper face side or the lateral surface of the diesel engine 1 with a high rigidity on the basis of a simple supporting structure which is provided in the upper face side or the lateral surface of the diesel engine 1. In addition, it is possible to maintain an attaching distance of the first case 28 and the second case 29 constant in relation to vibration of the diesel engine 1, and it is possible to simplify the exhaust gas piping to each of the cases 28 and 29 which are formed as the long tubular shapes in their outer shape, the exhaust gas outlet side of the diesel engine 1 and the tail pipe 91.

As shown in FIGS. 1 to 9, the first case 28 is attached to an upper side of the exhaust manifold 6 of the diesel engine 1, and the second case 29 is attached to an upper side of the intake manifold 3 of the diesel engine 1, in the upper face side of the diesel engine 1. Therefore, it is possible to compactly install the first case 28 and the second case 29 which are formed as the long tubular shapes in their outer shapes, by effectively making good use of the upper face side space of the diesel engine 1. Further, the first case 28 and the second case 29 can be firmly fixed to the upper face side of the diesel engine 1 with a high rigidity on the basis of the simple supporting structure which is provided in a rising manner in the upper face side of the diesel engine 1.

As shown in FIGS. 4 to 9, in the working vehicle in which the driver cabin 57 is arranged in a rear side of the hood 56 inward provided with the diesel engine 1, the urea water tank 71 for purifying the exhaust gas is installed between the fuel tank 45 which is provided in the lower portion of the driver cabin 57 and the diesel engine 1. Therefore, the urea water tank 71 can be heated by exhaust heat of the diesel engine 1 and the fuel tank 45, it is possible to maintain temperature of the aqueous solution within the urea water tank 71 at a predetermined temperature or higher, and it is possible to prevent an exhaust gas purification capacity of the second case 29 from being lowered in cold district. It is possible to arrange an oil supply port of the fuel tank 45 near a water supply port of the urea water tank 71, it is possible to execute an oil supply work of the fuel and a water supply work of the urea aqueous solution at the same working site, and it is possible to improve a resupplying workability of the fuel for the diesel engine 1 or the urea aqueous solution for purifying the exhaust gas.

Figure 10:
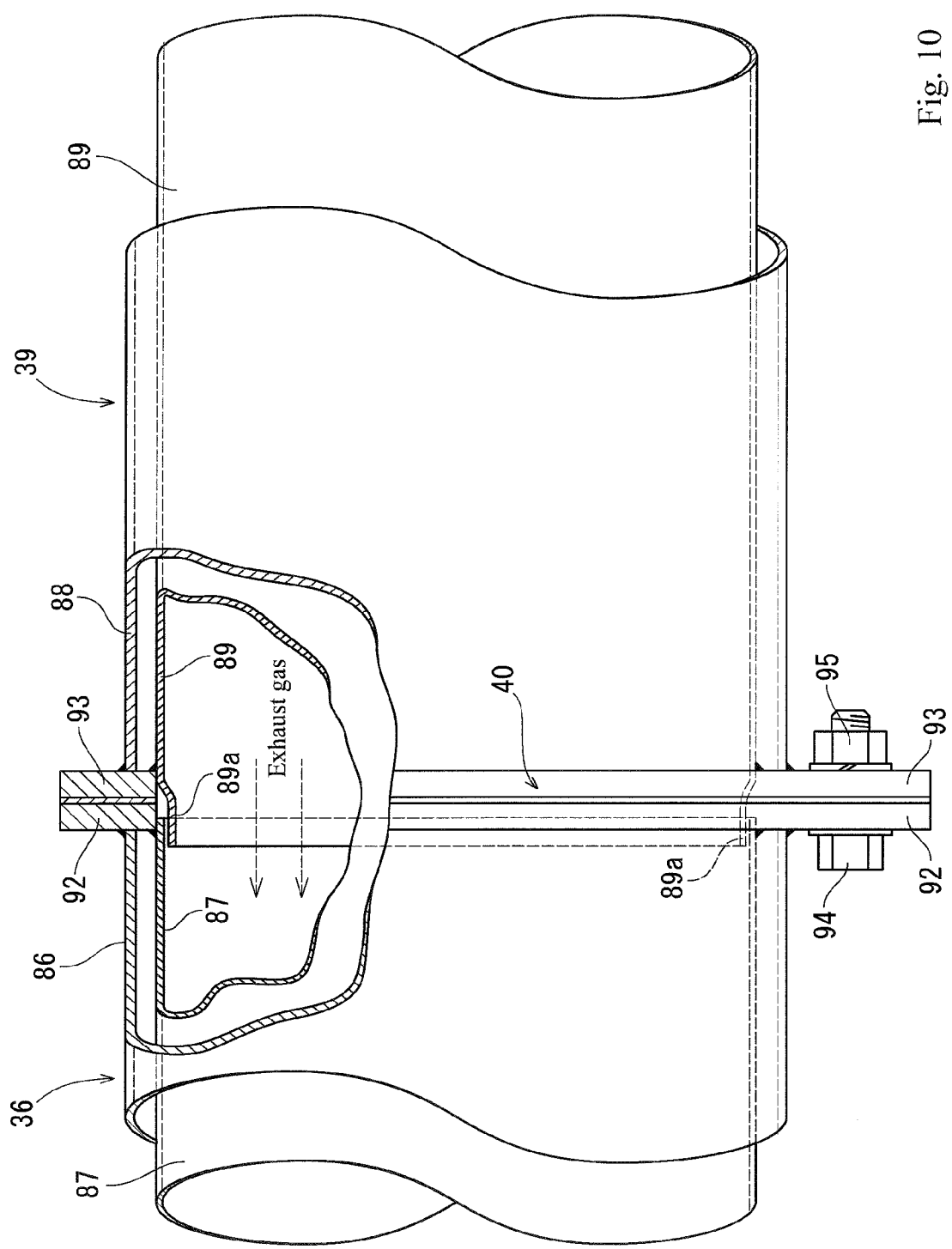
FIG. 10 is an enlarged view of a connection portion between an SCR inlet pipe and an urea mixing pipe.

Next, as shown in FIG. 10, the pipe bracket 40 connecting the SCR inlet pipe 36 and the urea mixing pipe 39 has an inlet side flange body 92 which is fixed by welding to an exhaust gas inlet side of the SCR inlet pipe 36, and an outlet side flange body 93 which is fixed by welding to an exhaust gas outlet side of the urea mixing pipe 39. A ring-like inlet side flange body 92 is firmly fixed to exhaust gas inlet side end portions of an outer pipe 86 and an inner pipe 87 of the SCR inlet pipe 36 having the double-pipe structure, and a ring-like outlet side flange body 93 is firmly fixed to exhaust gas outlet side end portions of an outer pipe 88 and an inner pipe 89 of the urea mixing pipe 39 having the double-pipe structure in the same manner. The inlet side flange body 92 and the outlet side flange body 93 are fastened and fixed by bolts 94 and nuts 95, and the SCR inlet pipe 36 and the urea mixing pipe 39 are connected.

Further, as shown in FIG. 10, the outer pipe 86 of the SCR inlet pipe 36 and the outer pipe 88 of the urea mixing pipe 39 are formed by pipes having the same diameter, and the inner pipe 87 of the SCR inlet pipe 36 and the inner pipe 89 of the urea mixing pipe 39 are formed by pipes having the same diameter. Pipe thicknesses of the inner pipes 87 and 89 are formed thinner than pipe thicknesses of the outer pipes 86 and 88. Further, a fitting small-diameter portion 89a is formed in an end portion of the inner pipe 89 of the urea mixing pipe 39 by a drawing process, and the fitting small-diameter portion 89a is inward inserted to an inner portion of the inner pipe 87 of the SCR inlet pipe 36. An end portion of the inner pipe 87 of the SCR inlet pipe 36 to which the inlet side flange body 92 is firmly fixed is fitted to an end portion (the fitting small-diameter portion 89a) of the inner pipe 89 of the urea mixing pipe 39 to which the outlet side flange body 93 is firmly fixed.

In other words, the exhaust gas within the urea mixing pipe 39 moves to the SCR inlet pipe 36 without coming into contact with an inner hole surface of the inlet side flange body 92 or the outlet side flange body 93. For example, in the case that the exhaust gas comes into contact with the inner hole surface of the inlet side flange body 92 or the outlet side flange body 93 which tend to radiate heat, the temperature of the exhaust gas is lowered, the urea component in the exhaust gas is crystallized, and is attached to the inner hole surface of the inlet side flange body 92 or the outlet side flange body 93, the crystalline lump of the urea component is formed in the inner hole surface of the inlet side flange body 92 or the outlet side flange body 93, and a defect that the movement of the exhaust gas is obstructed tends to be generated. On the contrary, it is possible to inhibit the exhaust gas from coming into contact with the inner hole surface of the inlet side flange body 92 or the outlet side flange body 93 and it is possible to prevent the crystalline lump of the urea component from being formed in the inner hole surface of the inlet side flange body 92 or the outlet side flange body 93, by shielding the inner hole surface of the inlet side flange body 92 or the outlet side flange body 93 by the fitting small-diameter portion 89a, as shown in FIG. 10.

Figure 11:
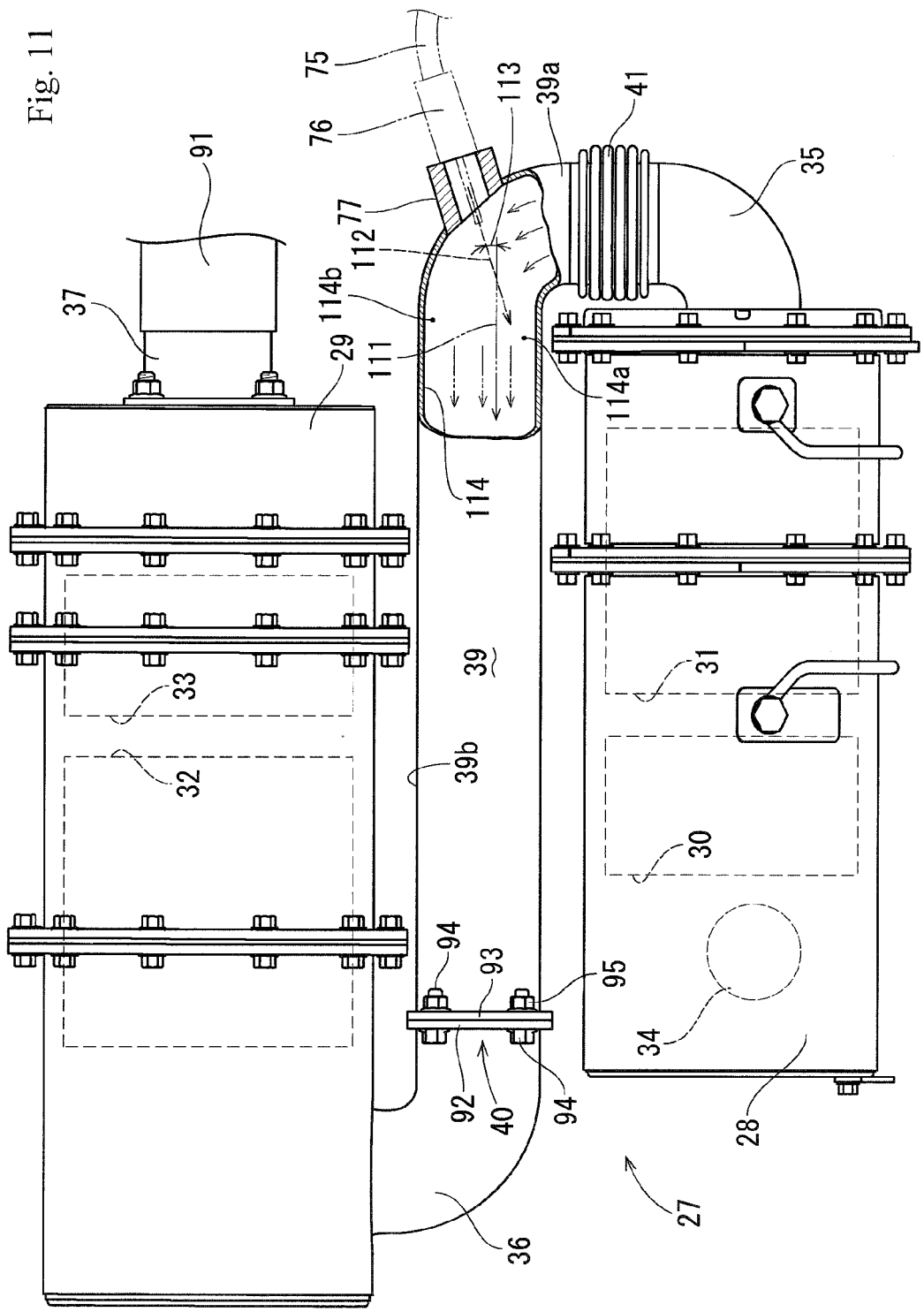
FIG. 11 is an explanatory view of an exhaust gas purification case.
Figure 12:
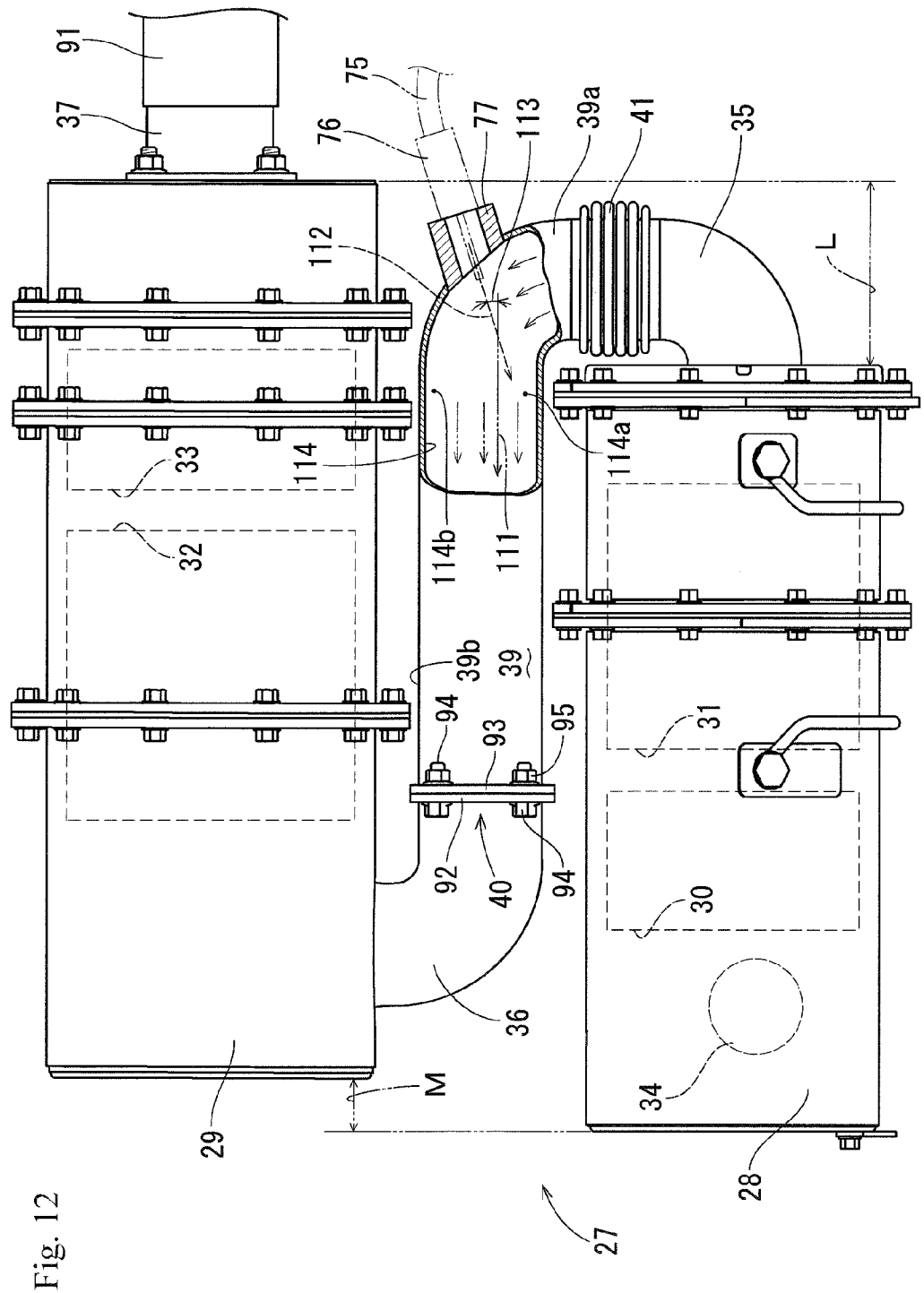
FIG. 12 is an explanatory view showing a modified example of the exhaust gas purification case.

Next, a description will be given of a structure of the urea mixing pipe 39 portion with reference to FIGS. 9 and 11. As shown in FIGS. 9 and 11, the urea mixing pipe 39 has an elbow pipe portion 39a which is connected to the bellows-like connection pipe 41, and a straight pipe portion 39b which is connected to the SCR inlet pipe 36 via the pipe bracket 40 and is formed into a long cylindrical shape. The injection pedestal 77 is fixed by welding to the elbow pipe portion 39a in the vicinity of a joint part between the elbow pipe portion 39a and the straight pipe portion 39b, and the urea water injection nozzle 76 is open toward the inner hole of the straight pipe portion 39b from the elbow pipe portion 39a side.

Further, as shown in FIG. 11, an urea water injecting direction 112 of the urea water injection nozzle 76 is inclined at a predetermined angle of inclination 113 (about 4 degrees) to the exhaust gas downstream side of the elbow pipe portion 39a in relation to a cylindrical axis line 111 of the cylindrical straight pipe portion 39b (an exhaust gas flowing direction within the straight pipe portion 39b). In other words, the urea water is injected from the urea water injection nozzle 76 toward an inner wall surface 114a in an inner diameter side of a curve of the elbow pipe portion 39a in an inner wall surface 114 of the straight pipe portion 39b. The urea water injected from the urea water injection nozzle 76 is diffused toward an inner wall surface 114b side in an outer diameter side of the curve of the elbow pipe portion 39a in the inner wall surface 114 of the straight pipe portion 39b on the basis of a discharge pressure of the exhaust gas moving from the elbow pipe portion 39a to the straight pipe portion 39b, and is mixed as the ammonia into the exhaust gas.

The angle of inclination 113 (the urea water injecting direction 112) of the urea water injection nozzle 76 in relation to the cylindrical axis line 111 of the straight pipe portion 39b is decided on the basis of the inner diameters of the elbow pipe portion 39a and the straight pipe portion 39b or a flow rate of the exhaust gas under a standard operation (an operation in a rated rotation of the diesel engine 1). For example, when the angle of inclination 113 is too large, the urea water is attached to the inner wall surface 114a in the inner diameter side of the curve of the elbow pipe portion 39a and there is a defect that the urea tends to be crystallized in the inner wall surface 114a portion in the inner diameter side of the curve. Further, when the angle of inclination 113 is too small, the urea water is attached to the inner wall surface 114b in the outer diameter side of the curve of the elbow pipe portion 39a, and there is a defect that the urea tends to be crystallized in the inner wall surface 114b portion in the outer diameter side of the curve.

Figure 13:
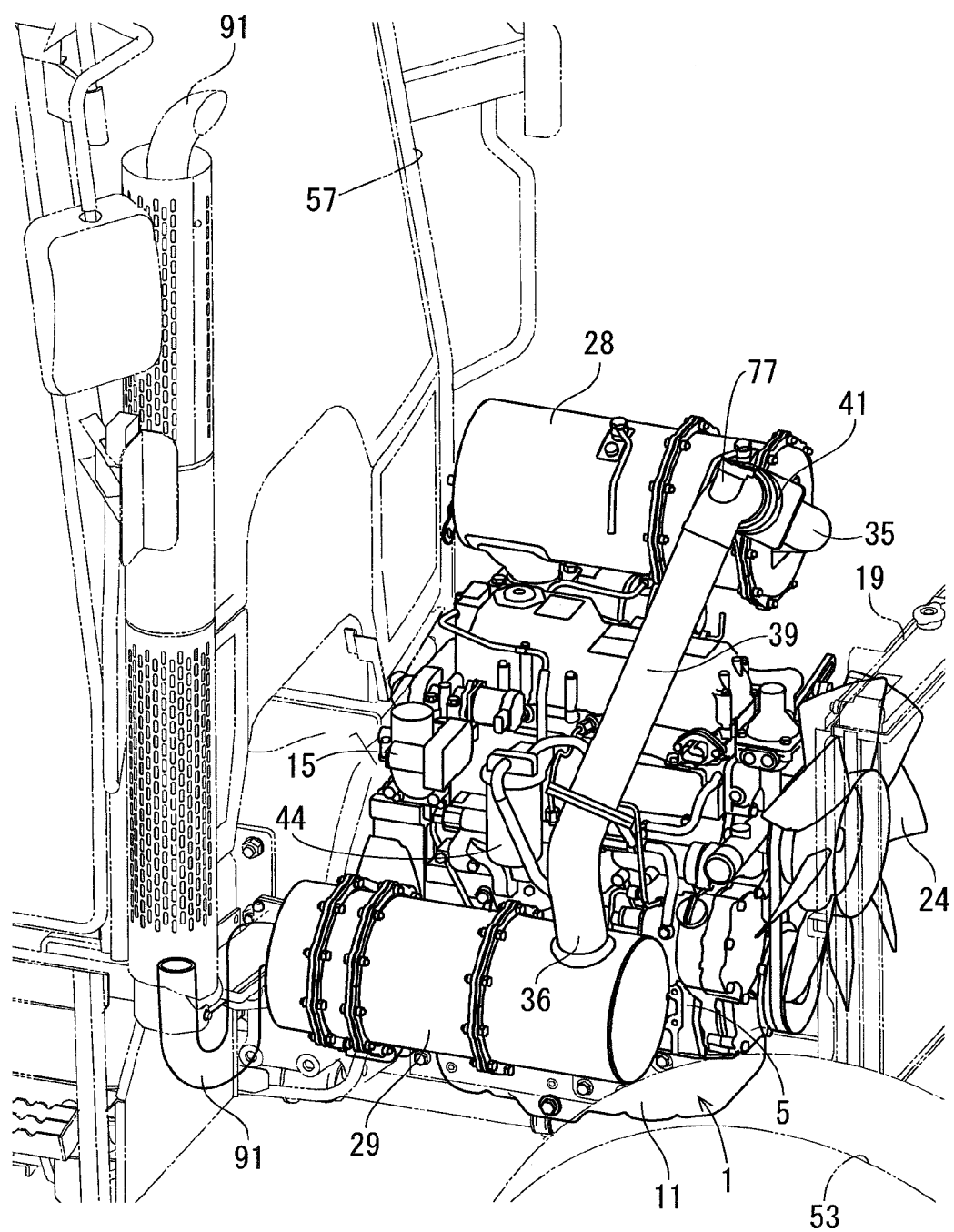
FIG. 13 is a perspective view of an engine portion of a tractor showing a second embodiment.

Next, a description will be given of an arrangement structure of the first case 28 and the second case 29 according to a second embodiment with reference to FIG. 13. As shown in FIG. 13, the first case 28 is attached to the upper face side of the diesel engine 1, and the second case 29 is attached to the travel machine body 52 in a side in which the intake manifold 3, the exhaust gas recirculation device 15 and the fuel filter 44 are installed, in the lateral side of the diesel engine 1. In other words, the second case 29 is attached to the travel machine body 52 in the right lower portion of the diesel engine 1, the second case 29 is arranged between the right front face of the cabin 57 and the right front wheel 53, the urea mixing pipe 39 is extended above the diesel engine 1 transversely, and the tail pipe 91 is connected to the rear end side of the second case 29.

As shown in FIG. 13, the first case 28 is attached to the upper face side of the diesel engine 1, and the second case 29 is attached to the side in which the intake manifold 3 is installed, in the lateral side of the diesel engine 1. Therefore, it is possible to compactly arrange the tail pipe 91 connected to the exhaust gas outlet side of the second case 29, and the second case 29 so as to be close to each other, in one lateral side of the machine body (the machine body right side) in the side where the operator gets on and off at a low frequency in the tractor 51. Further, it is possible to improve the resupplying workability of the fuel for the diesel engine 1 or the urea aqueous solution for purifying the exhaust gas by arranging the fuel tank 45 for the diesel engine 1 or the urea water tank 71 for purifying the exhaust gas in the other lateral side in which the operator gets on and off at a high frequency (the machine body left position which is spaced from the high temperature portion such as the tail pipe) in the tractor 51.

Next, a description will be given of arrangement structures of the first case 28 and the second case 29 according to a third embodiment and a fourth embodiment, with reference to FIGS. 14 and 15. In the third embodiment shown in FIG. 14, the second case 29 is arranged in an upper side of the first case 28 in a side in which the exhaust manifold 6 of the diesel engine 1 is installed. The first case 28 and the second case 29 can be arranged in a biased manner in an opposite left side surface portion to the side in which the intake manifold 3, the exhaust gas recirculation device 15 and the fuel filter 44 are installed, in the lateral direction of the diesel engine 1, and the second case 29 and the urea mixing pipe 39 in the low temperature side (the exhaust gas downstream side) can be supported above the first case 28 in the high temperature side (the exhaust gas upstream side). Accordingly, it is possible to reduce temperature decrease of the second case 29 and the urea mixing pipe 39 in the work in the cold district, and it is possible to properly maintain the exhaust gas purification function.

Figure 15:
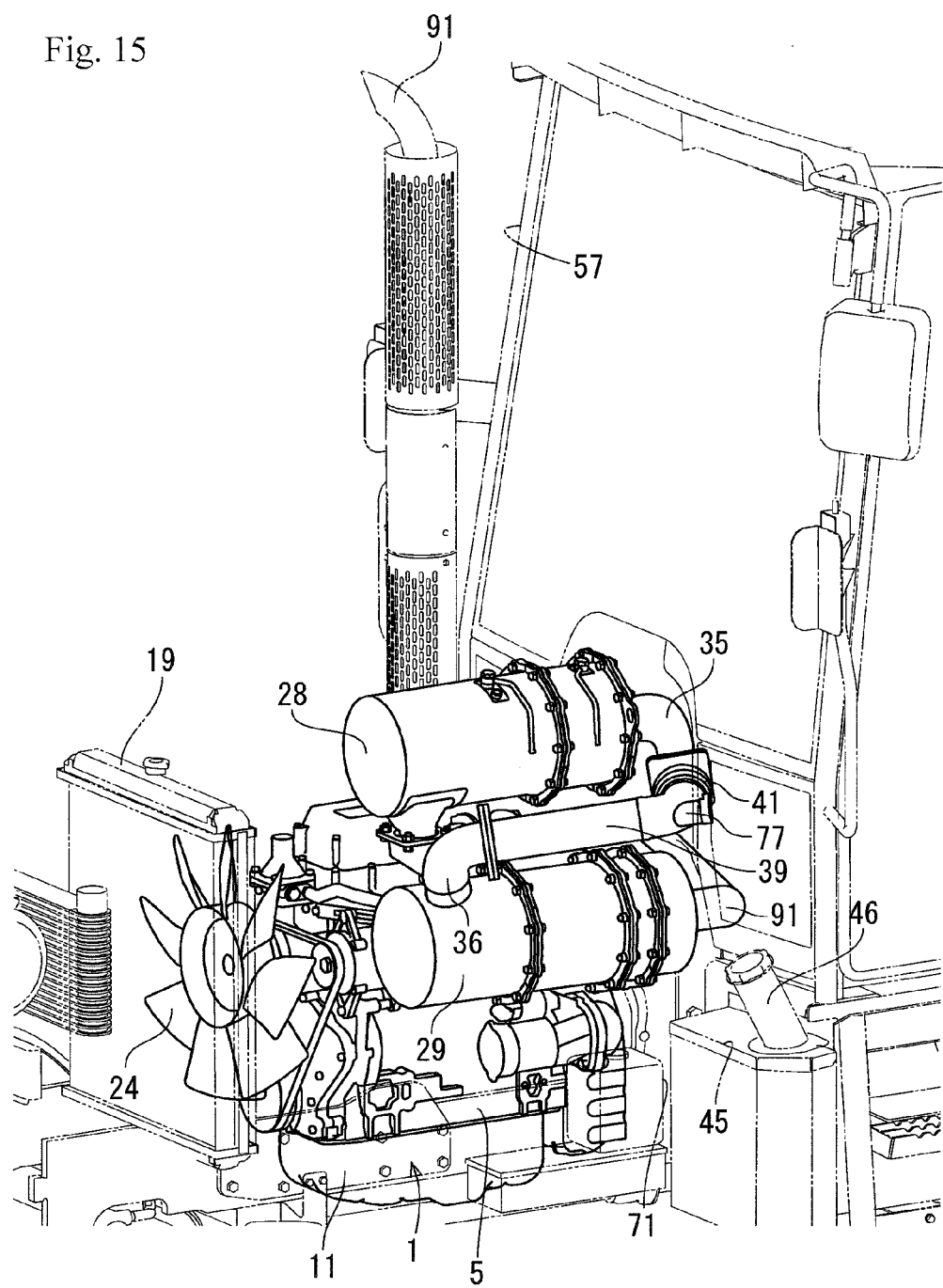
FIG. 15 is a perspective view of an engine portion of a tractor showing a fourth embodiment.

Meanwhile, in the fourth embodiment shown in FIG. 15, the second case 29 is arranged in a lower side of the first case 28 in a side in which the exhaust manifold 6 of the diesel engine 1 is installed. The second case 29 and the urea mixing pipe 39 in the low temperature side (the exhaust gas downstream side) can be supported below the first case 28 in the high temperature side (the exhaust gas upstream side) connected to the exhaust manifold 6. For example, the second case 29 can be attached so as to be close to the fuel tank 45 or the urea water tank 71 which is mounted to the travel machine body 52. As a result, it is possible to make a hood height which is necessary for installing the first case 28 and the second case 29 low.

Figure 14:
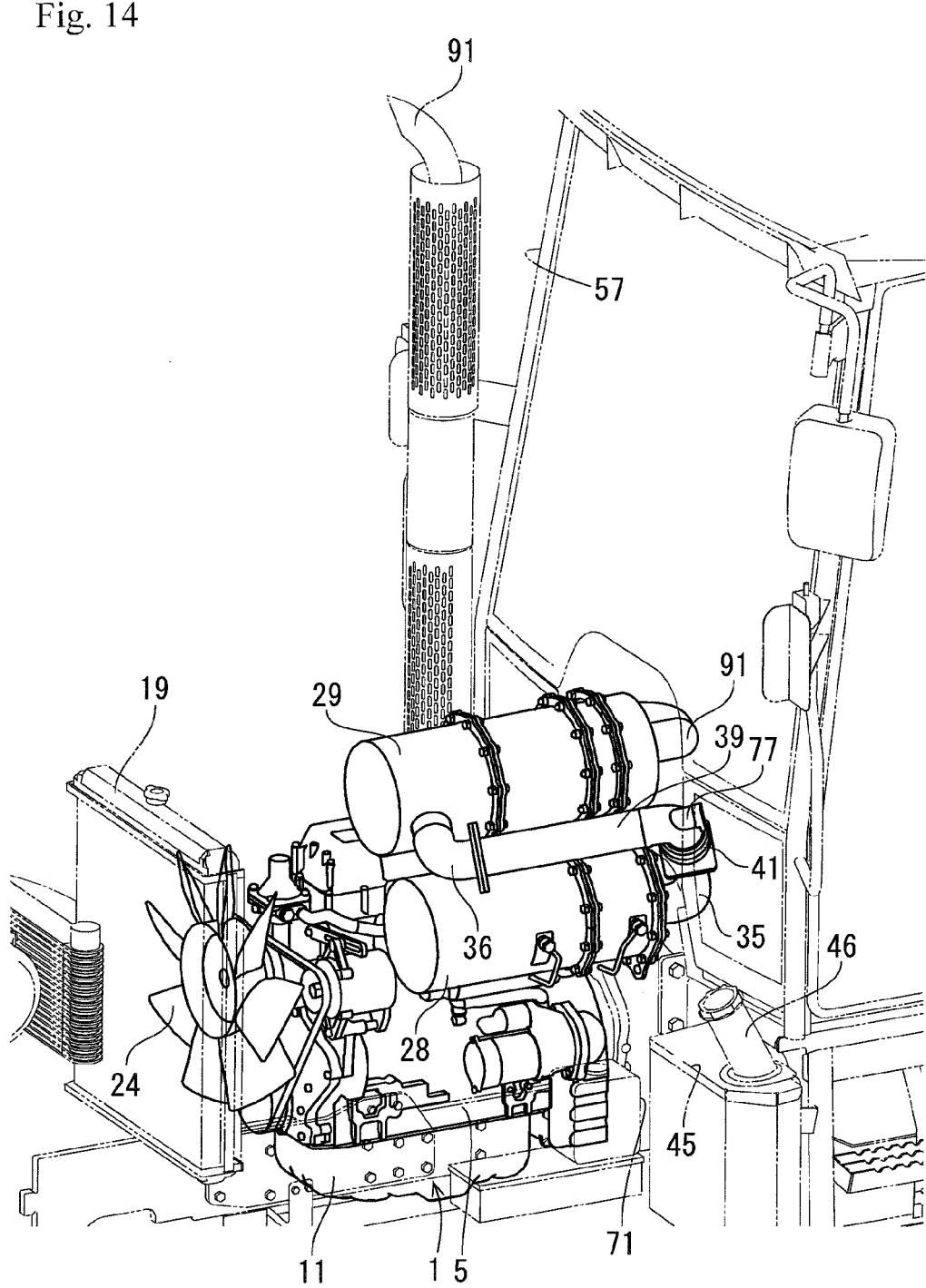
FIG. 14 is a perspective view of an engine portion of a tractor showing a third embodiment.

Further, in the case that the second case 29 is arranged in an upper side or a lower side of the first case 28 in the side in which the exhaust manifold 6 of the diesel engine 1 is installed, as shown in FIGS. 14 and 15, the first case 28 and the second case 29 can be compactly installed in the exhaust manifold 6 side of the diesel engine 1 so as to be close to each other. It is possible to easily maintain the temperature of the first case 28 or the second case 29 at a temperature which is necessary for purifying the exhaust gas, by the exhaust head in the exhaust manifold 6 side of the diesel engine 1.

Next, a description will be given of an arrangement structure of the first case 28 and the second case 29 according to a fifth embodiment with reference to FIGS. 16 to 24.

In the first embodiment, the first case 28 and the second case 29 are arranged in the upper face side of the diesel engine 1 in such a manner that the exhaust gas moving directions of the first case 28 and the second case 29 are parallel to the axis of the output shaft 4 (the crank shaft) of the diesel engine 1. However, in the fifth embodiment, the first case 28 and the second case 29 are arranged in the upper face side of the diesel engine 1 in such a manner that the exhaust gas moving directions of the first case 28 and the second case 29 are orthogonal to the axis of the output shaft 4 (the crank shaft) of the diesel engine 1.

Figure 16:
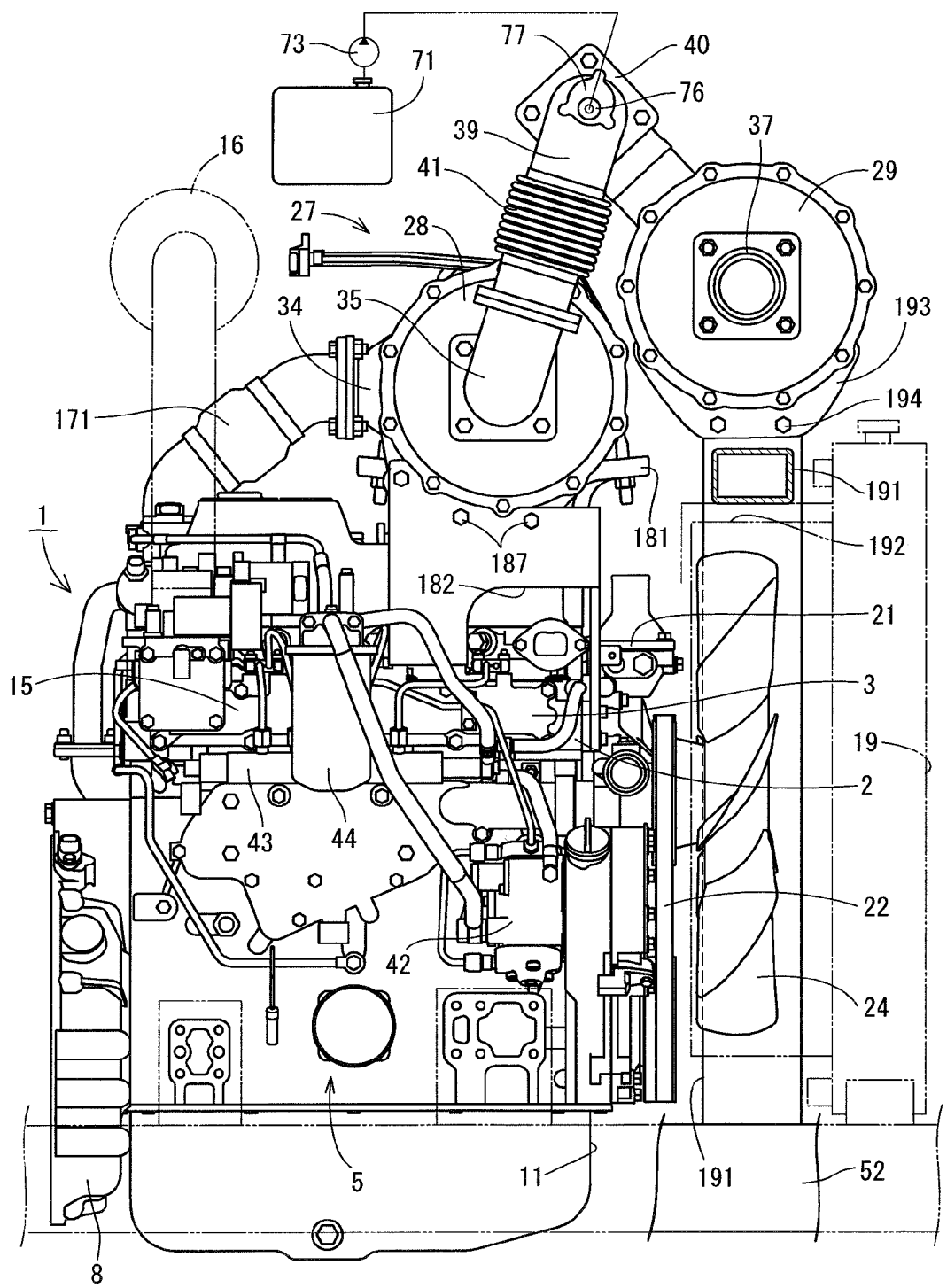
FIG. 16 is a right side elevational view of a diesel engine showing a fifth embodiment.
Figure 17:
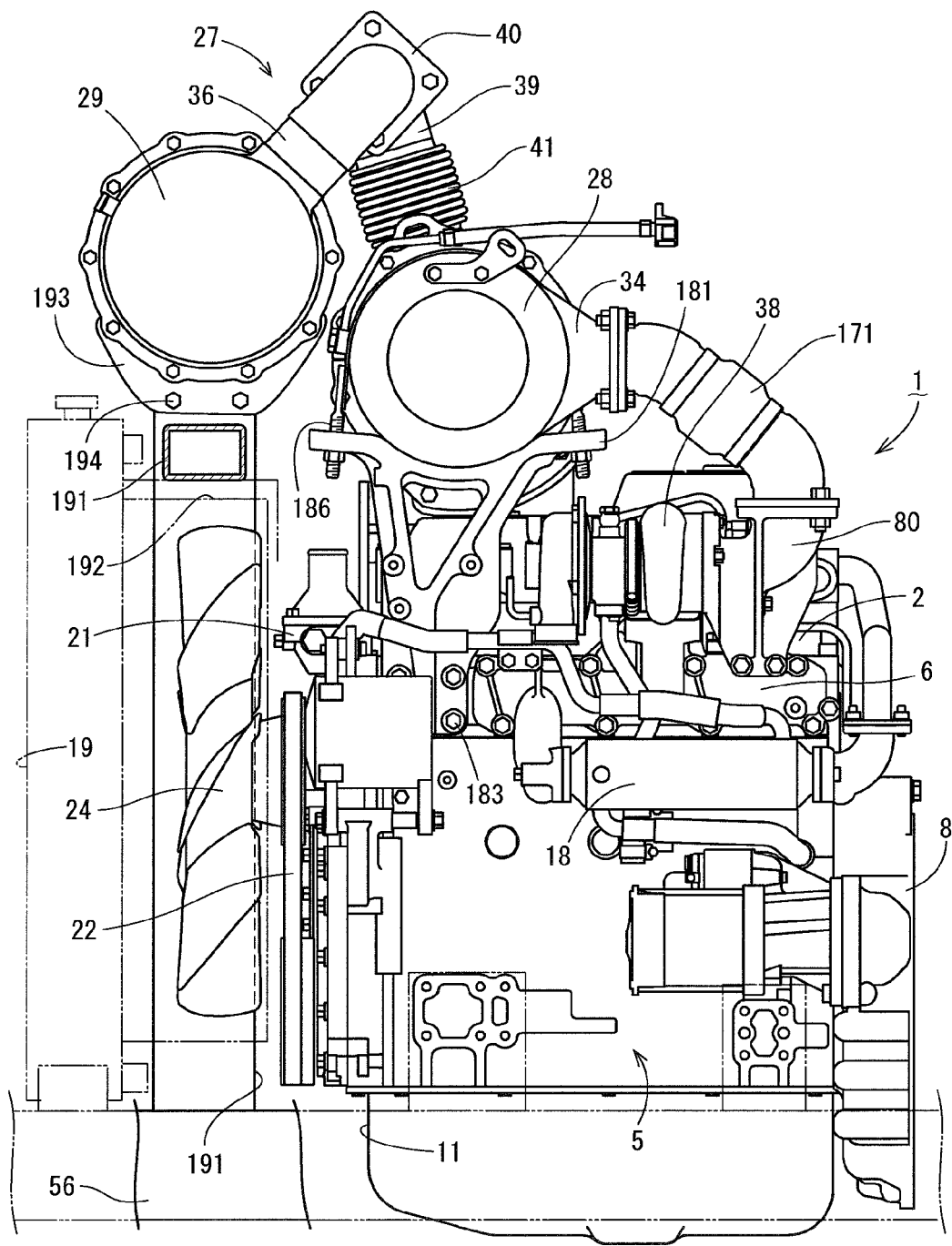
FIG. 17 is a left side elevational view of the same.
Figure 18:
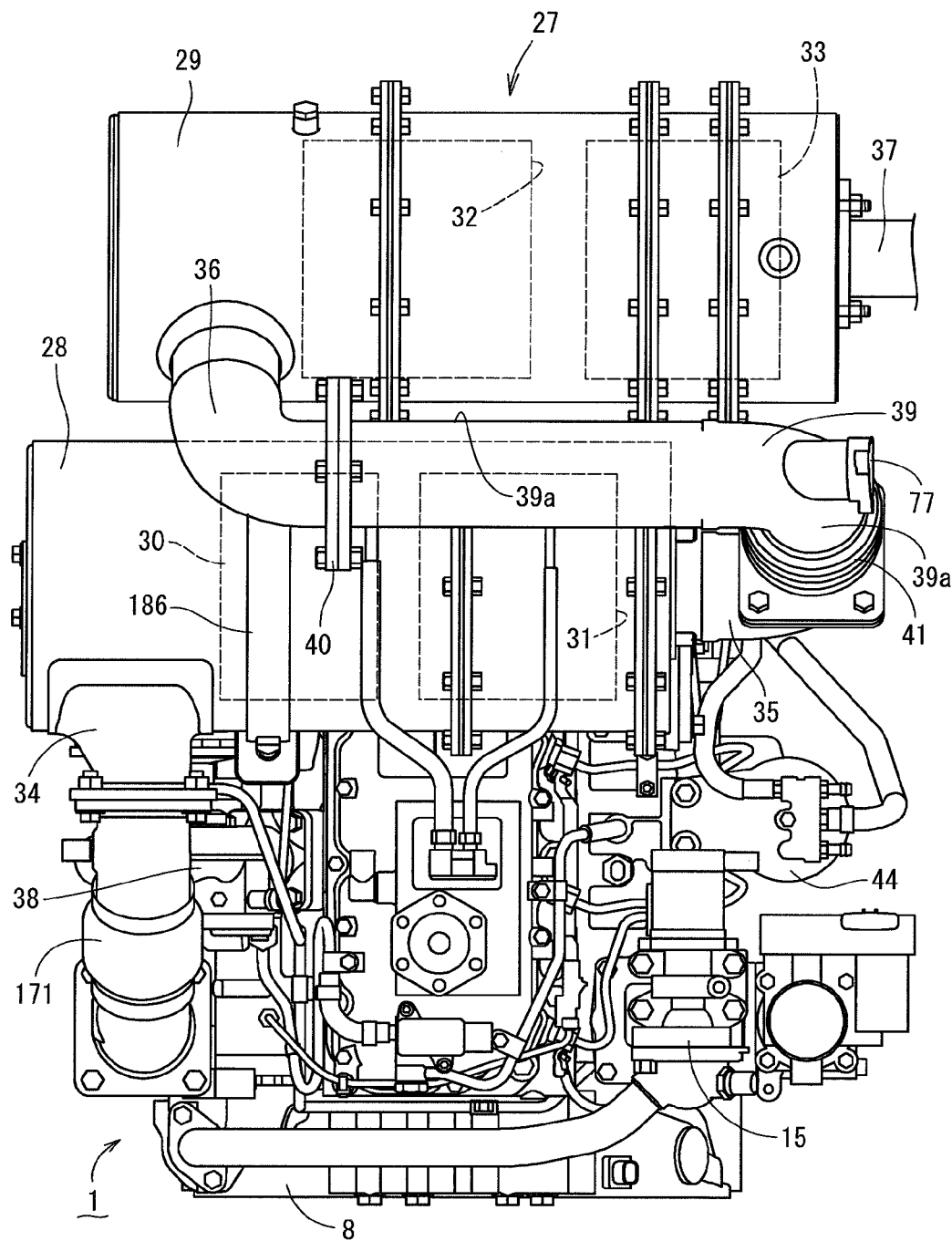
FIG. 18 is a plan view of the same.
Figure 19:
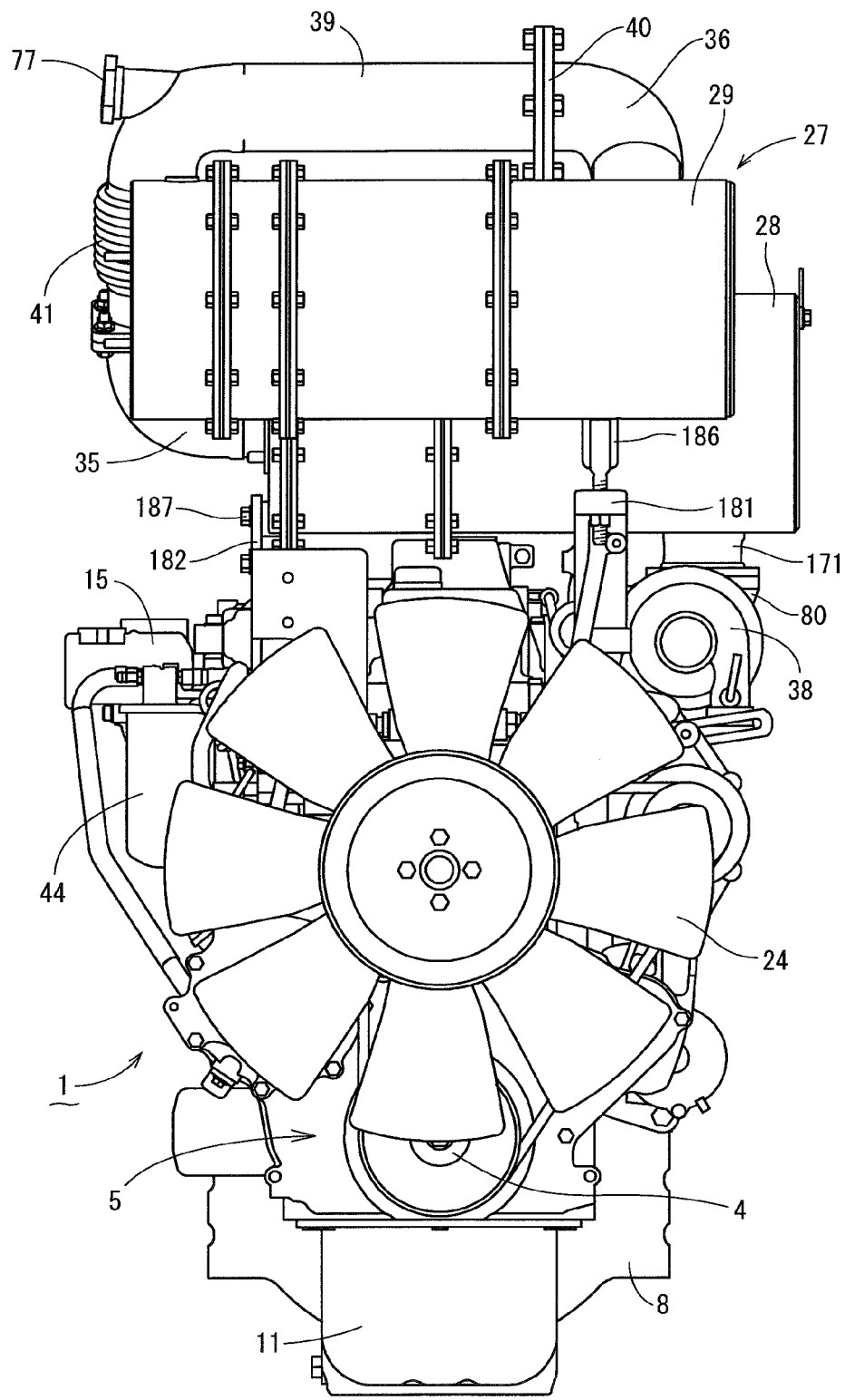
FIG. 19 is a front elevational view of the same.
Figure 20:
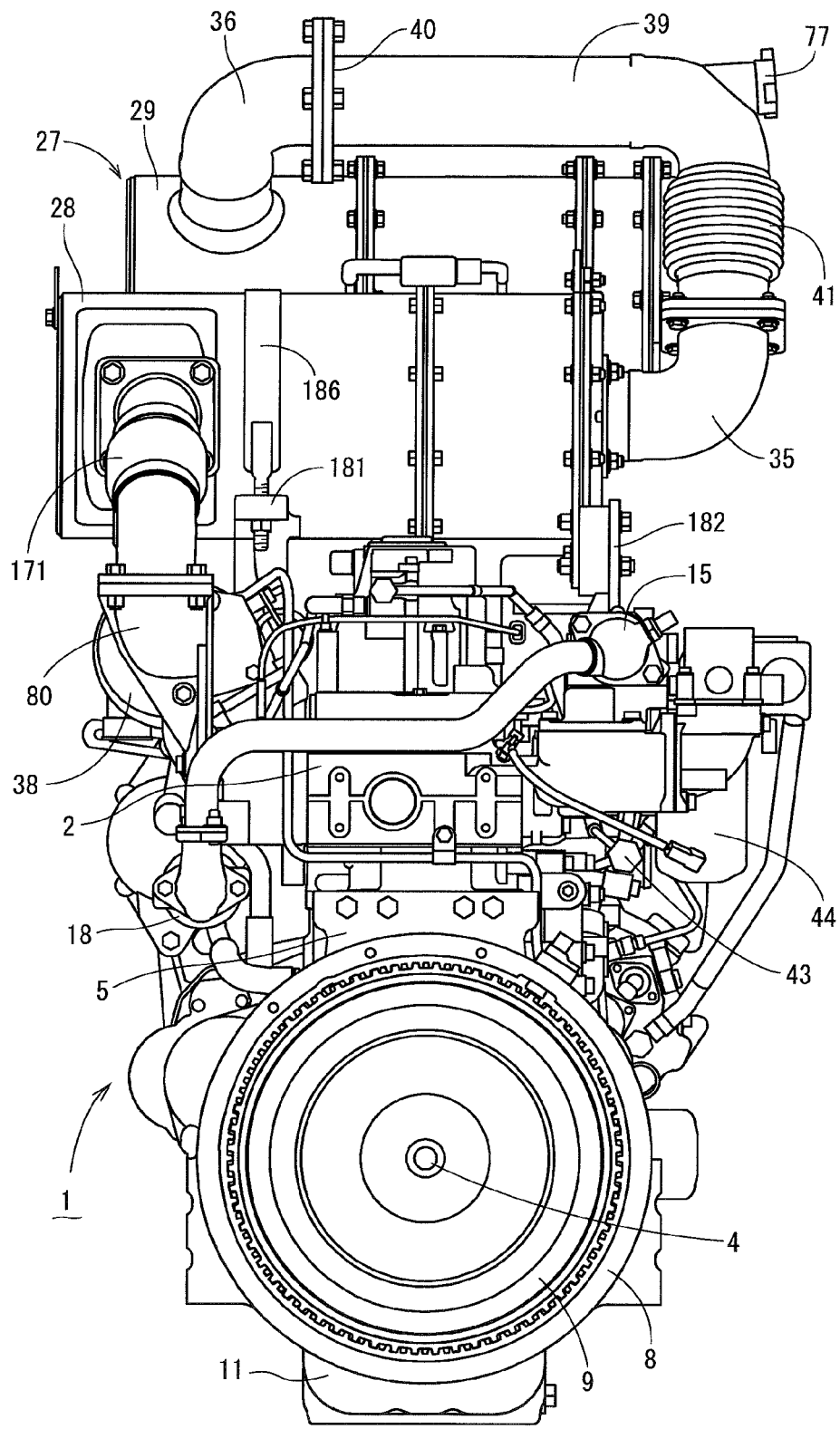
FIG. 20 is a back elevational view of the same.
Figure 21:
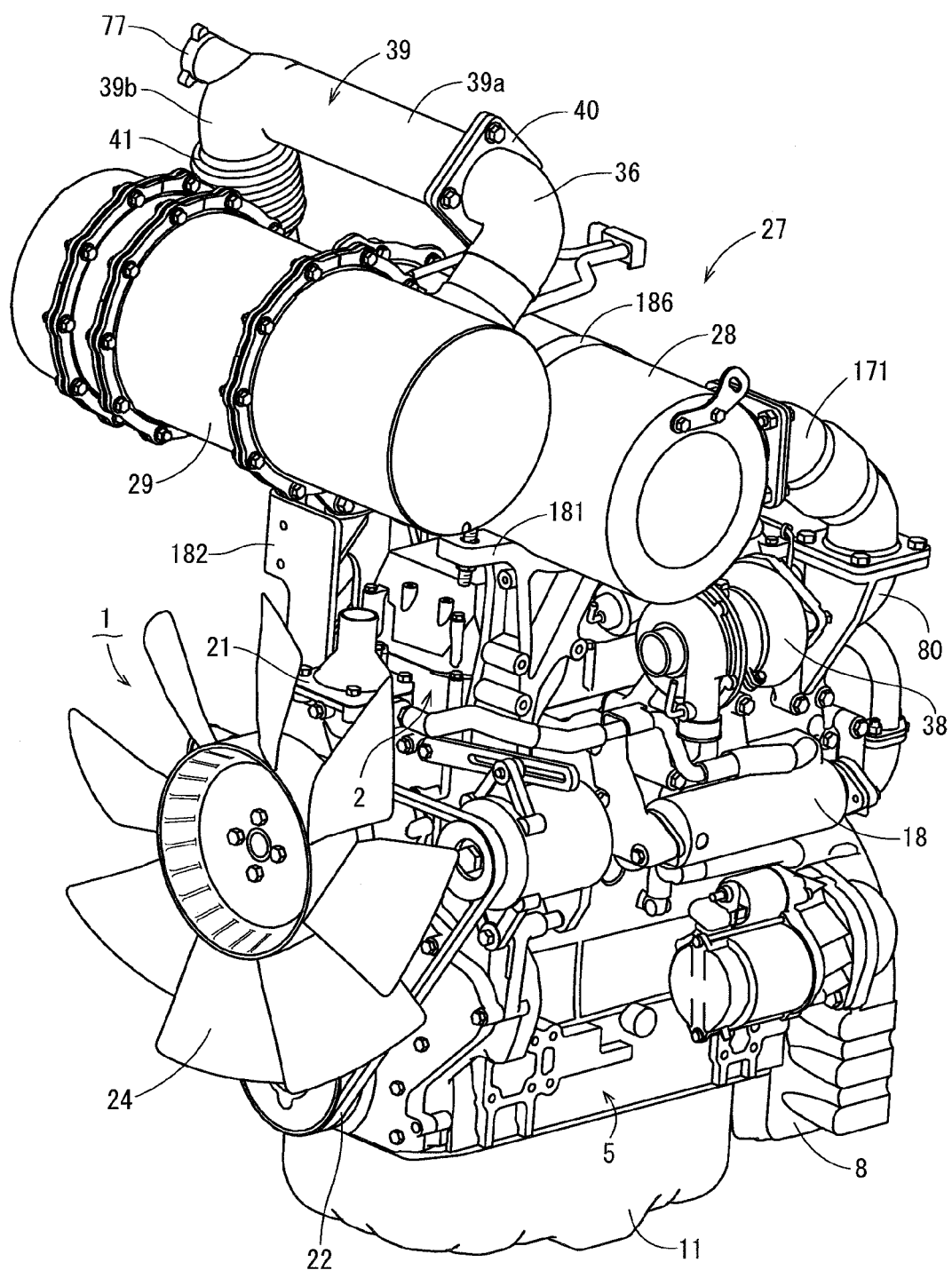
FIG. 21 is a left side perspective view of the same as seen from a front side.
Figure 22:
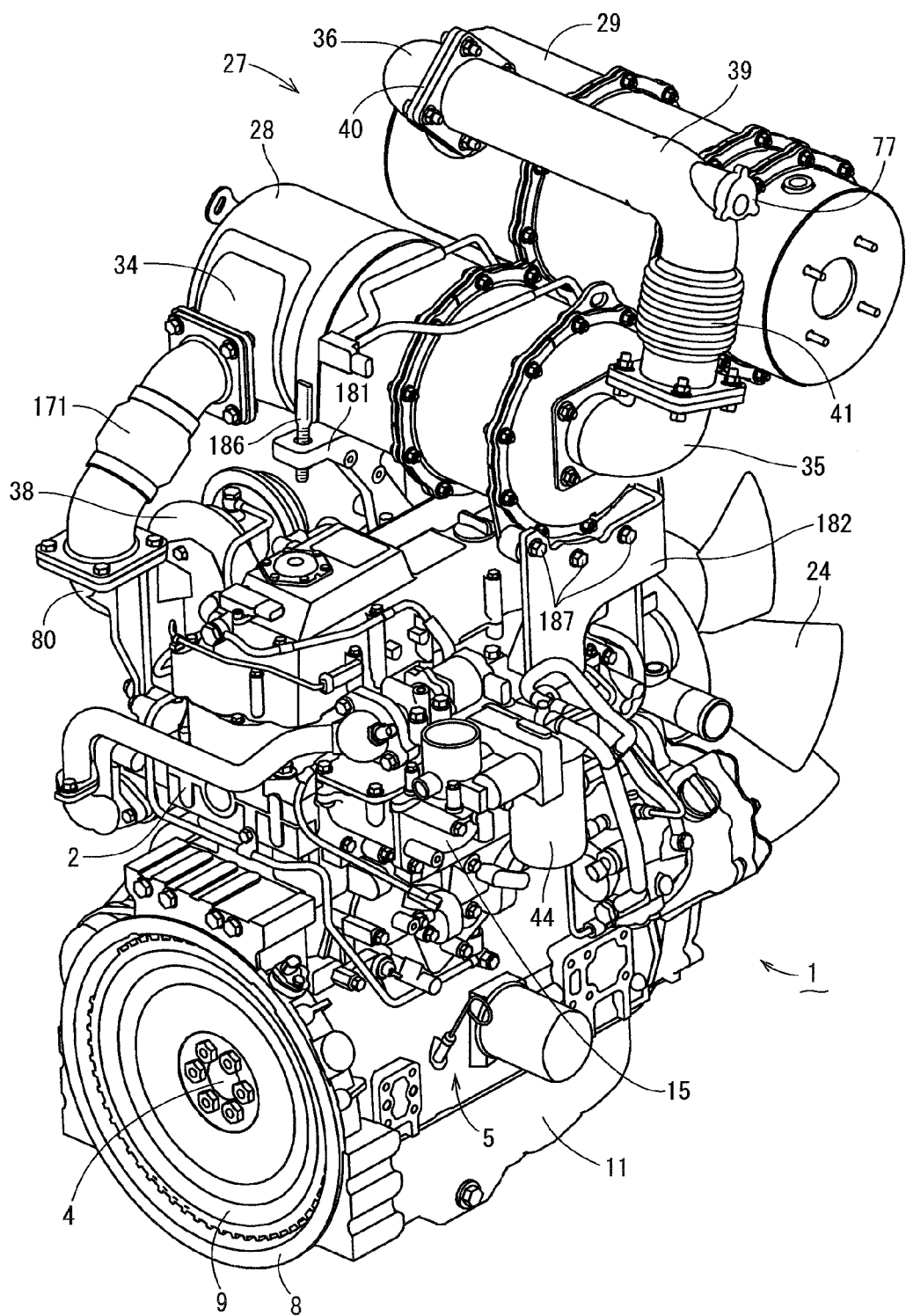
FIG. 22 is a right side perspective view of the same as seen from a rear side.

A description will be given of the fifth embodiment with reference to the accompanying drawings. FIG. 16 is a right side elevational view of a structure in which the intake manifold of the diesel engine is installed, FIG. 17 is a left side elevational view of a structure in which the exhaust manifold of the diesel engine is installed, FIG. 18 is a plan view of the same, FIG. 19 is a front elevational view of a structure in which the cooling fan of the diesel engine is installed, FIG. 20 is a back elevational view of a structure in which the flywheel of the diesel engine is installed, and FIGS. 21 and 22 are perspective views of the diesel engine. A description will be given of an overall structure of the diesel engine 1 with reference to FIGS. 16 to 22.

As shown in FIGS. 16 to 22, the intake manifold 3 is arranged in one side surface of the cylinder head 2 of the diesel engine 1. The cylinder head 2 is mounted on the cylinder block 5 which has the engine output shaft 4 (the crank shaft) and the piston (not shown) built-in. The exhaust manifold 6 is arranged in the other side surface of the cylinder head 2. The front end and the rear end of the engine output shaft 4 are protruded out of the front face and the rear face of the cylinder block 5.

Further, the flywheel housing 8 is firmly fixed to the rear face of the cylinder block 5. The flywheel 9 is provided within the flywheel housing 8. The flywheel 9 is axially supported to the rear end side of the engine output shaft 4. The power of the diesel engine 1 is taken out via the flywheel 9. Further, the oil pan 11 is arranged in the lower face of the cylinder block 5.

As shown in FIGS. 16 and 18, the exhaust gas recirculation device (EGR) 15 taking the exhaust gas for recirculation is arranged in the intake manifold 3. The air cleaner 16 is connected to the intake manifold 3. The external air which is dust removed and purified by the air cleaner 16 is fed to the intake manifold 3, and be supplied to each of the cylinders of the diesel engine 1.

According to the structure mentioned above, since a part of the exhaust gas discharged out of the diesel engine 1 to the exhaust manifold 6 is flowed back to each of the cylinders of the diesel engine 1 from the intake manifold 3 via the exhaust gas recirculation device 15, the combustion temperature of the diesel engine 1 decreases, the discharge amount of the nitrogen oxide (NOx) from the diesel engine 1 is reduced, and the fuel consumption of the diesel engine 1 is improved.

The cooling water pump 21 circulating the cooling water into the cylinder block 5 and the radiator 19 is arranged in the installation side of the cooling fan 24 in the diesel engine 1. The cooling water pump 21 and the cooling fan 24 are connected to the engine output shaft 4 via the V-belt 22, and the cooling water pump 21 and the cooling fan 24 are driven. The cooling water is fed into the cylinder block 5 from the cooling water pump 21, and the diesel engine 1 is cooled by the wind of the cooling fan 24.

As shown in FIGS. 16 to 22, there are provided the first case 28 which serves as the diesel particulate filter (the DPF case) removing the particulate matter in the exhaust gas of the diesel engine 1, and the second case 29 which serves as the urea selective catalyst reduction system (the SCR case) removing the nitrogen oxide in the exhaust gas of the diesel engine 1, as the exhaust gas purification device 27 for purifying the exhaust gas which is discharged out of each of the cylinders of the diesel engine 1. As shown in FIG. 18, the first case 28 is inward provided with the oxidation catalyst 30 and the soot filter 31. The second case 29 is inward provided with the SCR catalyst 32 for urea selective catalyst reduction, and the oxidation catalyst 33.

The exhaust gas discharged out of each of the cylinders of the diesel engine 1 to the exhaust manifold 6 is discharged to the external portion via the exhaust gas purification device 27. The exhaust gas purification device 27 is structured such as to reduce the carbon monoxide (CO), the carbon hydride (HC), the particulate matter (PM) and the nitrogen oxide (NOx) in the exhaust gas of the diesel engine 1.

The first case 28 and the second case 29 are constructed as the long cylindrical shape extending long in a horizontal direction which is orthogonal to the output shaft (the crank shaft) 4 of the diesel engine 1 in a plan view. The DPF inlet pipe 34 taking the exhaust gas therein, and the DPF outlet pipe 35 discharging the exhaust gas are provided in both sides (one end side and the other end side in the exhaust gas moving direction) of the cylindrical shape of the first case 28. In the same manner, the SCR inlet pipe 36 taking the exhaust gas therein, and the SCR outlet pipe 37 discharging the exhaust gas are provided in both sides (one end side and the other end side in the exhaust gas moving direction) of the second case 29.

Further, the supercharger 38 forcibly feeding the air to the diesel engine 1 is arranged in the exhaust gas outlet of the exhaust manifold 6. The DPF inlet pipe 34 is communicated with the exhaust manifold 6 via the supercharger 38, and the exhaust gas of the diesel engine 1 is introduced into the first case 28. Meanwhile, the SCR inlet pipe 36 is connected to the DPF outlet pipe 35 via the urea mixing pipe 39, and the exhaust gas of the first case 28 is introduced into the second case 29. The exhaust gas outlet side of the end portion of the urea mixing pipe 39 is detachably connected to the SCR inlet pipe 36 via the pipe bracket 40.

As shown in FIG. 16, there are provided the fuel pump 42 and the common rail 43 which connect the fuel tank 45 to each of the injectors (not shown) for the multiple cylinders of the diesel engine 1. The common rail 43 and the fuel filter 44 are arranged in the installation side of the intake manifold 3 of the cylinder head 2, and the fuel pump 42 is arranged in the cylinder block 5 below the intake manifold 3. Each of the injectors has the electromagnetic opening and closing control type fuel injection valve (not shown).

The fuel within the fuel tank 45 is sucked into the fuel pump 42 via the fuel filter 44, the common rail 43 is connected to the discharge side of the fuel pump 42, and the cylindrical common rail 43 is connected to each of the injectors of the diesel engine 1.

According to the structure mentioned above, the fuel in the fuel tank 45 is pressure fed to the common rail 43 by the fuel pump 42, the high-pressure fuel is stored in the common rail 43, and the fuel injection valve of each of the injectors is controlled to be opened and closed. As a result, the high-pressure fuel within the common rail 43 is injected to each of the cylinders of the diesel engine 1. Accordingly, it is possible to precisely control the injection pressure, the injection timing and the injection period (the injection amount) of the fuel by electronically controlling the fuel injection valve of each of the injectors. Therefore, it is possible to reduce the nitrogen oxide (NOx) discharged out of the diesel engine 1.

Figure 23:
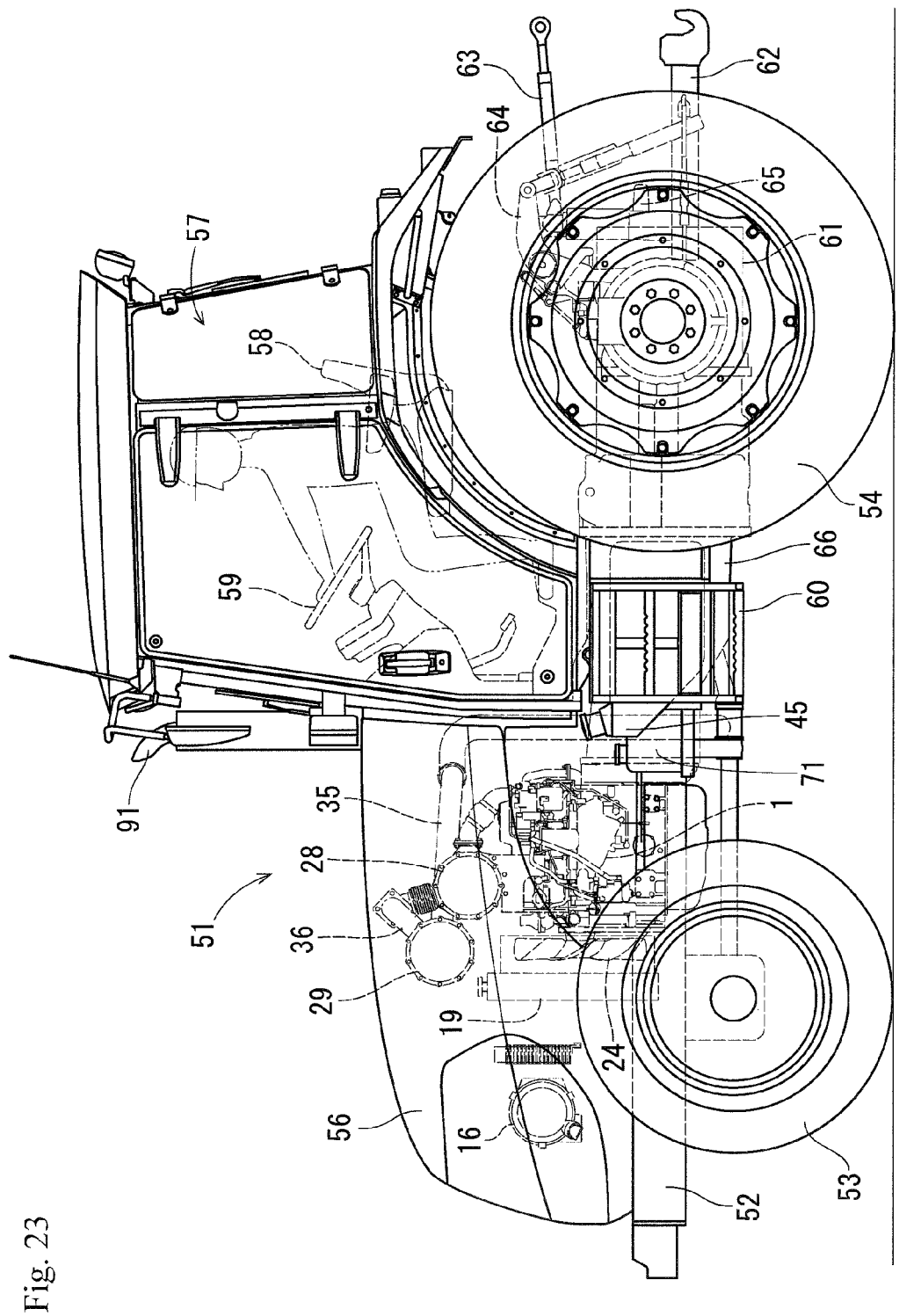
FIG. 23 is a left side elevational view of a working vehicle of the same.
Figure 24:
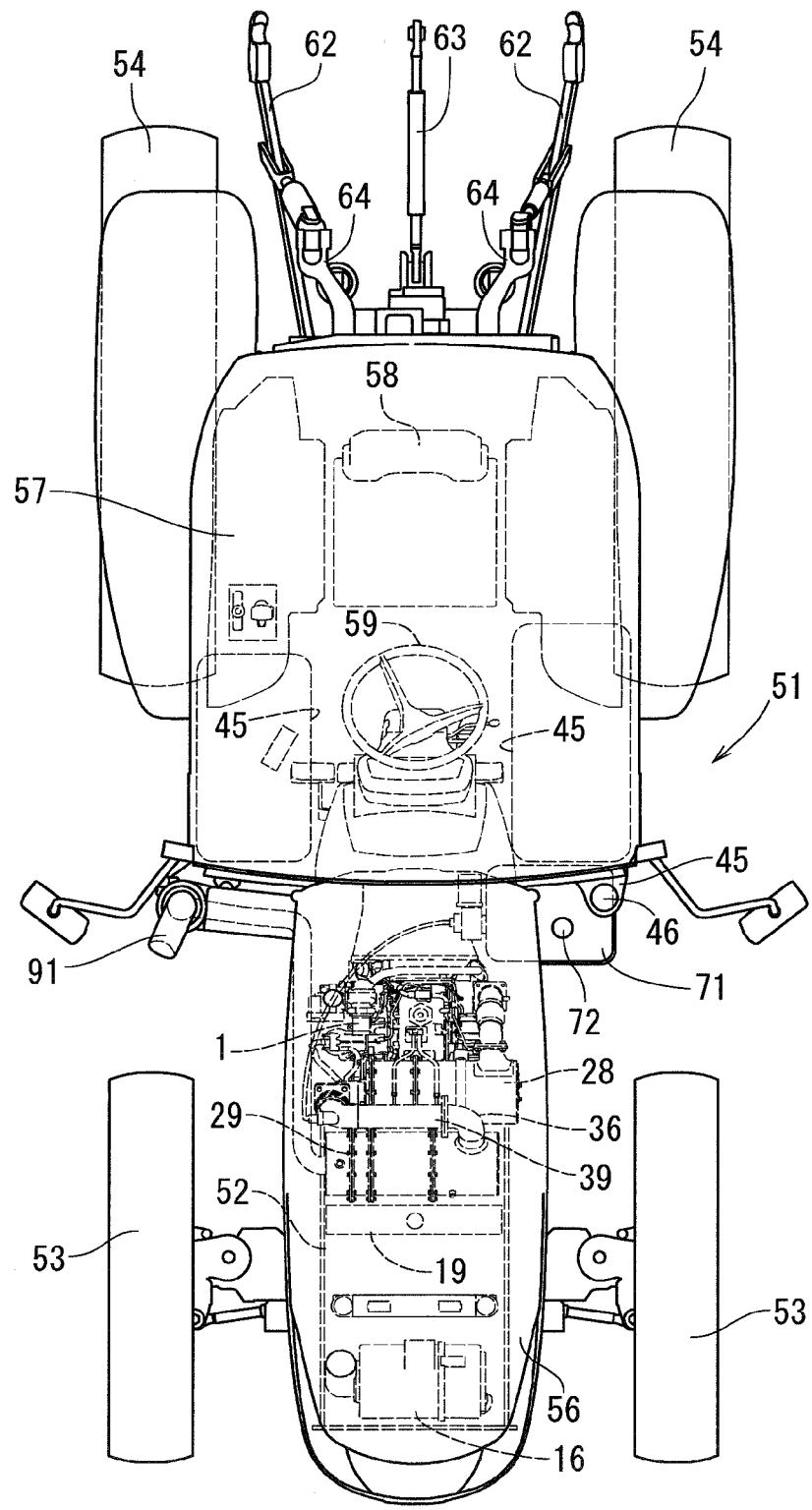
FIG. 24 is a plan view of the working vehicle of the same.

Next, a description will be given of the tractor 51 according to the fifth embodiment mounting the diesel engine 1 shown in FIGS. 16 to 22 thereon with reference to FIGS. 23 and 24. The tractor 51 according to the fifth embodiment serving as the working vehicle is structured, as shown in FIGS. 23 and 24, such that the travel machine body 52 is supported by a pair of right and left front wheels 53 and a pair of right and left rear wheels 54, the diesel engine 1 is mounted to the front portion of the travel machine body 52, and the tractor 51 carries out the forward and backward moving travel by driving the rear wheels 54 and the front wheels 53 by the diesel engine 1, in the same manner as the first embodiment shown in FIGS. 4 and 5. The upper face side and the right and left side face sides of the diesel engine 1 are covered by the openable hood 56.

Meanwhile, the cabin 57 on which the operator gets is installed in the rear side of the hood 56 in the upper face of the travel machine body 52. The inner portion of the cabin 57 is provided with the control seat 58 on which the operator seats, and the control device such as the control steering wheel 59 which serves as the steering means. Further, a pair of right and left steps 60 for the operator to get on and off are provided in the right and left outer portions of the cabin 57, and the fuel tank 45 supplying the fuel to the diesel engine 1 is provided in the inner side than the step 60 and in the lower side than the bottom portion of the cabin 57.

Further, the travel machine body 52 is provided with the transmission case 61 for shifting the output of the diesel engine 1 so as to transmit to the rear wheels 54 (the front wheels 53). The tilling working machine (not shown) or the like is connected to the rear portion of the transmission case 61 via the lower link 62, the top link 63 and the lift arm 64 so as to be movable up and down. Further, the rear side surface of the transmission case 61 is provided with the PTO shaft 65 which drives the tilling working machine or the like. The travel machine body 52 of the tractor 51 is constructed by the diesel engine 1, the transmission case 61 and the clutch case 66 connecting them.

A description will be given of a structure for discharging the exhaust gas of the diesel engine 1 with reference to FIGS. 1, 3 and 8. As shown in FIGS. 1 and 3, one end side of a gas discharge pipe 171 made of a flexible heat resisting rubber is connected to the exhaust gas outlet pipe 80 of the supercharger 38, the other end side of the gas discharge pipe 171 is connected to the DPF inlet pipe 34, the first case 28 is communicated with the supercharger 38 via the gas discharge pipe 171, and the exhaust gas of the exhaust manifold 6 is moved to the first case 28 from the supercharger 38.

Further, one end side of the bellows-like connection pipe 41 made of metal is connected to the DPF outlet pipe 35, the exhaust gas inlet side (the elbow pipe portion 39a in FIGS. 11 and 18) of the urea mixing pipe 39 is integrally arranged in the other end side of the bellows-like connection pipe 41, the DPF outlet pipe 35 is connected to one end side of the urea mixing pipe 39 via the bellows-like connection pipe 41, and the SCR inlet pipe 36 is connected to the exhaust gas outlet side (the straight pipe portion 39b in FIGS. 11 and 18) of the urea mixing pipe 39 via the pipe bracket 40. In other words, the exhaust gas moves from the first case 28 to the second case 29 by connecting the SCR inlet pipe 36 to the DPF outlet pipe 35 via the bellows-like connection pipe 41 and the urea mixing pipe 39 and communicating the second case 29 with the first case 28. The bellows-like connection pipe 41 is formed into a bellows shape so as to be foldable and extendable, and is structured such that an assembling dimension error of the first case 28 and the second case 29 is corrected by deforming the bellows-like connection pipe 41 when assembling the first case 28 and the second case 29.

As shown in FIGS. 16, 23 and 24, there are provided the urea water tank 71 which stores the urea water, the urea water injection nozzle 76 for supplying the urea, and the urea water injection pump 73 which pressure feeds the urea water in the urea water tank 71 to the urea water injection nozzle 76. In the same manner as the first embodiment shown in FIGS. 4 and 5, the urea water tank 71 is inward provided in the travel machine body 52 between the diesel engine 1 and the fuel tank 45. The urea water injection pump 73 is driven by the output of the electric motor 74. The urea water injection nozzle 76 is arranged in the injection pedestal 77 of the urea mixing pipe 39.

According to the structure mentioned above, the urea water within the urea water tank 71 is pressure fed to the urea water injection nozzle 76 from the urea water injection pump 73, the urea water is injected into the urea mixing pipe 39 from the urea water injection nozzle 76, and the urea water from the urea water injection nozzle 7 is mixed into the exhaust gas from the diesel engine 1 in the inner portion of the urea mixing pipe 39. The exhaust gas mixed with the urea water passes through the second case 29 (the SCR catalyst 32 and the oxidation catalyst 33), and the nitrogen oxide (NOx) in the exhaust gas is reduced and is discharged out of the SCR outlet pipe 37 to the external portion. The ammonia gas is generated in the exhaust gas by hydrolysis by spraying the urea water into the exhaust gas, the ammonia gas and the exhaust gas are mixed so as to be introduced into the inner portion of the second case 29 from the SCR inlet pipe 36, and the nitrogen oxide (NOx) in the exhaust gas is removed by the catalysts 32 and 33 within the second case 29.

Next, a description will be given of an attaching structure of the exhaust gas purification device 27 with reference to FIGS. 16 to 22. There are provided a first support leg body 181 which supports the DPF inlet pipe 34 side of the first case 28, and a second support leg body 182 which supports the DPF outlet pipe 35 side of the first case 28. A lower end side of the first support leg body 181 is fastened by bolts 183 to a side surface closer to arrangement of the exhaust manifold 6 in the side surface of the cylinder head 2, and the first support leg body 181 is provided in a rising manner in one side surface of the cylinder head 2. The DPF inlet pipe 34 side of the first case 28 is firmly fixed detachably to an upper end side of the first support leg body 181 by a fastening band 186.

Further, a lower end side of the second support leg body 182 is fastened by bolts 184 and 184 to a side surface closer to the intake manifold 3 and a side surface closer to the cooling water pump 21, in the side surface of the cylinder head 2, and the second support leg body 182 is provided in a rising manner in the other side surface of the cylinder head 2. The DPF outlet pipe 35 side of the first case 28 is firmly fixed detachably to an upper end side of the second support leg body 182 by a fastening bold 187. In other words, the first support leg body 181 and the second support leg body 182 are provided in a rising manner in the facing side surfaces of the cylinder head 2, and the first case 28 is supported in a posture overstriding the cylinder head 2. The cylindrical first case 28 is structured such that a longitudinal direction (an exhaust gas moving direction) is directed to a horizontally transverse direction which intersects the engine output shaft 4.

Meanwhile, as shown in FIGS. 16 and 17, there is provided the radiator 19 which is arranged so as to face to the cooling fan 24. A machine body frame 191 is provided in a rising manner in the upper face side of the travel machine body 52. The radiator 19 and a wind tunnel plate body 192 are supported to the machine body frame 191. The cooling fan 24 is covered by the wind tunnel plate body 192, the cooling fan 24 sucks the outside air via the radiator 19, the cooling air is supplied toward the diesel engine 1 from the cooling fan 24 by guide of the wind tunnel plate body 192, and the cooling water is circulated to each of the portions of the diesel engine 1 and the radiator 19 by the cooling water pump 21, thereby cooling the diesel engine 1.

Further, as shown in FIGS. 16 and 17, an SCR support leg body 193 is protruded out of the second case 29 toward a lower face side, and a lower end side of the SCR support leg body 193 is detachably fastened by bolts 194 to the machine body frame 191. The second case 29 is arranged approximately just above the cooling fan 24. The wind tunnel plate body 192 serving as a shroud interposed between the upper face side of the cooling fan 24 and the lower face side of the second case 29. The upper end portions of the first support leg body 181 and the second support leg body 182 are provided at higher positions than the highest end portion of the wind tunnel plate body 192, the first case 28 is supported at a higher position than the highest end portion of the wind tunnel plate body 192, and the second case 29 is supported at a higher position than the first case 28 via the machine body frame 191 and the SCR support leg body 193.

The first case 28 and the second case 29 are extended in a lateral direction so that exhaust gas moving directions (axes of the cylindrical shape) of the first case 28 and the second case 29 are orthogonal to the output shaft 4 of the diesel engine 1 which is extended in the back-and-forth direction. The first case 28 and the second case 29 are arranged in parallel in the upper face side of the installation portion of the cooling fan 24 in the upper face side of the diesel engine 1, and the urea mixing pipe 39 is extended in parallel in the upward side of the facing side surfaces of the first case 28 and the second case 29. Further, the first case 28 and the second case 29 are arranged at higher positions than an air trunk of the cooling fan 24 of the diesel engine 1 which is formed by the wind tunnel plate body 192, and the second case 29 is arranged at a higher position than the first case 28. In other words, the first case 28 and the second case 29 are arranged at the higher positions than the upper face of the wind tunnel plate body 192 (the shroud for the cooling fan) of the diesel engine 1, and the second case 29 is arranged just above the cooling fan 24.

Therefore, the cooling air from the cooling fan 24 is moved and guided to the upper face side of the diesel engine 1 on the basis of the engine cooling air guiding action of the first support leg body 181 and the second support leg body 182 which serve as the case bracket. A cooling air guide body (not shown) may be provided between the first case 28 and the wind tunnel plate body 92, and the cooling air from the cooling fan 24 may be moved from the wind tunnel plate body 192 toward the upper face side of the diesel engine 1 by the guide of the cooling air guide body.

As shown in the first embodiment (FIGS. 1 to 12) and the fifth embodiment (FIGS. 16 to 22), in the exhaust gas purification device having the first case 28 which removes the particulate matter in the exhaust gas of the diesel engine 1, the second case 29 which removes the nitrogen oxide in the exhaust gas of the diesel engine 1, and the urea mixing pipe 39 which connects the exhaust gas outlet of the first case 28 to the exhaust gas inlet of the second case 29, and structured such that the first case 28 and the second case 29 are arranged in parallel, and the urea water is injected into the urea mixing pipe 39, the first case 28, the second case 29 and the urea mixing pipe 39 are arranged in parallel to the exhaust gas moving direction, the DPF outlet pipe 35 serving as the exhaust gas outlet pipe is provided in the end surface of the exhaust gas outlet side of the first case 28, the SCR inlet pipe 36 serving as the exhaust gas inlet pipe is provided in the side surface of the exhaust gas inlet side of the second case 29, the DPF outlet pipe 35 is connected to the urea mixing pipe 39 via the bellows-like connection pipe 41, and the urea water injection nozzle 76 is arranged between the urea mixing pipe 39 and the bellows-like connection pipe 41. Therefore, the urea mixing pipe 39 can be connected to the first case 28 and the second case 29 via the bellows-like connection pipe 41 in a state in which the first case 28 and the second case 29 are independently assembled by respectively executing the assembling work of the first case 28 and the assembling work of the second case 29 in relation to the diesel engine 1 or the main machine (the travel machine body 52).

In other words, in spite of the matter that the exhaust flow path structures of the first case 28 and the second case 29 can be constructed simply and at a low cost, the first case 28 and the second case 29 can be handled as the independent parts from each other in the assembly plant mounting the diesel engine 1 to an agricultural machine or the construction machine, and it is possible to easily improve the assembling workability. Particularly, the second case 29 can be easily attached to the other support member (the SCR first support leg body 83 and the SCR second support leg body 84) than the DPF support leg body 81 of the first case 28 by adjusting the attaching position (correcting the error of the assembling dimension) of the deformable bellows-like connection pipe 41. Further, it is possible to prevent the urea water injected from the urea water injection nozzle 76 from being attached to the inner surface of the bellows-like connection pipe 41 so as to be crystallized, by injecting the urea water from the urea water injection nozzle 76 toward the urea mixing pipe 39 in the exhaust gas movement downstream side of the bellows-like connection pipe 41.

Further, as shown in the first embodiment (FIGS. 1 to 9 and FIG. 11), the first case 28 and the second case 29 can be arranged within a back-and-forth width of the diesel engine 1 by aligning the position of the DPF inlet pipe 34 with the exhaust gas outlet pipe 80 and deviating the second case 29 to the exhaust gas inlet side of the first case 28. Meanwhile, as shown in the first embodiment (the modified example shown in FIG. 12) and the fifth embodiment (FIGS. 16 to 22), the end surface of the exhaust gas outlet side of the second case 29 can be protruded at an installation width dimension L of the bellows-like connection pipe 41 more than the end surface of the exhaust gas outlet side of the second case 28, and the bellows-like connection pipe 41 can be arranged in a lateral side of an outer periphery of the exhaust gas outlet side of the second case 29, by connecting the exhaust gas outlet pipe 80 serving as the exhaust gas connection pipe for taking the exhaust gas of the diesel engine 1 therein to the side surface of the exhaust gas inlet side of the first case 28, and deviating the second case 29 to the exhaust gas outlet side of the first case 28. As a result, the exhaust gas can be supplied to the first case 28 and the second case 29 from their respective side surfaces, and it is possible to well secure diffusion of the exhaust gas in each of the inner portions of the first case 28 and the second case 29.

Further, the second case 29 is deviated in the exhaust gas moving direction in relation to the first case 28, and the exhaust gas inlet side end surface of the second case 29 is deviated in the exhaust gas movement downstream side in relation to the exhaust gas inlet side end surface of the first case 28 at a difference of the lengths in the exhaust gas moving direction of the first case 28 and the second case 29 and a step dimension M of an attachment width generated by the installation width dimension L of the bellows-like connection pipe 41. Further, as mentioned above, the exhaust gas outlet side end surface of the second case 29 is deviated in the exhaust gas movement downstream side in relation to the exhaust gas outlet side end surface of the first case 28 at the installation width dimension L of the bellows-like connection pipe 41. In other words, since the second case 29 is deviated to the exhaust gas outlet side of the first case 28, and the exhaust gas outlet side end surface of the second case 29 is protruded to the exhaust gas movement downstream side more than the exhaust gas outlet side end surface of the first case 28, the urea mixing pipe 39 and the bellows-like connection pipe 41 can be compactly supported to an inner portion of a rectangular frame (in a plan view) which surrounds the first case 28 and the second case 29.

In addition, the bellows-like connection pipe 41 can be installed in a concave space which is formed by the exhaust gas outlet side end surface of the first case 28 and the side surface of the second case 29 by making the bellows-like connection pipe 41 close to the exhaust gas outlet side end surface of the first case 28 and the side surface of the second case 29, it is possible to reduce the temperature decrease of the bellows-like connection pipe 41, and it is possible to easily prevent the temperature of the exhaust gas leading to the urea mixing pipe 39 from the first case 28 from being lowered when passing through the bellows-like connection pipe 41. Therefore, even if the urea water flows back to the inner portion of the bellows-like connection pipe 41, it is possible to inhibit the urea water from being crystallized in the inner portion of the bellows-like connection pipe 41.

Figure 25:
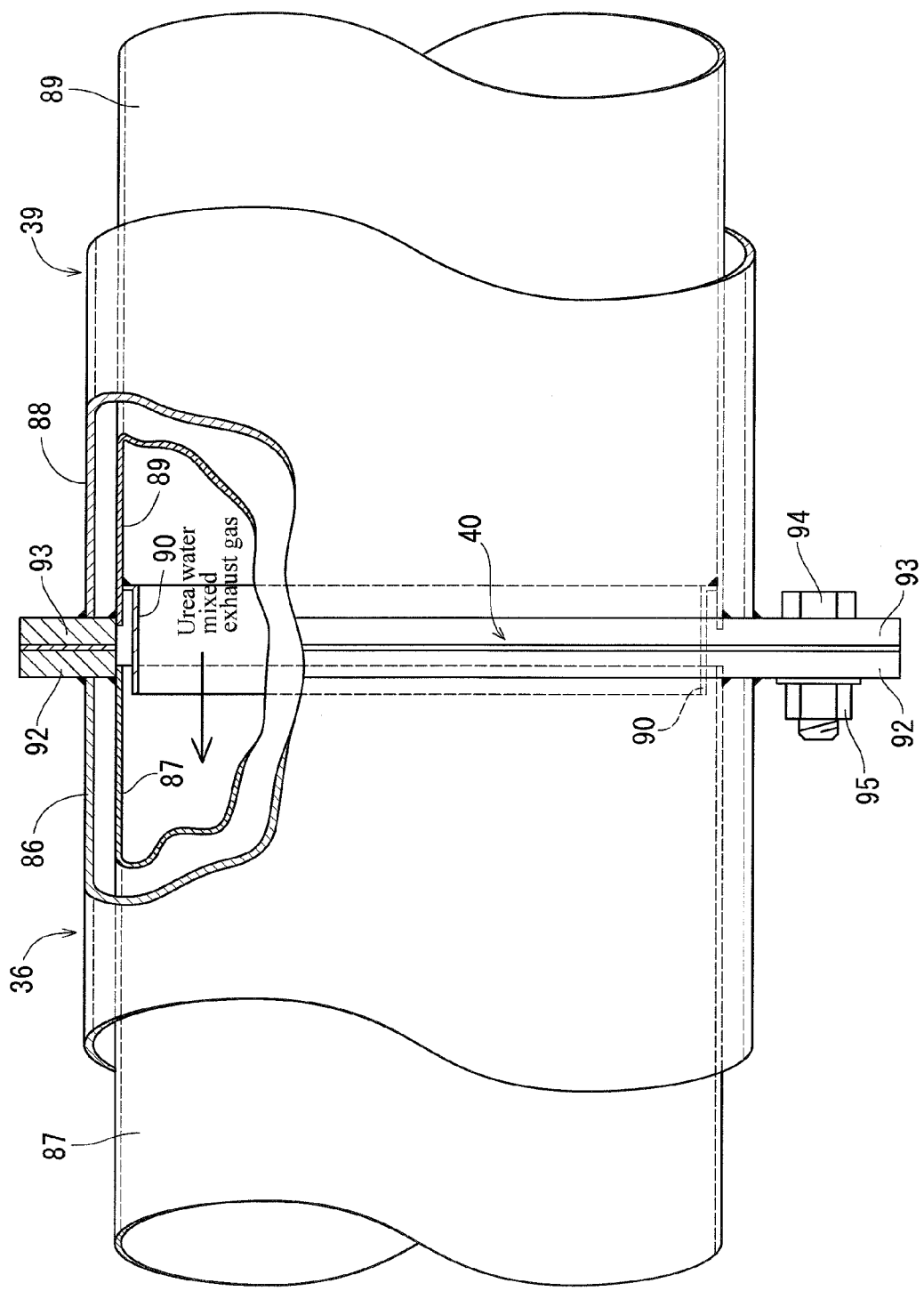
FIG. 25 is an enlarged view of a connection portion between an SCR inlet pipe and an urea mixing pipe showing a sixth embodiment.
Figure 26:
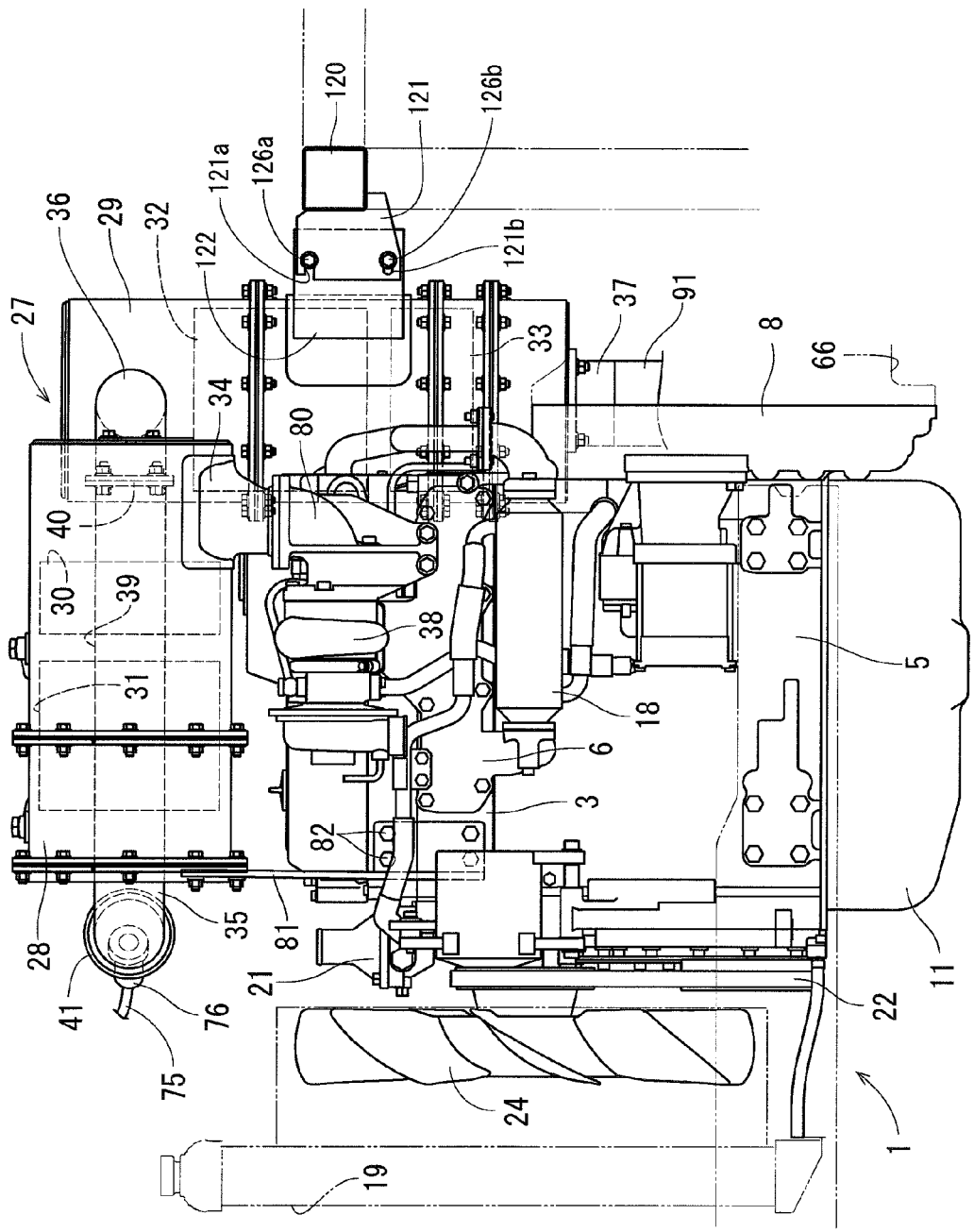
FIG. 26 is a left side elevational view of a diesel engine showing a seventh embodiment.
Figure 27:
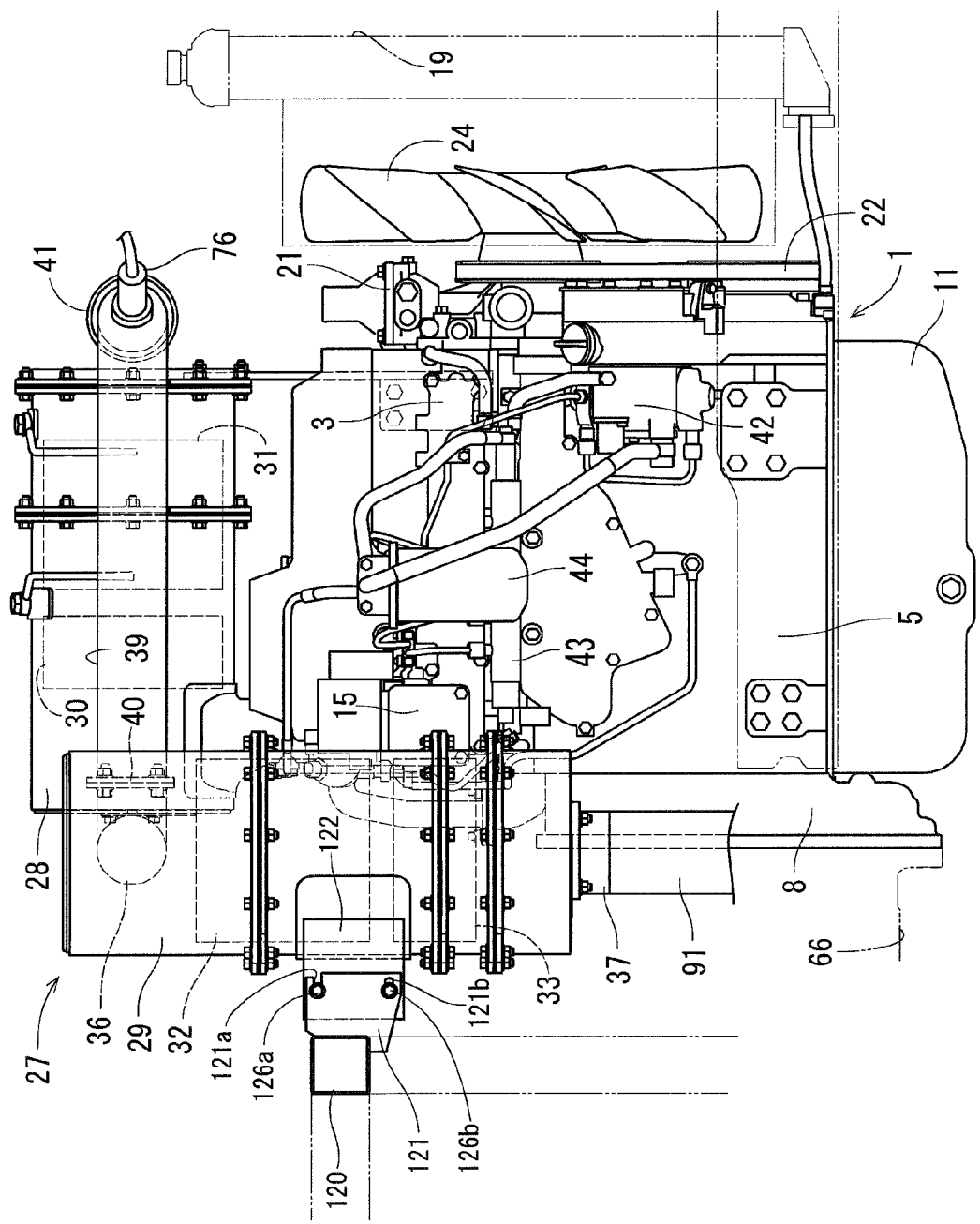
FIG. 27 is a right side elevational view of the same.
Figure 28:
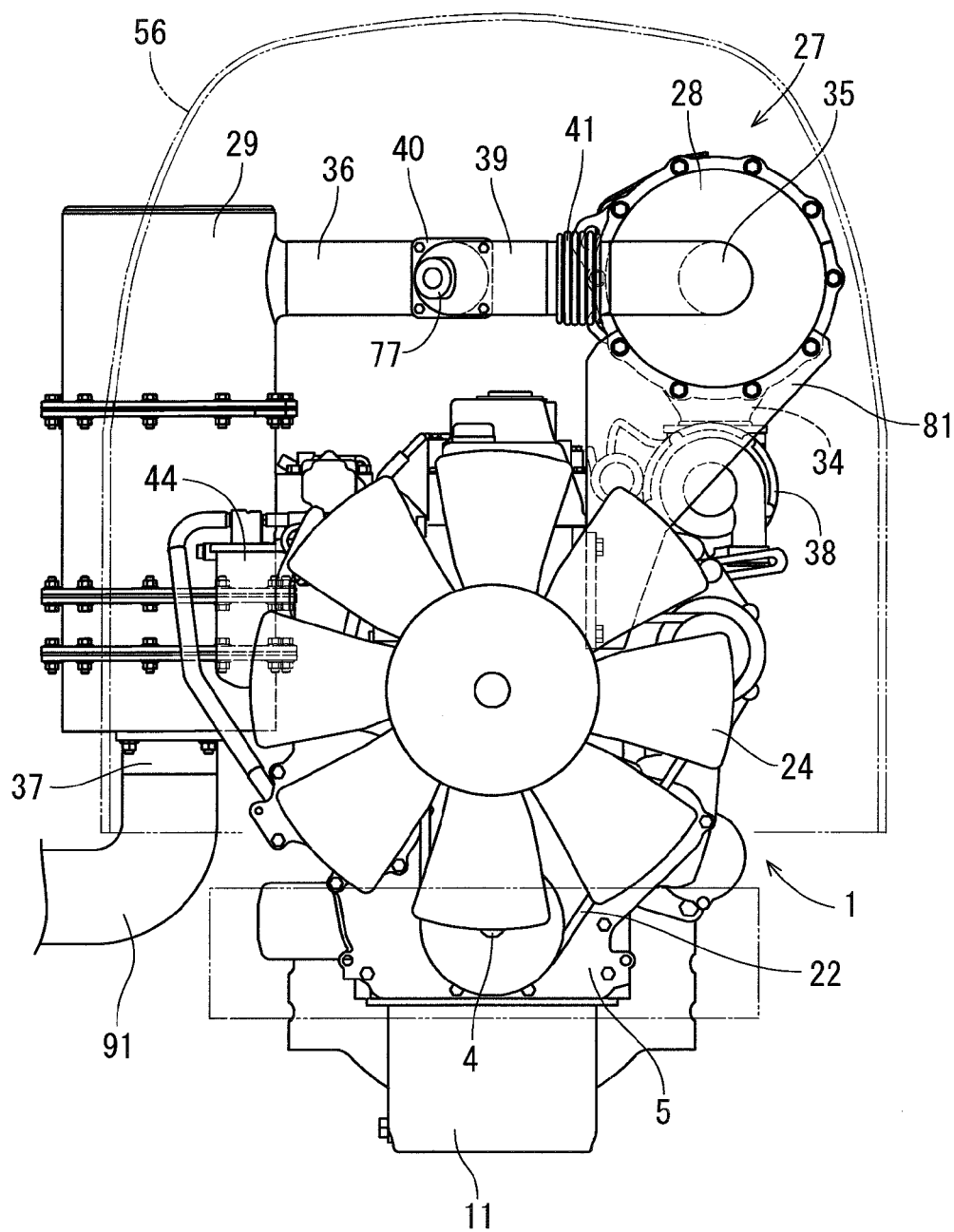
FIG. 28 is a front elevational view of the same.
Figure 29:
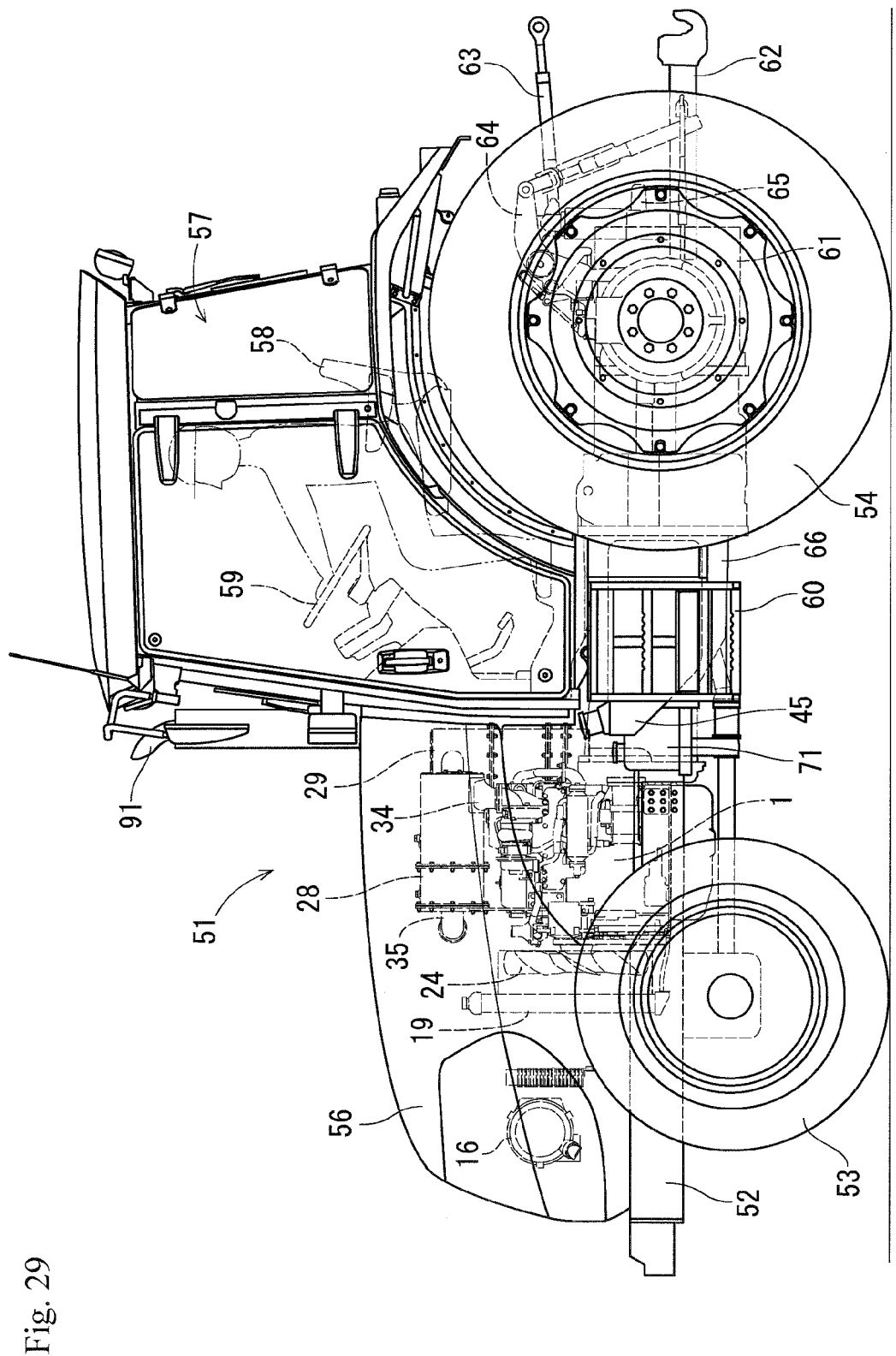
FIG. 29 is a left side elevational view of a tractor which mounts a diesel engine thereon.
Figure 30:
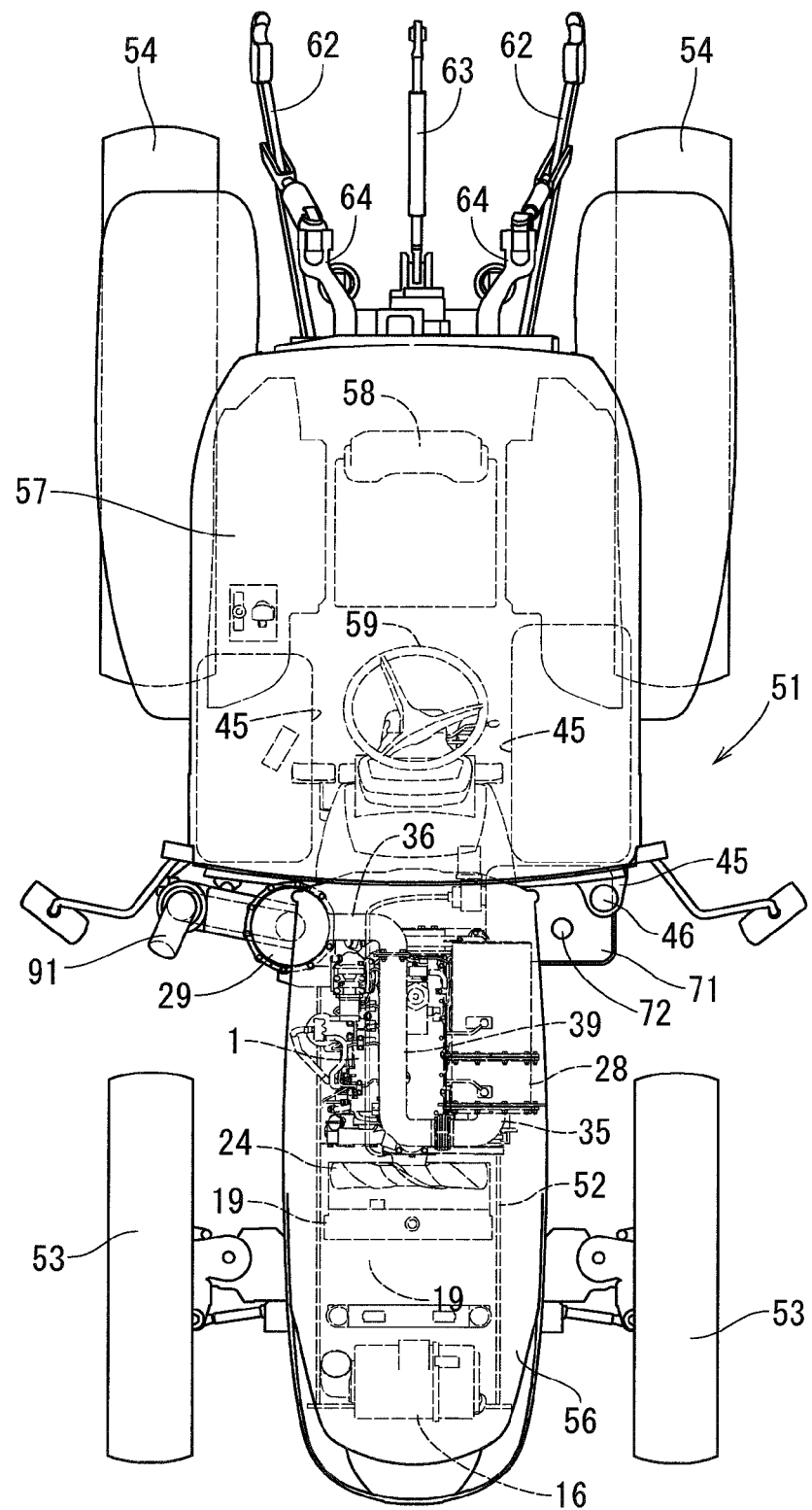
FIG. 30 is a plan view of the same.
Figure 31:
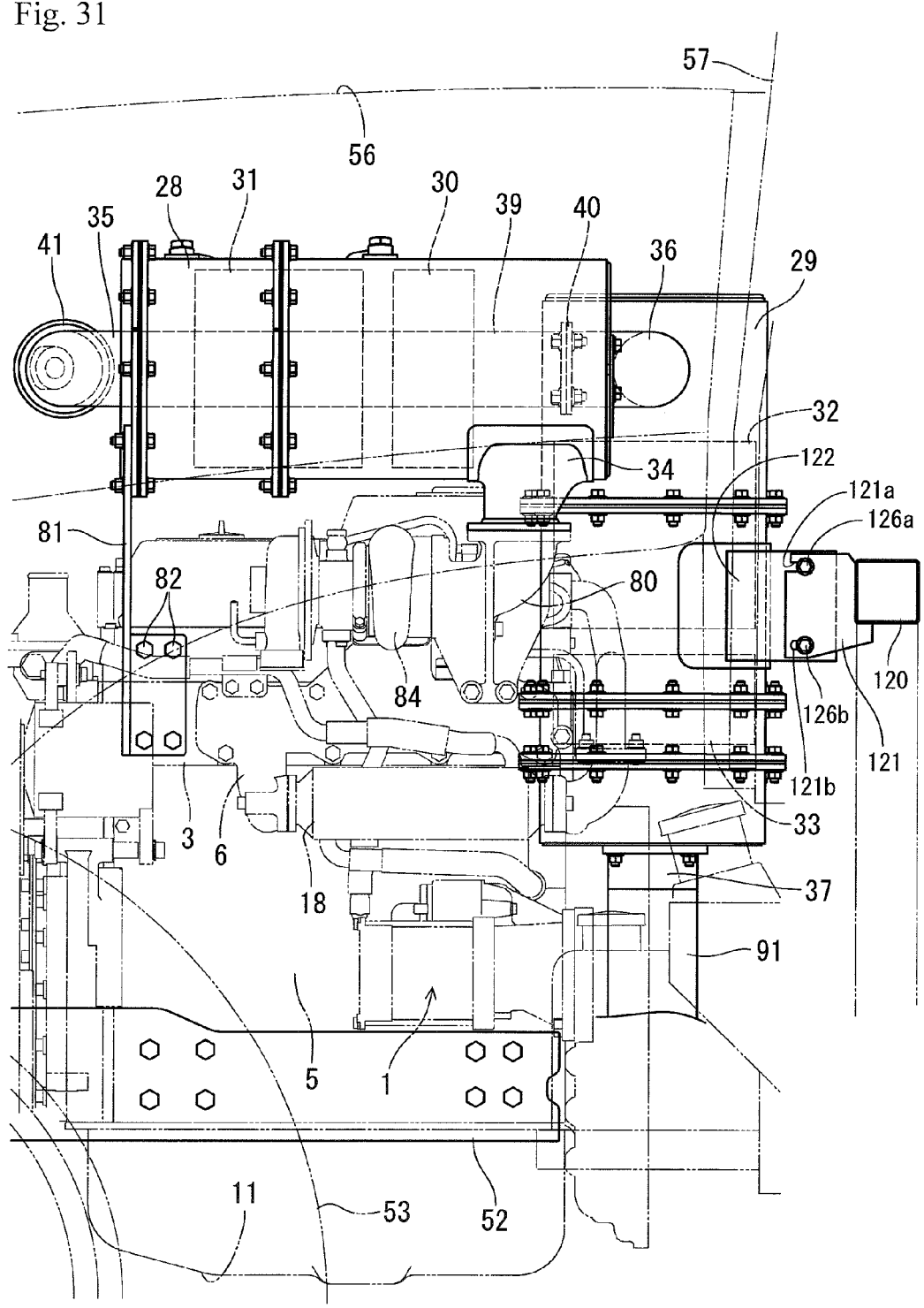
FIG. 31 is a left side elevational view of an exhaust gas purification device.

Next, a description will be given of a structure of a connection portion between the SCR inlet pipe and the urea mixing pipe showing a sixth embodiment with reference to FIG. 25. As shown in FIG. 25, the outer pipe 86 of the SCR inlet pipe 36 and the outer pipe 88 of the urea mixing pipe 39 are formed by pipes having the same diameter, and the inner pipe 87 of the SCR inlet pipe 36 and the inner pipe 89 of the urea mixing pipe 39 are formed by pipes having the same diameter. A pipe thickness of each of the inner pipes 87 and 89 is formed thinner than a pipe thickness of each of the outer pipes 86 and 88. Further, an end portion of the inner pipe 89 of the urea mixing pipe 39 is fixed by welding to an inner hole surface of the outlet side flange body 93, one end side of a fitting small-diameter pipe 90 is fixed by welding to an end portion of the inner pipe 89 of the urea mixing pipe 39, and the other end side of the fitting small-diameter pipe 90 is inward inserted to the inner portion of the inner pipe 87 of the SCR inlet pipe 36. The end portion of the inner pipe 87 in the SCR inlet pipe 37 to which an inlet side flange body 92 is firmly fixed is fitted to the end portion of the inner pipe 89 (the other end side of the fitting small-diameter pipe 90) in the urea mixing pipe 39 to which an outlet side flange body 93 is firmly fixed.

In other words, the exhaust gas within the urea mixing pipe 39 moves to the SCR inlet pipe 36 without being in contact with the inner hole surface of the inlet side flange body 92 or the outlet side flange body 93. For example, in the case that the exhaust gas comes into contact with the inner hole surface of the inlet side flange body 92 or the outlet side flange body 93 which tends to radiate heat, the temperature of the exhaust gas is lowered, the urea component in the exhaust gas is crystallized, and is attached to the inner hole surface of the inlet side flange body 92 or the outlet side flange body 93, the crystalline lump of the urea component is formed in the inner hole surface of the inlet side flange body 92 or the outlet side flange body 93, and a defect that the movement of the exhaust gas is obstructed tends to be generated. On the contrary, it is possible to inhibit the exhaust gas from coming into contact with the inner hole surface of the inlet side flange body 92 or the outlet side flange body 93 and it is possible to prevent the crystalline lump of the urea component from being formed in the inner hole surface of the inlet side flange body 92 or the outlet side flange body 93, by shielding the inner hole surface of the inlet side flange body 92 or the outlet side flange body 93 by the fitting small-diameter pipe 90.

As shown in FIGS. 9, 10 and 25, in the engine device having the urea mixing pipe 39 which injects the urea water into the exhaust gas of the diesel engine 1, and the second case 29 serving as the exhaust gas purification case which removes the nitrogen oxide in the exhaust gas of the diesel engine 1, and structured such that the SCR inlet pipe 36 serving as the exhaust gas inlet pipe of the second case 29 is connected to the outlet of the urea mixing pipe 39 via the pipe bracket 40 (the inlet side flange body 92 and the outlet side flange body 93) serving as the flange body, the exhaust gas outlet side end portions of the outer pipe 88 and the inner pipe 89 in the urea mixing pipe 30 having the double-pipe structure are connected to the exhaust gas inlet side end portions of the outer pipe 86 and the inner pipe 87 in the SCR inlet pipe 36 having the double-pipe structure, the fitting small-diameter portion 89a (the fitting small-diameter pipe 90) is formed in the end portion of the inner pipe 89 in the urea mixing pipe 39, and the fitting small-diameter portion 89a (the fitting small-diameter pipe 90) is inward inserted to the inner portion of the inner pipe 87 in the SCR inlet pipe 36. As a result, the fitting small-diameter portion 89a (the fitting small-diameter pipe 90) can inhibit the exhaust gas from coming into contact with the inner hole surface of the pipe bracket 40 (the inlet side flange body 92 and the outlet side flange body 93), and it is possible to prevent the crystalline lump of the urea component from being formed in the inner hole surface of the pipe bracket 40 (the inlet side flange body 92 and the outlet side flange body 93). The exhaust gas can be smoothly moved from the urea mixing pipe 39 to the SCR inlet pipe 36.

As shown in FIGS. 10 and 25, the outer pipe 86 of the SCR inlet pipe 36 and the outer pipe 88 of the urea mixing pipe 39 are formed by the pipes having the same diameter, and the inner pipe 87 of the SCR inlet pipe 36 and the inner pipe 89 of the urea mixing pipe 39 are formed by the pipes having the same diameter. As a result, it is possible to suppress change of flow resistance of the exhaust gas moving from the urea mixing pipe 39 to the SCR inlet pipe 36, and the exhaust gas can be smoothly moved.

As shown in FIGS. 10 and 25, the pipe thickness of the inner pipe 89 of the urea mixing pipe 39 is formed thinner than the pipe thickness of the outer pipe 88 of the urea mixing pipe 39. As a result, it is possible to easily execute a drawing process for forming the fitting small-diameter portion 89a in the end portion of the inner pipe 89 of the urea mixing pipe 39. It is possible to reduce a manufacturing cost of the urea mixing pipe 39.

Next, a description will be given of an arrangement structure of the first case 28 and the second case 29 according to a seventh embodiment with reference to FIGS. 26 to 35. The first case 28 according to the seventh embodiment is constructed as a horizontally long cylindrical shape which extends long in a parallel direction to the output shaft (the crank shaft) 4 of the diesel engine 1 in a plan view. The DPF inlet pipe 34 taking the exhaust gas therein, and the DPF outlet pipe 35 discharging the exhaust gas are provided in both sides (one end side and the other end side in the exhaust gas moving direction) of the cylindrical shape of the first case 28. Meanwhile, the second case 29 is constructed as a vertically long cylindrical shape which extends long in a vertical direction. The SCR inlet pipe 36 taking the exhaust gas therein, and the SCR outlet pipe 37 discharging the exhaust gas are provided in both sides (one end side and the other end side in the exhaust gas moving direction) of the second case 29. The SCR inlet pipe 36 and the urea mixing pipe 39 are firmly fixed detachably to the pipe bracket 40.

Further, as shown in FIGS. 29 to 34, the DPF inlet pipe 34 is detachably fastened by bolts to the exhaust gas outlet pipe 80 of the supercharger 38. Further, the upper end side of the DPF support leg body 81 is fastened and fixed to the outer peripheral surface of the end portion in the DPF outlet pipe 35 side, in the outer peripheral surface of the first case 28, and the lower end side of the DPF support leg body 81 is detachably fastened by the bolts 82 to the side surface of the cylinder head 2 or the upper face of the exhaust manifold 6. In other words, the first case 28 is attached to the upper face side of the diesel engine 1 via the exhaust gas outlet pipe 80 and the DPF support leg body 81. The first case 28 is supported in parallel to the exhaust manifold 6 so that the longitudinal direction of the cylindrical first case 28 is directed to the back-and-forth direction of the diesel engine 1.

As shown in FIGS. 26, 27 and 31 to 34, the second case 29 is supported to a travel machine body frame 120 which constructs the cabin 57. A pair of right and left purification case support bodies 121 are integrally fixed by welding to the travel machine body frame 120, and a pair of right and left purification case support bodies 121 are protruded toward a forward side from the travel machine body frame 120. A back face support bracket 122 is integrally fixed by welding to the back face side of the second case 29 in the outer peripheral surface of the second case 29 for purifying the exhaust gas, and the back face support bracket 122 is protruded toward a rear side from an intermediate portion of a vertical width of the second case 29. The back face support bracket 122 is fitted between a pair of right and left purification case support bodies 121, and the back face support bracket 122 is detachably fastened to the purification case support body 121 by an upper bolt 126a and a lower bolt 126b which are threadably applied to a pair of right and left purification case support bodies 121 and the right and left surfaces of the back face support bracket 122 from a lateral direction.

Figure 32:
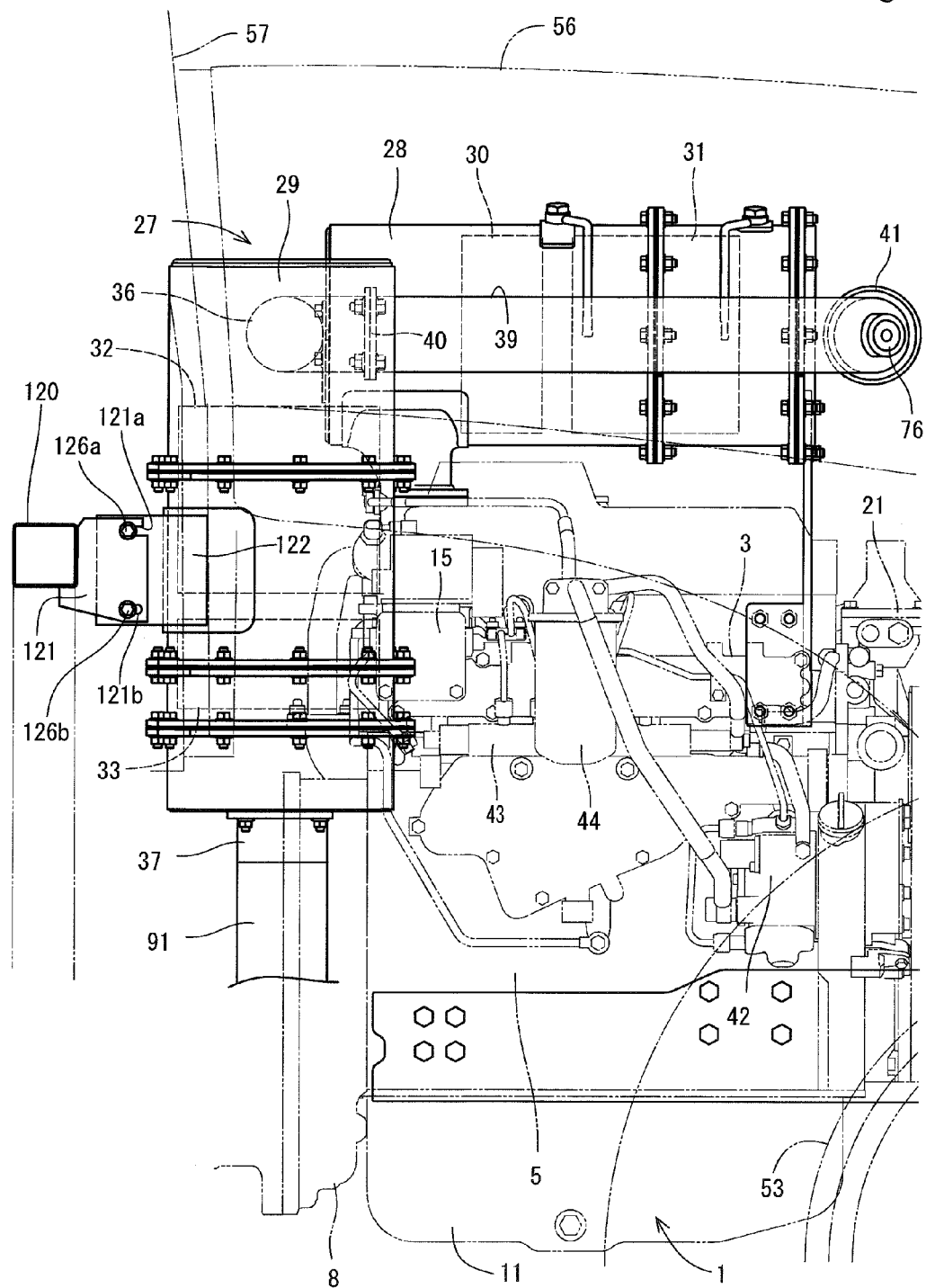
FIG. 32 is a right side elevational view of the same.
Figure 33:
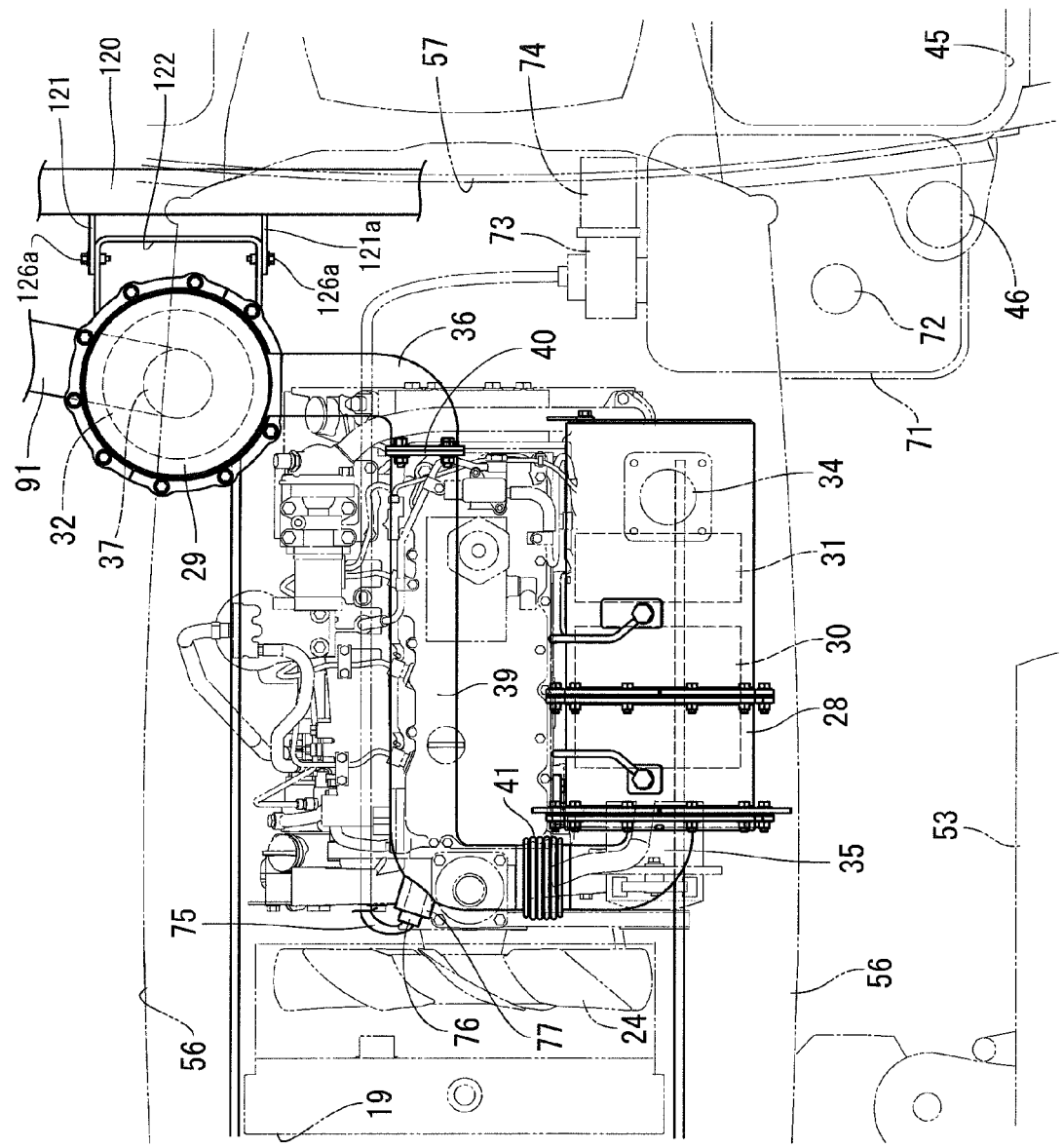
FIG. 33 is a plan view of the same.
Figure 34:
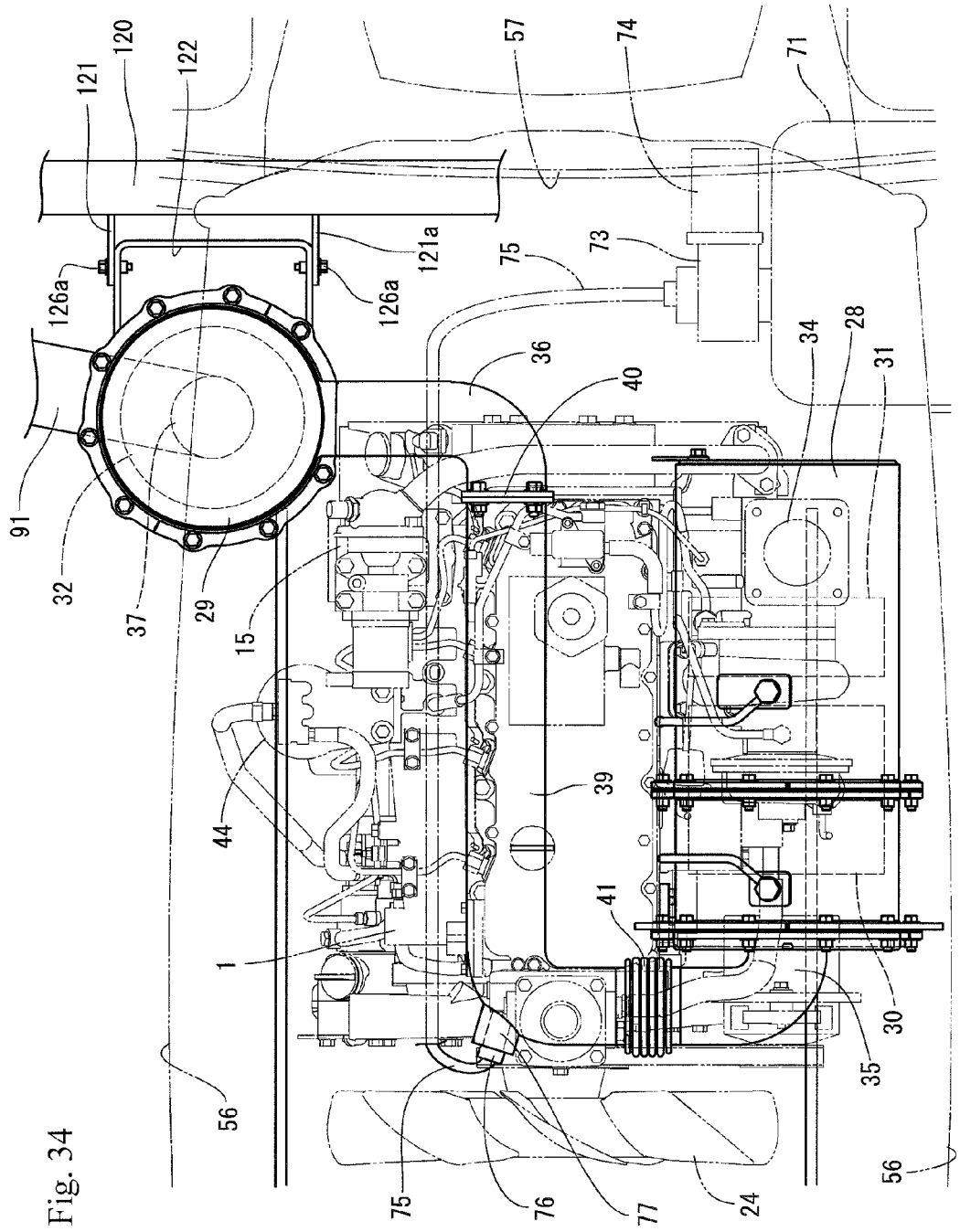
FIG. 34 is an enlarged explanatory view of FIG. 33.

As shown in FIGS. 32 and 34, the upper bolt 126a is locked to an engagement notch 121a of the purification case support body 121 so as to be engageable and disengageable, and the lower bolt 126b is passed through a position adjusting long hole 121b of the purification case support body 121. In other words, in the case that the second case 29 is assembled, the upper bolt 126a is temporarily fastened to the back face support bracket 122, the second case 29 is moved close to the attaching position of the purification case support body 121, the upper bolt 126a is engaged with the engagement notch 121a of the purification case support body 121, and the second case 29 is temporarily supported to the purification case support body 121. Thereafter, the lower bolt 126b is passed through the position adjusting long hole 121b of the purification case support body 121, the lower bolt 126b is fastened to the back face support bracket 122, the upper bolt 126a is fastened to the back face support bracket 122, the back face support bracket 122 is firmly fixed detachably to the purification case support body 121 via each of the bolts 126a and 126b, and the second case 29 is installed to the front face side of the cabin 57 (the operating portion) via the travel machine body frame 120. Therefore, the first case 28 is arranged in the upper face side of the diesel engine 1 horizontally (in a horizontally long posture) in relation to the back-and-forth direction, and the second case 29 is positioned in the right side of the rear portion of the diesel engine 1 in a vertically long posture.

In addition, the urea mixing pipe 39 is arranged in parallel to the first case 28. The first case 28 and the urea mixing pipe 39 are supported at a higher position than the cooling air path of the cooling fan 24 in the upper face of the diesel engine 1. It is possible to prevent the temperature of the exhaust gas within the urea mixing pipe 39 from being lowered and prevent the urea water supplied into the urea mixing pipe 39 from being crystallized. Further, the urea water supplied into the urea mixing pipe 39 is mixed as the ammonia into the exhaust gas leading to the second case 29 from the first case 28.

As shown in FIGS. 29 to 34, the tail pipe 91 is provided in a rising manner in a front face in a right corner portion of the cabin 57 in the front face of the cabin 57, the lower end side of the tail pipe 91 is extended toward the lower end side of the second case 29, the lower end side of the tail pipe 91 is connected to the SCR outlet pipe 37 in the lower end side of the second case 29, and the exhaust gas purified by the second case 29 is discharged toward the upper side of the cabin 57 from the tail pipe 91. Further, the urea water tank 71 is installed to the left side portion of the hood 56 in an opposite side to the right side portion where the tail pipe 91 is arranged, in the front face of the cabin 57. In other words, the tail pipe 91 is arranged in the right side portion of the rear portion of the hood 56, and the urea water tank 71 is arranged in the left side portion of the rear portion of the hood 56. Further, the urea water tank 71 is mounted to the travel machine body 52 (the travel machine body frame 120 to which the cabin 57 is supported) in the left rear portion of the hood 56.

Figure 35:
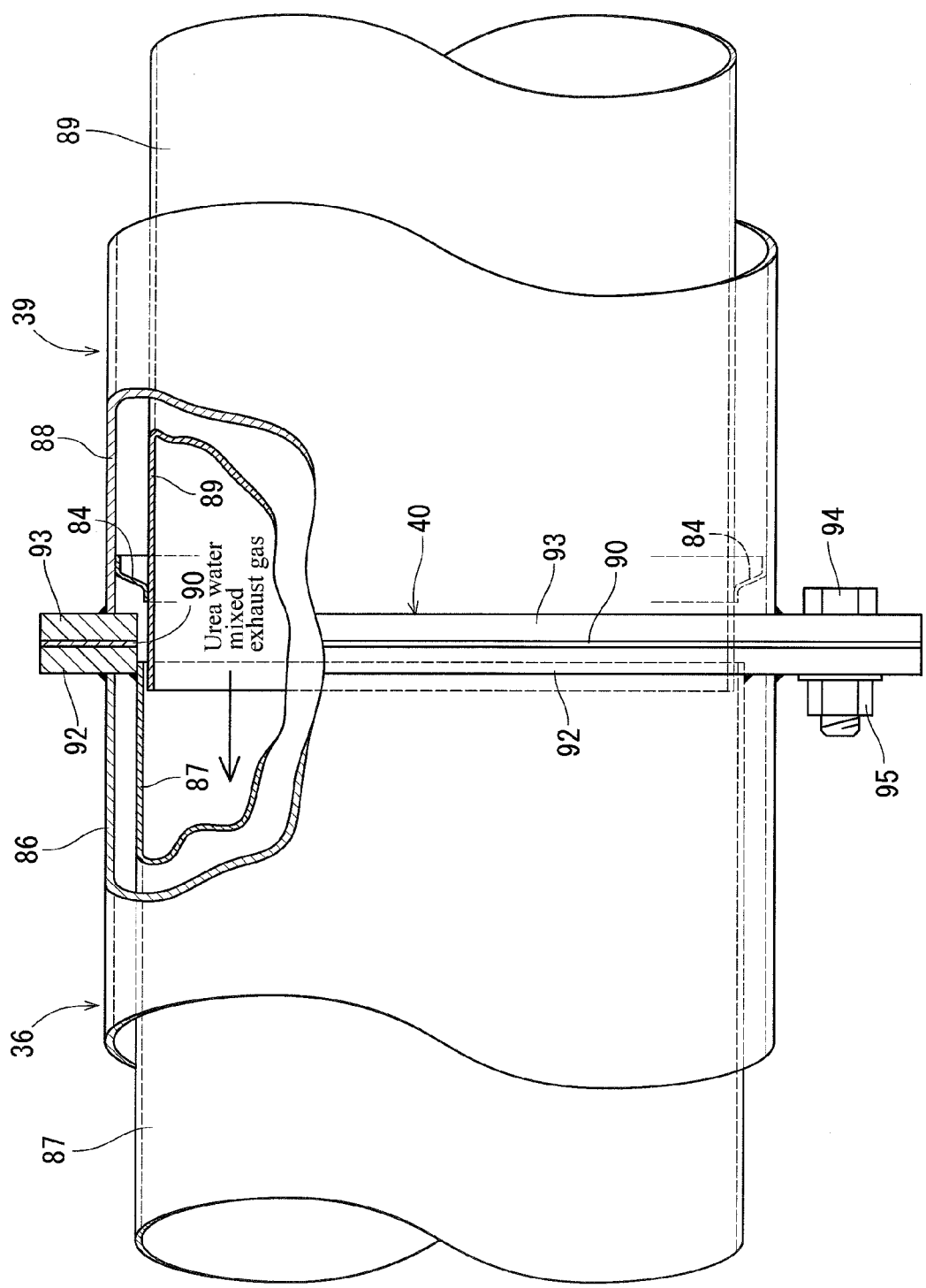
FIG. 35 is an enlarged view of a connection portion between an SCR inlet pipe and an urea mixing pipe.
Figure 36:
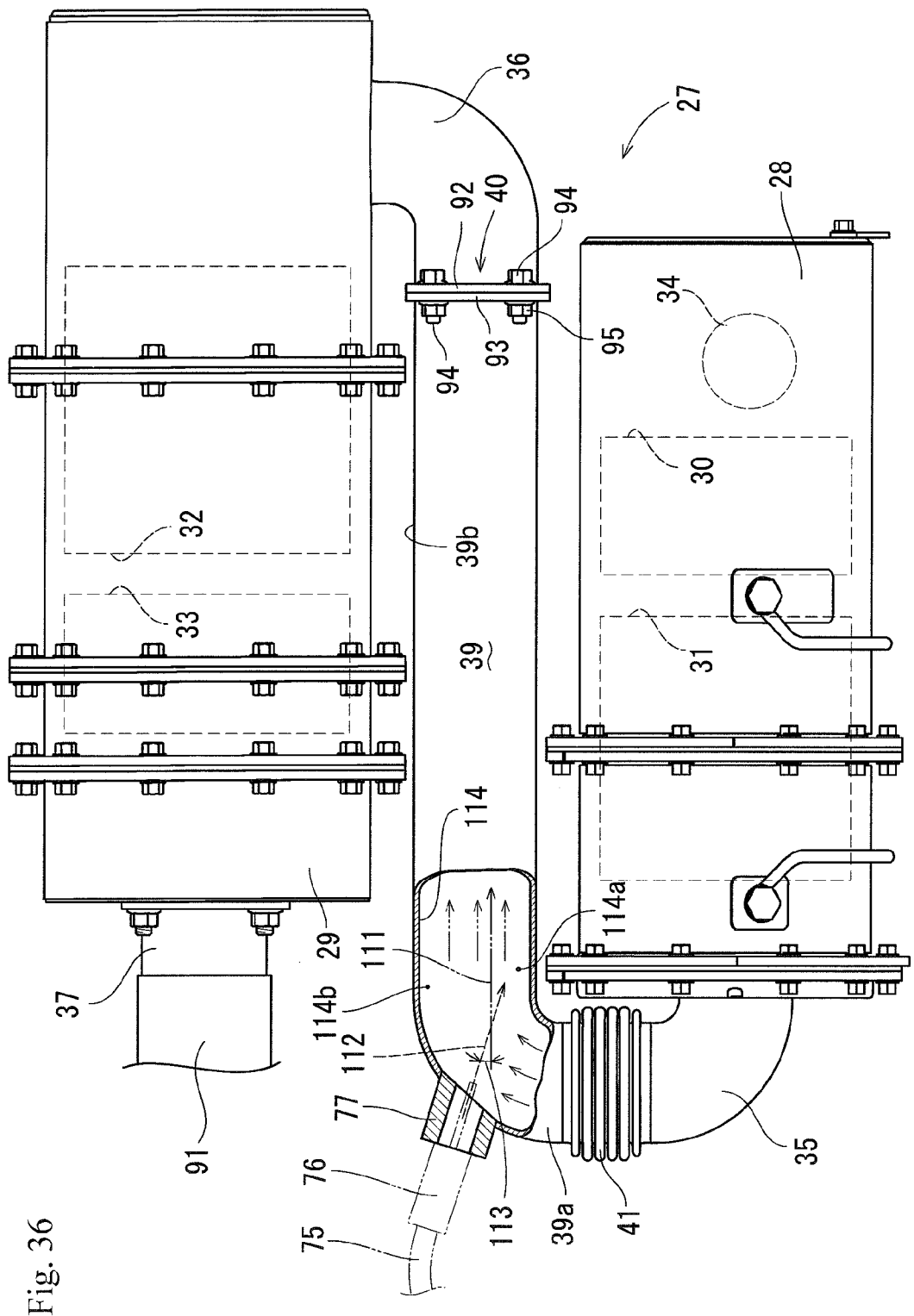
FIG. 36 is an explanatory view of an exhaust gas purification case.

Next, as shown in FIG. 35, the pipe bracket 40 connecting the SCR inlet pipe 36 and the urea mixing pipe 39 has the inlet side flange body 92 which is arranged in the exhaust gas inlet side of the SCR inlet pipe 36, and the outlet side flange body 93 which is arranged in the exhaust gas outlet side of the urea mixing pipe 39. The inlet side flange body 92 is fixed by welding to the exhaust gas inlet side end portions of the outer pipe 86 and the inner pipe 87 of the SCR inlet pipe 36 having the double-pipe structure, and the outlet side flange body 93 is fixed by welding to the exhaust gas outlet side end portion of the outer pipe 88 of the urea mixing pipe 39 in the exhaust gas outlet side end portions of the outer pipe 88 and the inner pipe 89 of the urea mixing pipe 39 having the double-pipe structure.

The gasket 90 is pinched by the inlet side flange body 92 and the outlet side flange body 93, the inlet side flange body 92 and the outlet side flange body 93 are fastened and fixed by the bolts 94 and the nuts 95, the gasket 90 is pinched and fixed between the inlet side flange body 92 and the outlet side flange body 93, and the SCR inlet pipe 36 and the urea mixing pipe 39 are connected. The outer pipe 86 of the SCR inlet pipe 36 and the outer pipe 88 of the urea mixing pipe 39 are formed by the pipes having the same diameter, the outer diameter of the inner pipe 89 of the urea mixing pipe 39 is formed smaller than the inner diameter of the inner pipe 87 of the SCR inlet pipe 36, the inner pipes 87 and 89 are formed by the pipes having the different diameters, and the exhaust gas outlet side end portion of the inner pipe 89 of the urea mixing pipe 39 is inserted to the exhaust gas inlet side end portion of the inner pipe 87 of the SCR inlet pipe 36.

Further, the ring-like thin plate support body 84 connecting the outer peripheral surface of the inner pipe 89 to the inner peripheral surface of the outer pipe 88 in the urea mixing pipe 39 is provided in the exhaust gas outlet side end portion of the urea mixing pipe 39. The ring-like outer peripheral side of the thin plate support body 84 is fixed by welding to the inner peripheral surface of the outer pipe 88 in the urea mixing pipe 39, and the ring-like inner peripheral side of the thin plate support body 84 is fixed by welding to the outer peripheral surface of the inner pipe 89 in the urea mixing pipe 39. A gas between the outer pipe 88 and the inner pipe 89 in the urea mixing pipe 39 is formed to be a fixed distance by the thin plate support body 84. The pipe thickness of each of the inner pipes 87 and 89 is formed thinner than the pipe thickness of each of the outer pipes 86 and 88.

In other words, the exhaust gas inlet side end portion of the inner pipe 87 in the SCR inlet pipe 36 is fitted to the exhaust gas outlet side end portion of the inner pipe 89 in the urea mixing pipe 39, thereby structuring such that the exhaust gas within the urea mixing pipe 39 moves to the SCR inlet pipe 36 without coming into contact with the inner hole surface of the inlet side flange body 92 or the outlet side flange body 93. For example, in the case that the exhaust gas comes into contact with the inner hole surface of the inlet side flange body 92 or the outlet side flange body 93 which tends to radiate heat, the temperature of the exhaust gas is lowered, the urea component in the exhaust gas crystallizes, and adheres to the inner hole surface of the inlet side flange body 92 or the outlet side flange body 93, the crystalline lump of the urea component is formed in the inner hole surface of the inlet side flange body 92 or the outlet side flange body 93, and a defect that the movement of the exhaust gas is obstructed tends to be generated. On the contrary, as shown in FIG. 10, the inner pipe 89 can inhibit the exhaust gas from coming into contact with the inner hole surface of the inlet side flange body 92 or the outlet side flange body 93 and it is possible to prevent the crystalline lump of the urea component from being formed in the inner hole surface of the inlet side flange body 92 or the outlet side flange body 93, by shielding the inner hole surface of the inlet side flange body 92 or the outlet side flange body 93 by the exhaust gas outlet side end portion of the inner pipe 89 in the urea mixing pipe 39.

As shown in FIGS. 26 to 34, in the engine device of the working vehicle having the first case 28 which removes the particulate matter in the exhaust gas of the diesel engine 1, and the second case 29 which removes the nitrogen oxide in the exhaust gas of the diesel engine 1, and structured such that the diesel engine 1 is mounted to the travel machine body frame 120 in which the right and left traveling wheels 53 and 54 are arranged, the first case 28 is supported to the diesel engine 1, and the second case 29 is attached to the travel machine body frame 120 via the support body 121. Therefore, it is not necessary to secure the installation space for the second case 29 within the engine room (the hood 56), the hood 56 (the engine room) inward provided with the diesel engine 1 can be compactly constructed, the second case 29 can be easily supported to the travel machine body frame 120, and it is possible to improve an assembling workability and a maintenance workability of each of the cases 28 and 29 which are formed their outer shapes into the long tubular shapes. Further, in spite of the matter that it is possible to suppress the temperature decrease of the second case 29 by the cooling air of the engine 1, it is possible to separate the exhaust gas outlet of the first case 28 and the exhaust gas inlet of the second case 29 with a necessary distance for mixing the urea, and it is possible to promote generation of the ammonia in the exhaust gas leading to the second case 29.

As shown in FIGS. 26 to 34, the second case 29 is attached in a vertically long posture to the travel machine body frame 120 in one lateral side of the rear portion of the diesel engine 1 via the purification case support body 121. Therefore, the second case 29 formed its outer shape into the long tubular shape can be compactly installed near the rear portion of the diesel engine 1 (near the joint corner of the hood 56 and the cabin 57 serving as the operating portion). For example, even in the structure in which the lateral width of the hood 56 is restricted for viewing the front wheels, it is possible to easily secure a front view of an operator from the cabin 57 (the operating portion).

As shown in FIGS. 26 to 34, in the working vehicle in which the cabin 57 serving as the operating portion on which the operator gets is arranged in a rear side of the hood 56 which is inward provided with the diesel engine 1, the urea water tank 71 for purifying the exhaust gas is installed between the fuel tank 45 provided in the lower portion of the cabin 57 and the diesel engine 1, the second case 29 is arranged in one lateral side of the rear portion of the diesel engine 1, and the urea water tank 71 is arranged in the other lateral side of the rear portion of the diesel engine 1. As a result, in spite of the matter that it is possible to arrange the oil filling port 46 (the oil supply port) of the fuel tank 45 close to the water filling port 72 (the water supply port) of the urea water tank 71, it is possible to execute an oil supply work of the fuel and a water supply work of the urea aqueous solution in the same working site, and it is possible to improve the resupplying workability of the fuel for the diesel engine 1 or the urea aqueous solution for purifying the exhaust gas, it is possible to effectively utilize both the lateral sides of the rear portion of the diesel engine 1 (the front lower portion of the cabin 57) as the installation space for the second case 29 and the urea water tank 71. In addition, the urea water tank 71 can be heated by the exhaust heat of the diesel engine 1 and the fuel tank 45, it is possible to maintain the temperature of the aqueous solution within the urea water tank 71, and it is possible to prevent the exhaust gas purification capacity of the second case 29 from being lowered in the cold district.

Figure 37:
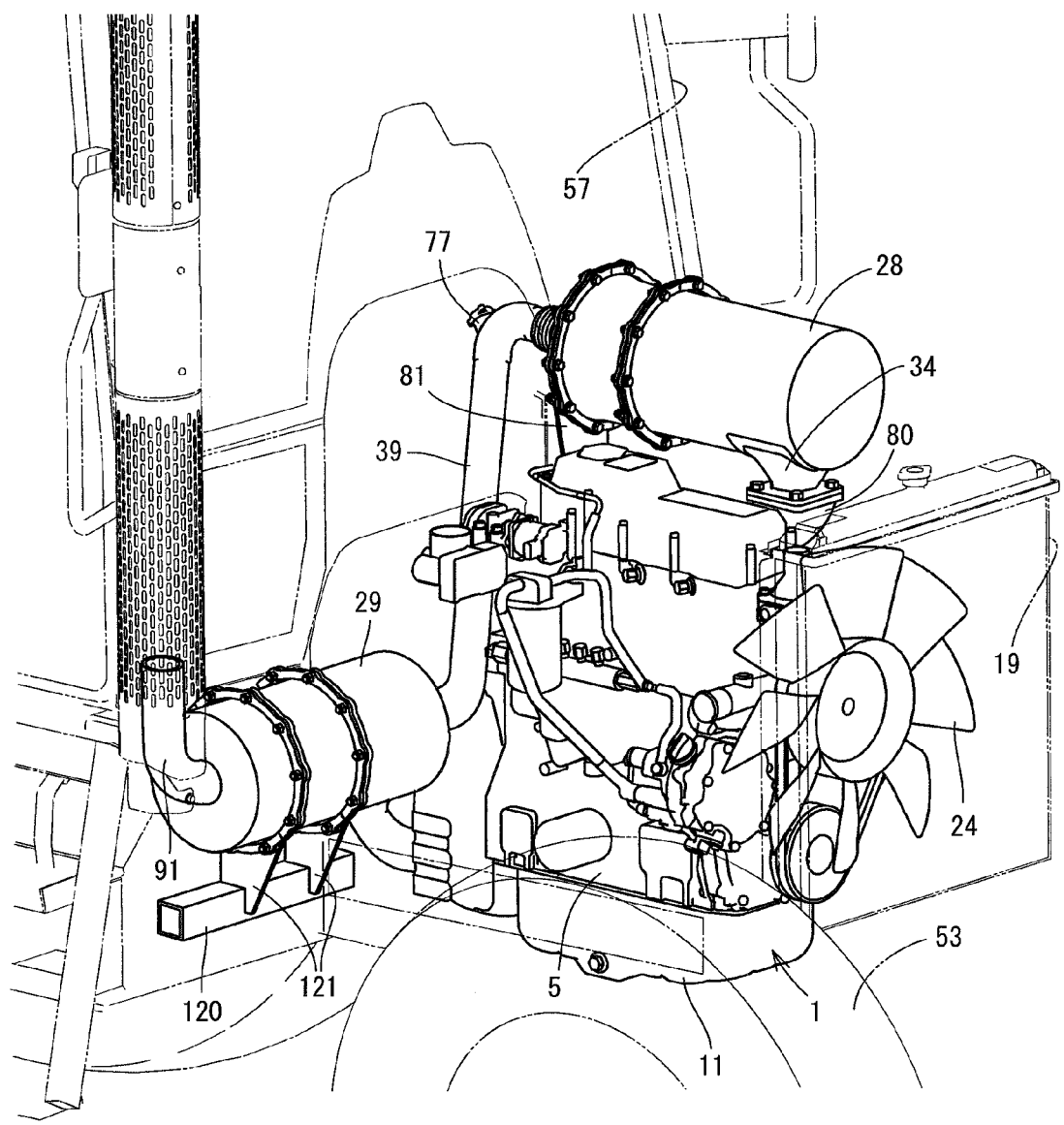
FIG. 37 is a perspective view of an engine portion of a tractor and shows an eighth embodiment.

Next, a description will be given of an arrangement structure of the first case 28 and the second case 29 according to an eighth embodiment with reference to FIG. 37. As shown in FIG. 37, the first case 28 is attached to the upper face side of the diesel engine 1 via the DPF support leg body 81, and the second case 29 is detachably fastened and fixed to the purification case support body 121 of the travel machine body frame 120 in the side in which the intake manifold 3, the exhaust gas recirculation device 15 and the fuel filter 44 are installed, in the rear lateral side of the diesel engine 1. In other words, the second case 29 is constructed into a horizontally long cylindrical shape which extends long in the lateral direction. The second case 29 is attached in a horizontally long posture to the travel machine body frame 120 in the right lower portion of the rear portion of the diesel engine 1, the second case 29 in the horizontally long posture is arranged between the right front face of the cabin 57 and the right front wheel 53, the urea mixing pipe 39 is extended to the rear portion of the diesel engine 1, the urea mixing pipe 39 is connected to the left end side of the second case 29, and the tail pipe 91 is connected to the right end side of the second case 29.

Since the second case 29 is attached in the horizontally long posture to the travel machine body frame 120 in one lateral side of the rear portion of the diesel engine 1 via the purification case support body 121 as shown in FIG. 37, it is possible to compactly install the second case 29 formed its outer shape into the long tubular shape at the low position of the rear portion of the diesel engine 1. For example, even in a structure in which a lateral width of the hood 56 is restricted for viewing the front wheels 53, the second case 29 can be easily arranged at the low position in the front face side of the cabin 57 in the right outer side of the rear portion of the hood 56, and it is possible to easily secure the front view of the operator from the cabin 57.

Figure 38:
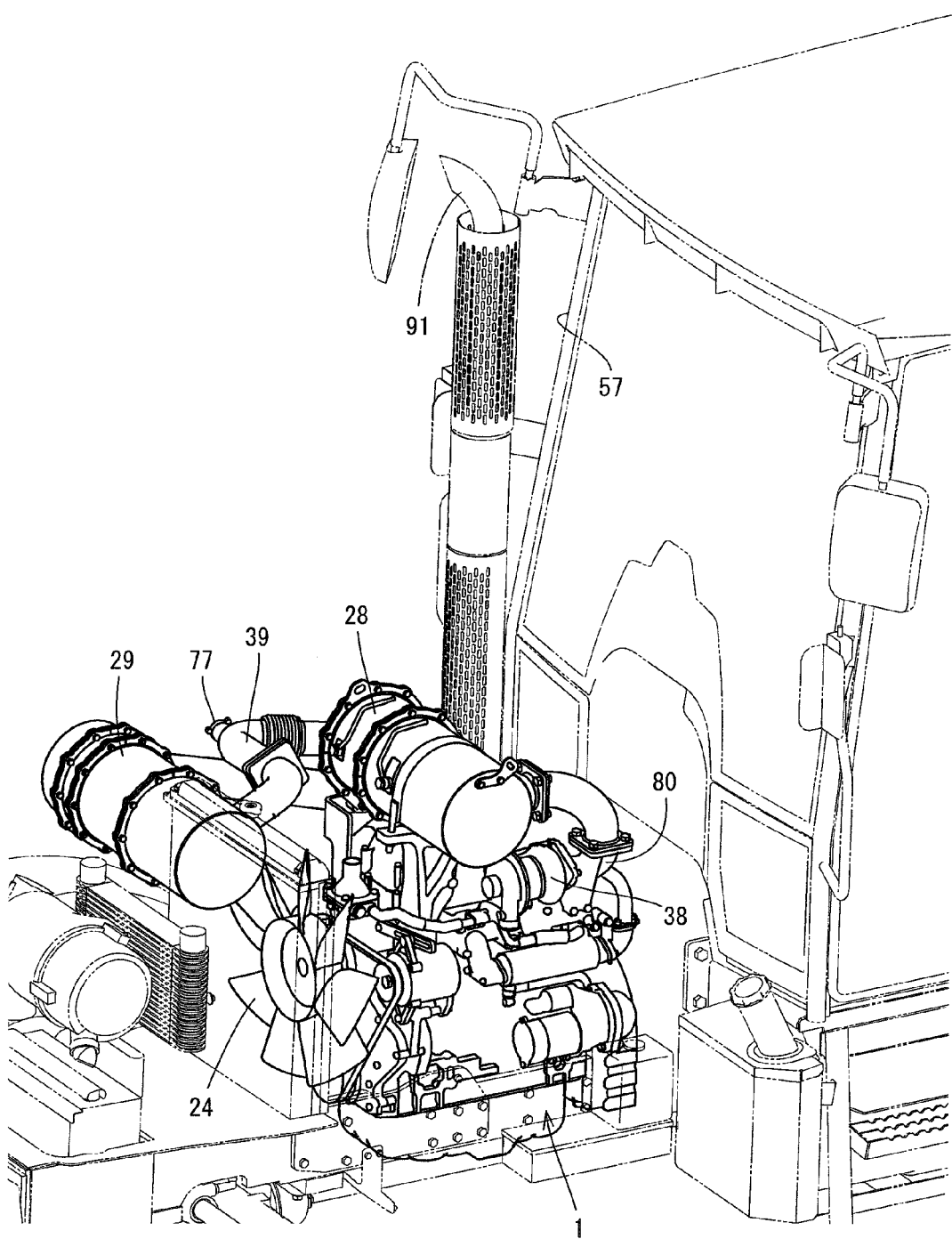
FIG. 38 is a perspective view of an engine portion of a tractor and shows a ninth embodiment.

Next, a description will be given of an arrangement structure of the first case 28 and the second case 29 according to a ninth embodiment with reference to FIG. 38. In the ninth embodiment shown in FIG. 38, the first case 28 and the second case 29 are extended in a lateral direction so as to make the exhaust gas moving directions (the axes of the cylindrical shapes) of the first case 28 and the second case 29 orthogonal to the output shaft 4 of the diesel engine 1 which is extended in the back-and-forth direction. The first case 28 and the second case 29 are arranged in parallel in the upper face side of the installation portion of the cooling fan 24 in the upper face side of the diesel engine 1, and the urea mixing pipe 39 is extended in parallel between the first case 28 and the second case 29. Further, the first case 28 and the second case 29 are arranged at a higher position than the air trunk of the cooling fan 24 of the diesel engine 1.

Figure 39:
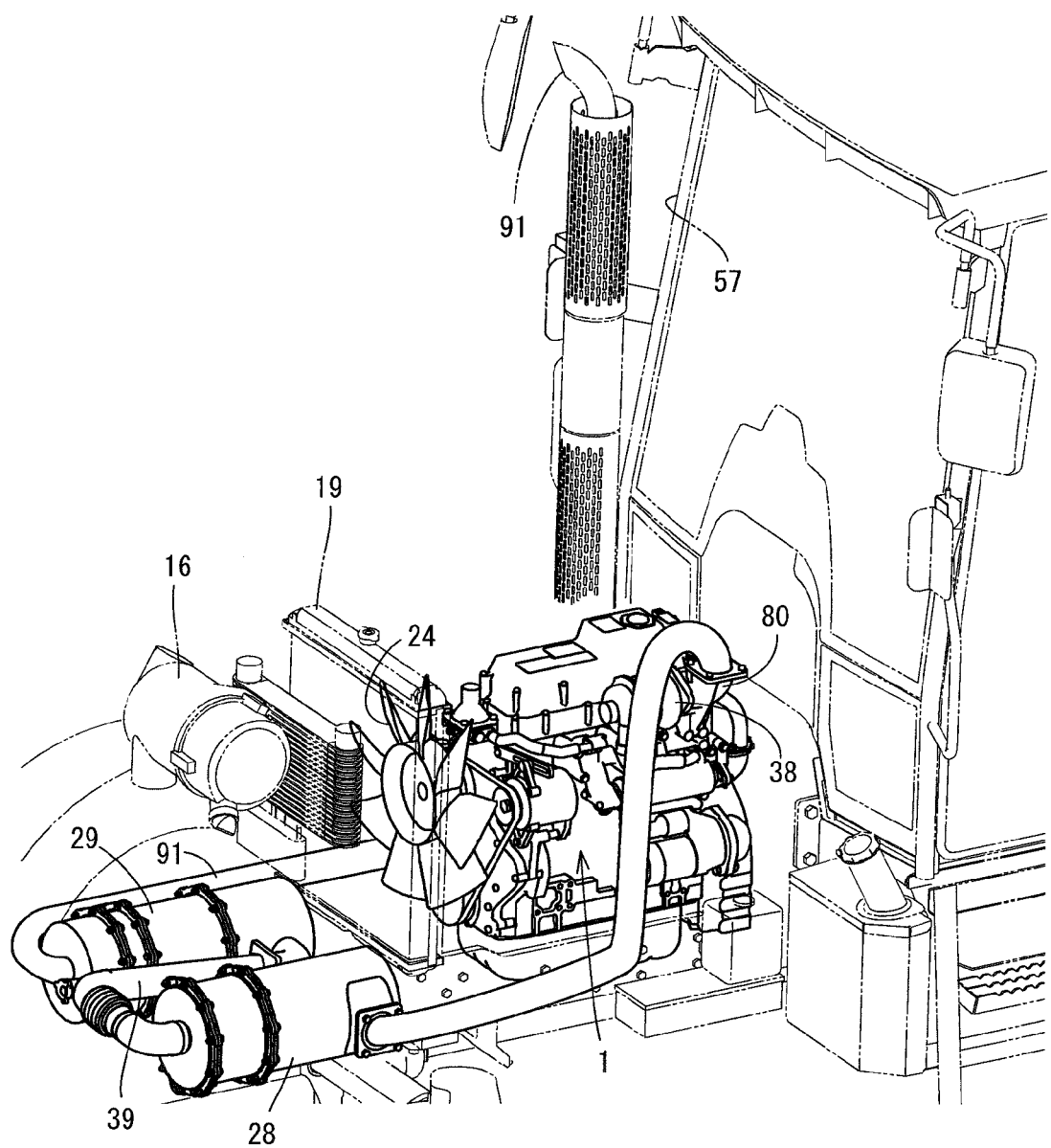
FIG. 39 is a perspective view of an engine portion of a tractor and shows a tenth embodiment.

Next, a description will be given of an arrangement structure of the first case 28 and the second case 29 according to a tenth embodiment with reference to FIG. 39. In the tenth embodiment shown in FIG. 39, the first case 28 and the second case 29 are arranged in the travel machine body 52 in which the air cleaner 16 is installed. The first case 28 and the second case 29 are supported to the travel machine body 52 which is in front of the radiator 19. The first case 28 and the second case 29 are constructed into the long cylindrical shapes which extend in the parallel direction to the output shaft (the crank shaft) 4 of the diesel engine 1 in a plan view. The urea mixing pipe 39 is arranged between the first case 28 and the second case 29 so as to be parallel thereto. The second case 29 can be attached to the travel machine body 52 so as to come close thereto, and it is possible to form the hood height which is necessary for installing the first case 28 and the second case 29 low.

Figure 40:
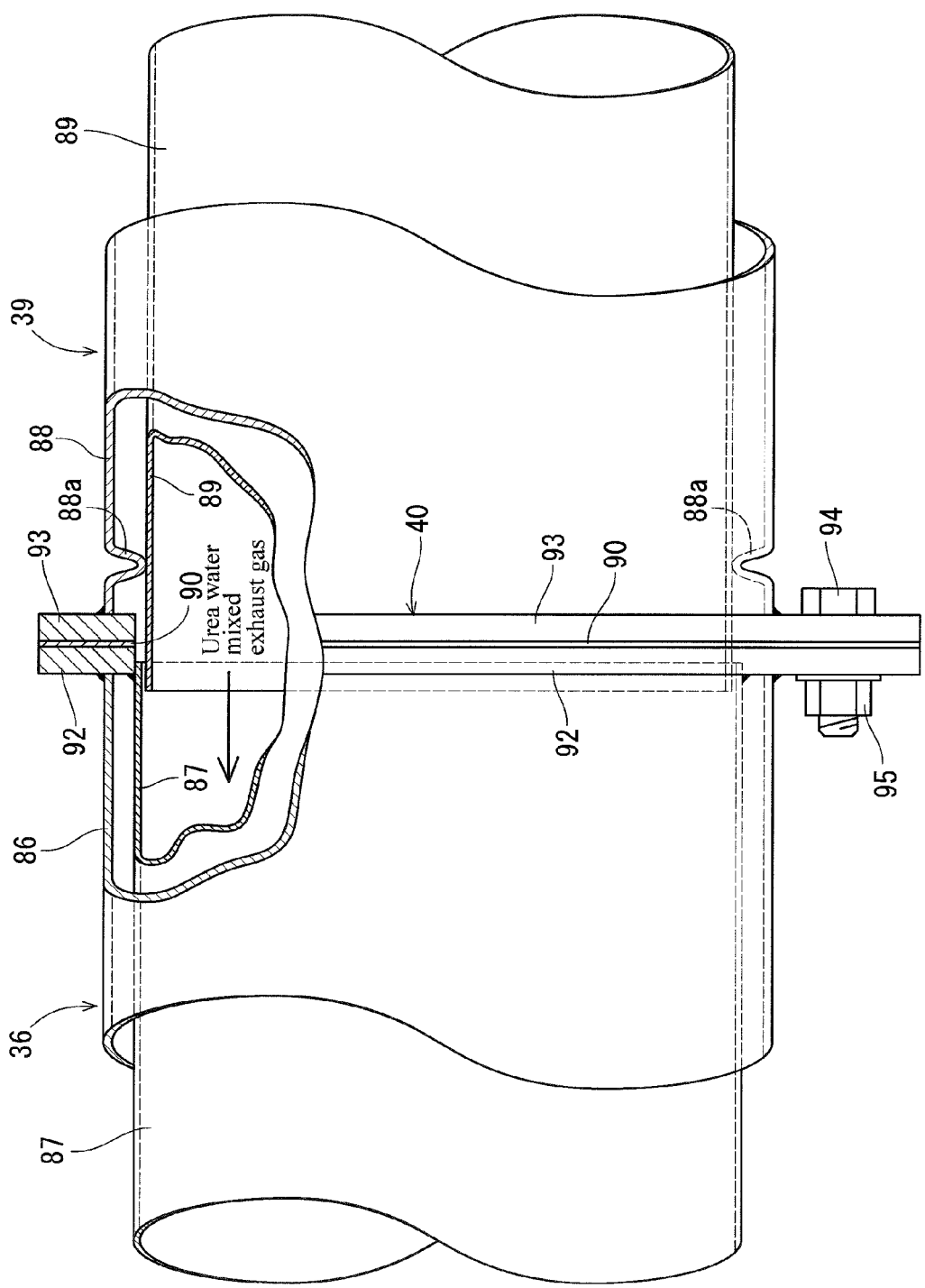
FIG. 40 is an enlarged view of a connection portion between an SCR inlet pipe and an urea mixing pipe showing an eleventh embodiment.

Next, a description will be given of a connecting structure between the SCR inlet pipe 36 serving as the exhaust gas inlet pipe and the urea mixing pipe 39 with reference to an eleventh embodiment shown in FIG. 40. As shown in FIG. 40, a convex ring-like projection-shaped support body 88a is integrally formed by protruding a part of the outer pipe 88 of the urea mixing pipe 39 to an inner peripheral side, in the exhaust gas outlet side end portion of the urea mixing pipe 39. An outer peripheral surface of the inner pipe 89 is connected to an inner peripheral surface of the convex ring-like projection-shaped support body 88a, and a gap between the outer pipe 88 and the inner pipe 89 of the urea mixing pipe 39 is formed at a fixed distance by the projection-shaped support body 88a. A pipe thickness of each of the inner pipes 87 and 89 is formed thinner than a pipe thickness of each of the outer pipes 86 and 88.

In the same manner as the embodiment in FIG. 35, the inner pipe 89 can inhibit the exhaust gas from coming into contact with the inner hole surface of the inlet side flange body 92 or the outlet side flange body 93 by shielding the inner hole surface of the inlet side flange body 92 or the outlet side flange body 93 by the exhaust gas outlet side end portion of the inner pipe 89 in the urea mixing pipe 39, and it is possible to prevent the crystalline lump of the urea component from being formed in the inner hole surface of the inlet side flange body 92 or the outlet side flange body 93.

Figure 41:
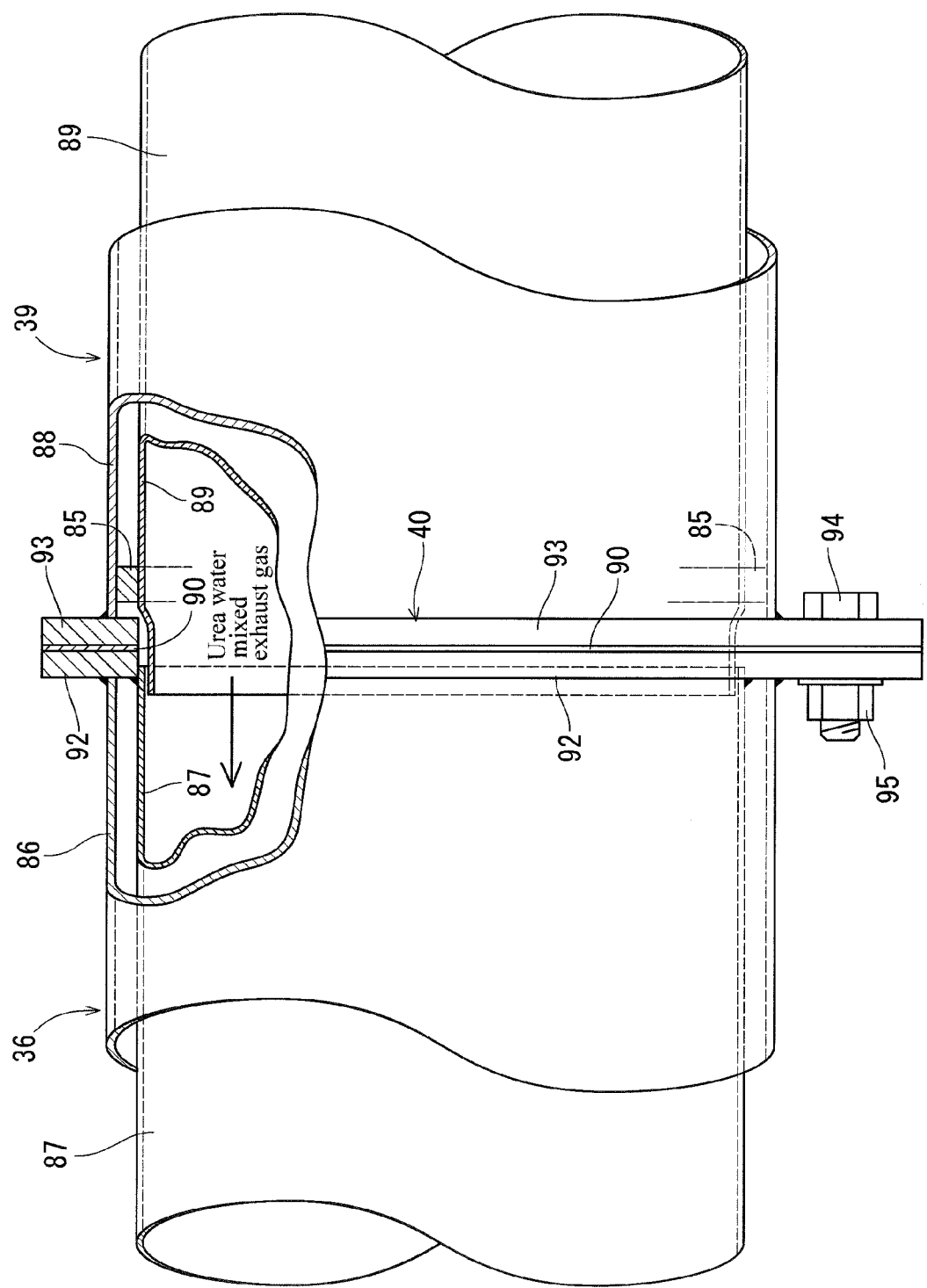
FIG. 41 is an enlarged view of a connection portion between an SCR inlet pipe and an urea mixing pipe showing a twelfth embodiment.

Next, a description will be given of a connecting structure between the SCR inlet pipe 36 serving as the exhaust gas inlet pipe and the urea mixing pipe 39 with reference to a twelfth embodiment shown in FIG. 41. As shown in FIG. 41, a heat insulating property support body 84 connecting an outer peripheral surface of the inner pipe 89 to an inner peripheral surface of the outer pipe 88 in the urea mixing pipe 39 is provided in the exhaust gas outlet side end portion of the urea mixing pipe 39. The heat insulating property support body 84 is formed by forming a glass wool filling material into a ring shape. A ring-like outer peripheral side of the heat insulating property support body 84 is pressure bonded to an inner peripheral surface of the outer pipe 88 of the urea mixing pipe 39, and a ring-like inner peripheral side of the heat insulating property support body 84 is pressure bonded to an outer peripheral surface of the inner pipe 89 of the urea mixing pipe 39. A gap between the outer pipe 88 and the inner pipe 89 in the urea mixing pipe 39 is formed into a fixed distance by the heat insulating property support body 84.

In the same manner as the embodiments in FIGS. 35 and 40, the inner pipe 89 can inhibit the exhaust gas from coming into contact with the inner hole surface of the inlet side flange body 92 or the outlet side flange body 93 by shielding the inner hole surface of the inlet side flange body 92 or the outlet side flange body 93 by the exhaust gas outlet side end portion of the inner pipe 89 in the urea mixing pipe 39, and it is possible to prevent the crystalline lump of the urea component from being formed in the inner hole surface of the inlet side flange body 92 or the outlet side flange body 93.

As shown in FIGS. 26, 35, 40 and 41, in the engine device having the urea mixing pipe 39 which injects the urea water into the exhaust gas of the diesel engine 1, and the second case 29 serving as the exhaust gas purification case which removes the nitrogen oxide in the exhaust gas of the diesel engine 1, and structured such that the SCR inlet pipe 36 serving as the exhaust gas inlet pipe of the second case 29 is connected to the outlet of the urea mixing pipe 39 via the flange bodies 92 and 93, the exhaust gas outlet side end portions of the outer pipe 88 and the inner pipe 89 of the urea mixing pipe 39 having the double-pipe structure are connected to the exhaust gas inlet side end portions of the outer pipe 86 and the inner pipe 87 of the SCR inlet pipe 36 having the double-pipe structure, the exhaust gas inlet side end portion of the inner pipe of the SCR inlet pipe 36 is fitted to the exhaust gas outlet side end portion of the inner pipe 89 of the urea mixing pipe 39, and the exhaust gas outlet side end portion of the inner pipe 89 of the urea mixing pipe 39 is supported to the outer pipe 88. As a result, in spite of the matter that it is possible to shield the inner hole surfaces of the flange bodies 92 and 93 by the exhaust gas outlet side end portion of the inner pipe 89 of the urea mixing pipe 39, it is possible to inhibit the exhaust gas from coming into contact with the inner hole surfaces of the flange bodies 92 and 93, and it is possible to prevent the crystalline lump of the urea component from being formed in the inner hole surfaces of the flange bodies 92 and 93, it is possible to simplify the connecting structure between the exhaust gas inlet pipe 36 and the urea mixing pipe 39 having the double-pipe structure which is excellent in the heat insulating property.

As shown in FIGS. 35, 40 and 41, the support bodies 84, 85 and 88*a* connecting the outer peripheral surface of the inner pipe 89 to the inner peripheral surface of the outer pipe 88 of the urea mixing pipe 39 is provided in the exhaust gas outlet side end portion of the urea mixing pipe 39. Therefore, it is possible to properly maintain the attaching distance between the outer pipe 88 and the inner pipe 89 of the urea mixing pipe 39 by the support bodies 84, 85 and 88*a*, and it is possible to easily form the shape of the exhaust gas outlet side end portion of the urea mixing pipe 39, for example, by forming the support bodies 84, 85 and 88*a* by the ring-like pieces or the glass wool filling materials. Further, in spite of the matter that the urea mixing pipe 39 can be constructed with a low cost, the rigidity of the urea mixing pipe 39 can be improved by the support bodies.

As shown in FIGS. 35, 40 and 41, the inlet side flange body 92 and the outlet side flange body 93 are structured such as to be fastened by forming an inner diameter of the inner pipe 87 of the SCR inlet pipe 36 larger than an outer diameter of the inner pipe 89 of the urea mixing pipe 39, firmly fixing the outer pipe 86 and the inner pipe 87 of the SCR inlet pipe 36 to the inlet side flange body 92 serving as the flange body, and firmly fixing the outer pipe 88 of the urea mixing pipe 39 to the outlet side flange body 93 serving as the flange body. Therefore, it is possible to easily unite the outer pipe 86 and the inner pipe 87 of the SCR inlet pipe 36 and the outer pipe 88 and the inner pipe 89 of the urea mixing pipe 39 by the inlet side flange body 92 and the outlet side flange body 93, it is possible to improve a connecting workability of the SCR inlet pipe 36 and the urea mixing pipe 39, and it is possible to easily secure the strength of the connection portion between the SCR inlet pipe 36 and the urea mixing pipe 39.

Next, a description will be given of a connecting structure between the SCR inlet pipe 36 and the urea mixing pipe 39 according to a thirteenth embodiment with reference to FIG. 42. In the thirteenth embodiment, an arrangement structure of the first case 28 and the second case 29 and a structure of the urea mixing pipe 39 portion are the same as the arrangement structure of the first case 28 and the second case 29 and the structure of the urea mixing pipe 39 portion according to the seventh embodiment.

Figure 42:
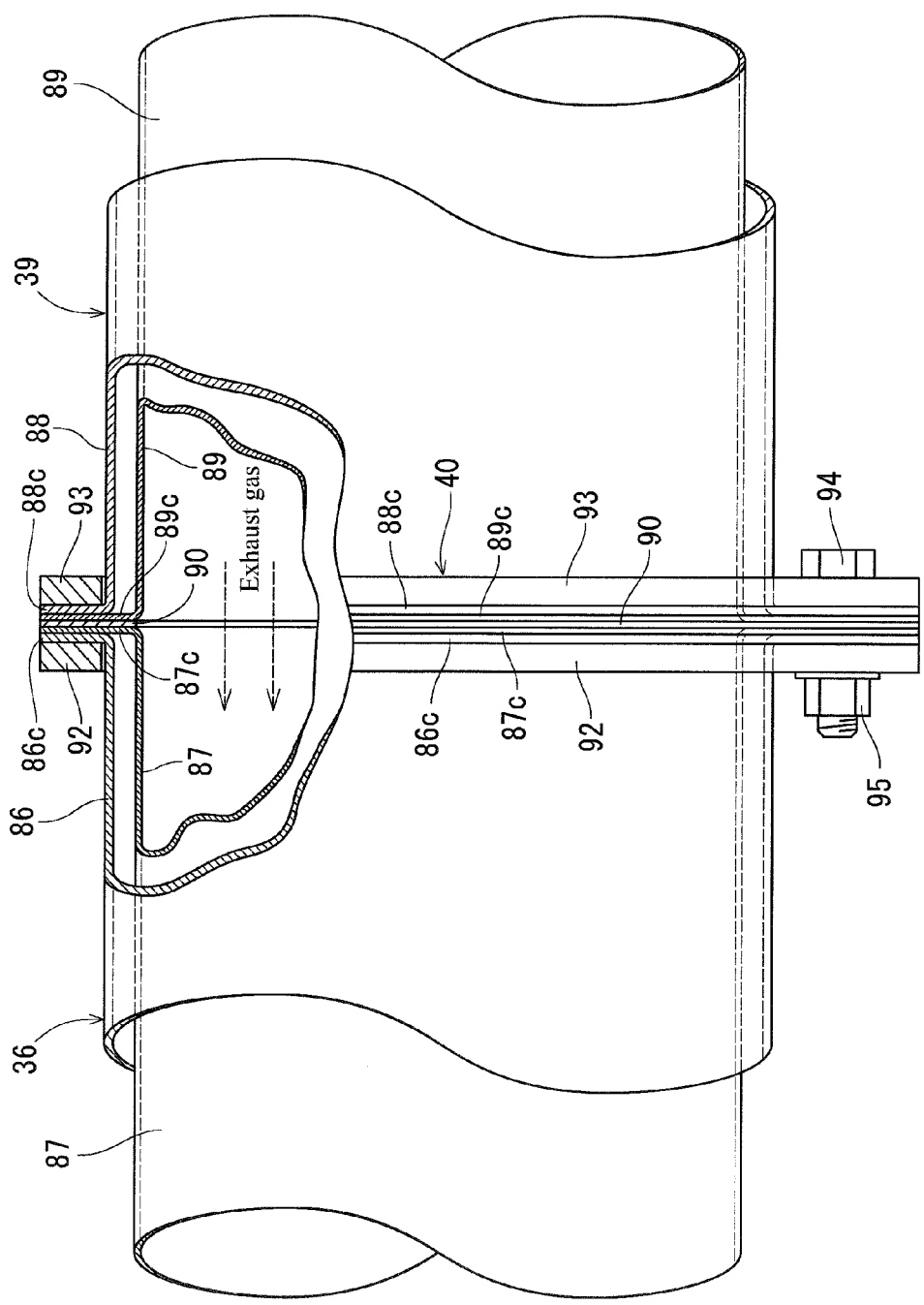
FIG. 42 is an enlarged view of a connection portion between an SCR inlet pipe and an urea mixing pipe showing a thirteenth embodiment.

As shown in FIG. 42, the pipe bracket 40 connecting the SCR inlet pipe 36 and the urea mixing pipe 39 has the inlet side flange body 92 which is arranged in the exhaust gas inlet side of the SCR inlet pipe 36, and the outlet side flange body 93 which is arranged in the exhaust gas outlet side of the urea mixing pipe 39. Ring-like pinching piece portions 86*c* and 87*c* are formed in the exhaust gas inlet side end portions of the outer pipe 86 and the inner pipe 87 by outward folding the exhaust gas inlet side end portions of the outer pipe 86 and the inner pipe 87 of the SCR inlet pipe 36 having the double-pipe structure, and ring-like pinching piece portions 88*c* and 89*c* are formed in the exhaust gas outlet side end portions of the outer pipe 88 and the inner pipe 89 by outward folding the exhaust gas outlet side end portions of the outer pipe 88 and the inner pipe 89 of the urea mixing pipe 39 having the double-pipe structure in the same manner.

The SCR inlet pipe 36 and the urea mixing pipe 39 are connected by pinching each of the pinching piece portions 86*c*, 87*c*, 88*c* and 89*c* and the gasket 90 by the inlet side flange body 92 and the outlet side flange body 93, fastening and fixing the inlet side flange body 92 and the outlet side flange body 93 by the bolts 94 and the nuts 95, and pinching and fixing each of the pinching piece portions 86*c*, 87*c*, 88*c* and 89*c* and the gasket 90 between the inlet side flange body 92 and the outlet side flange body 93. The outer pipe 86 of the SCR inlet pipe 36 and the outer pipe 88 of the urea mixing pipe 39 are formed by the pipes having the same diameter, and the inner pipe 87 of the SCR inlet pipe 36 and the inner pipe 89 of the urea mixing pipe 39 are formed by the pipes having the same diameter. The pipe thickness of each of the inner pipes 87 and 89 is formed thinner than the pipe thickness of each of the outer pipes 86 and 88.

In other words, the exhaust gas within the urea mixing pipe 39 moves to the SCR inlet pipe 36 without coming into contact with the inner hole surface of the inlet side flange body 92 or the outlet side flange body 93. For example, in the case that the exhaust gas comes into contact with the inner hole surface of the inlet side flange body 92 or the outlet side flange body 93 which tends to radiate heat, the temperature of the exhaust gas is lowered, the urea component in the exhaust gas is crystallized, and is attached to the inner hole surface of the inlet side flange body 92 or the outlet side flange body 93, the crystalline lump of the urea component is formed in the inner hole surface of the inlet side flange body 92 or the outlet side flange body 93, and a defect that the movement of the exhaust gas is obstructed tends to be generated. On the contrary, each of the pinching piece portions 87*c* and 89*c* can inhibit the exhaust gas from coming into contact with the inner hole surface of the inlet side flange body 92 or the outlet side flange body 93 by shielding the inner hole surface of the inlet side flange body 92 or the outlet side flange body 93 by each of the pinching piece portions 86*c*, 87*c*, 88*c* and 89*c*, as shown in FIG. 42. As a result, it is possible to prevent the crystalline lump of the urea component from being formed in the inlet side flange body 92 or the outlet side flange body 93.

As shown in FIG. 42, the ring-like pinching piece portions 86*c* and 87*c* are formed in the exhaust gas inlet side end portions of the outer pipe 86 and the inner pipe 87 by outward folding the exhaust gas inlet side end portions of the outer pipe 86 and the inner pipe 87 of the SCR inlet pipe 36, and the ring-like pinching piece portions 88*c* and 89*c* are formed in the exhaust gas outlet side end portions of the outer pipe 88 and the inner pipe 89 by outward folding the exhaust gas outlet side end portions of the outer pipe 88 and the inner pipe 89 of the urea mixing pipe 39. Therefore, it is possible to pinch and fix the outer pipe 86 and the inner pipe 87 of the SCR inlet pipe 36, and the outer pipe 88 and the inner pipe 89 of the urea mixing pipe 39 by the inlet side flange body 92 and the outlet side flange body 93 via the pinching piece portions 86*c*, 87*c*, 88*c* and 89*c*, and it is possible to easily connect the SCR inlet pipe 36 and the urea mixing pipe 39 which has the double-pipe structure and has the improved heat insulating property (the warmth retaining property), for example, by the connecting structure in which a welding man hour is reduced.

Figure 43:
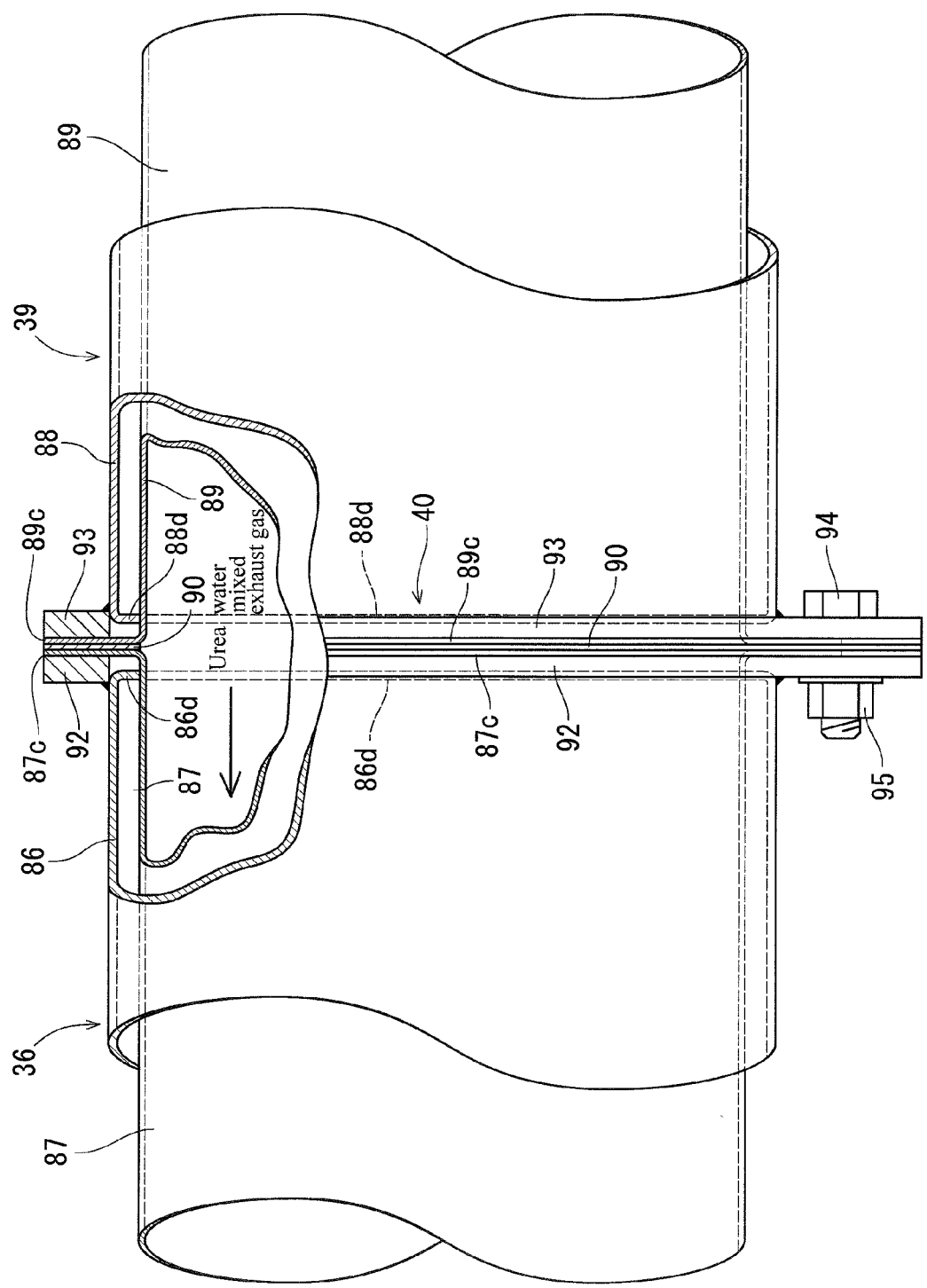
FIG. 43 is an enlarged view of a connection portion between an SCR inlet pipe and an urea mixing pipe showing a fourteenth embodiment.

Next, a description will be given of a connecting structure between the SCR inlet pipe 36 serving as the exhaust gas inlet pipe and the urea mixing pipe 39 with reference to a fourteenth embodiment shown in FIG. 43. As shown in FIG. 43, the pipe bracket 40 connecting the SCR inlet pipe 36 and the urea mixing pipe 39 has the inlet side flange body 92 which is arranged in the exhaust gas inlet side of the SCR inlet pipe 36, and the outlet side flange body 93 which is arranged in the exhaust gas outlet side of the urea mixing pipe 39. The ring-like pinching piece portion 87c is formed in the exhaust gas inlet side end portion of the inner pipe 87 by outward folding the exhaust gas inlet side end portion of the inner pipe 87 of the SCR inlet pipe 36 having the double-pipe structure, and the ring-like pinching piece portion 89c is formed in the exhaust gas outlet side end portion of the inner pipe 89 by outward folding the exhaust gas outlet side end portion of the inner pipe 89 of the urea mixing pipe 39 having the double-pipe structure in the same manner.

In addition, a ring-like contact piece portion 86d is formed in the exhaust gas inlet side end portion of the outer pipe 86 by inward folding the exhaust gas inlet side end portion of the outer pipe 86 of the SCR inlet pipe 36 having the double-pipe structure, and a ring-like contact piece portion 88d is formed in the exhaust gas outlet side end portion of the outer pipe 88 by inward folding the exhaust gas outlet side end portion of the outer pipe 88 of the urea mixing pipe 39 having the double-pipe structure in the same manner. The outlet side flange body 93 is fixed by welding to the outer pipe 88 of the urea mixing pipe 39 by bringing end surfaces of the contact piece portions 86d and 88d of the outer pipes 86 and 88 into contact with the outer peripheral surfaces of the inner pipes 87 and 89, and fixing by welding the inlet side flange body 92 to the outer pipe 86 of the SCR inlet pipe 36.

Further, the SCR inlet pipe 36 and the urea mixing pipe 39 are connected by pinching the pinching piece portions 87c and 89c and the gasket 90 by the inlet side flange body 92 and the outlet side flange body 93, fastening and fixing the inlet side flange body 92 and the outlet side flange body 93 by the bolts 94 and the nuts 95, and pinching and fixing the pinching piece portions 87c and 89c and the gasket 90 between the inlet side flange body 92 and the outlet side flange body 93. The outer pipe 86 of the SCR inlet pipe 36 and the outer pipe 88 of the urea mixing pipe 39 are formed by the pipes having the same diameter, and the inner pipe 87 of the SCR inlet pipe 36 and the inner pipe 89 of the urea mixing pipe 39 are formed by the pipes having the same diameter. The pipe thickness of each of the inner pipes 87 and 89 is formed thinner than the pipe thickness of each of the outer pipes 86 and 88.

In other words, the exhaust gas within the urea mixing pipe 39 moves to the SCR inlet pipe 36 without coming into contact with the inner hole surface of the inlet side flange body 92 or the outlet side flange body 93. For example, in the case that the exhaust gas comes into contact with the inner hole surface of the inlet side flange body 92 or the outlet side flange body 93 which tend to radiate heat, the temperature of the exhaust gas is lowered, the urea component in the exhaust gas is crystallized, and is attached to the inner hole surface of the inlet side flange body 92 or the outlet side flange body 93, the crystalline lump of the urea component is formed in the inner hole surface of the inlet side flange body 92 or the outlet side flange body 93, and the defect that the movement of the exhaust gas is obstructed tends to be generated. On the contrary, each of the pinching piece portions 87c and 89c can inhibit the exhaust gas from coming into contact with the inner hole surface of the inlet side flange body 92 or the outlet side flange body 93 by shielding the inner hole surface of the inlet side flange body 92 or the outlet side flange body 93 by the pinching piece portions 87c and 89c as shown in FIG. 43. As a result, it is possible to prevent the crystalline lump of the urea component from being formed in the inner hole surface of the inlet side flange body 92 or the outlet side flange body 93.

As shown in FIGS. 42 and 43, in the engine device having the urea mixing pipe 39 which injects the urea water into the exhaust gas of the engine 1, and the second case 29 serving as the exhaust gas purification case which removes the nitrogen oxide in the exhaust gas of the engine 1, and structured such that the SCR inlet pipe 36 serving as the exhaust gas inlet pipe of the second case 29 is connected to the outlet of the urea mixing pipe 39 via the inlet side flange body 92 and the outlet side flange body 93 (the pipe bracket 40) serving as the flange body, the exhaust gas outlet side end portions of the outer pipe 88 and the inner pipe 89 in the urea mixing pipe 39 having the double-pipe structure are connected to the exhaust gas inlet side end portions of the outer pipe 86 and the inner pipe 87 in the SCR inlet pipe 36 having the double-pipe structure, the ring-like pinching piece portion 87c is formed in the exhaust gas inlet side end portion of the inner pipe 87 by outward folding the exhaust gas inlet side end portion of the inner pipe 87 of the SCR inlet pipe 36, and the ring-like pinching piece portion 89c is formed in the exhaust gas outlet side end portion of the inner pipe 89 by outward folding the exhaust gas outlet side end portion of the inner pipe 89 of the urea mixing pipe 39. Therefore, the inlet side flange body 92 and the outlet side flange body 93 can be arranged in the outer peripheral side of the inner pipe 89 of the urea mixing pipe 39 (the inner pipe 87 of the SCR inlet pipe 36), each of the pinching piece portions 87c and 89c can inhibit the exhaust gas from coming into contact with the inner hole surface of the inlet side flange body 92 and the outlet side flange body 93 by shielding the inner hole surfaces of the inlet side flange body 92 and the outlet side flange body 93 by each of the pinching piece portions 87c and 89c, and it is possible to prevent the crystalline lump of the urea component from being formed in the inner hole surfaces of the inlet side flange body 92 and the outlet side flange body 93.

As shown in FIG. 43, the contact piece portion 86d or the contact piece portion 88d is formed by inward folding the exhaust gas inlet side end portion of the outer pipe 86 in the SCR inlet pipe 36 or the exhaust gas outlet side end portion of the outer pipe 88 in the urea mixing pipe 39, and the end portion of the contact piece portion 86d or the end portion of the contact piece portion 88d is brought into contact with the outer peripheral surface of each of the inner pipes 87 and 89. Therefore, in spite of the matter that the inner pipes 87 and 89 can be respectively positioned and connected by the end portions of the contact piece portions 86d and 88d of the outer pipes 86 and 88, it is possible to easily maintain the distance between the outer pipes 86 and 88 and the inner pipes 87 and 89 at a predetermined distance, and it is possible to improve the connecting work of the SCR inlet pipe 36 and the urea mixing pipe 39, it is possible to easily improve the strength of the connection portion between the SCR inlet pipe 36 and the urea mixing pipe 39.

Next, a description will be given of a structure of the urea mixing pipe 39 portion according to a fifteenth embodiment with reference to FIGS. 44 and 45. In the fifteenth embodiment, an arrangement structure of the first case 28 and the second case 29 and a connecting structure of the SCR inlet pipe 36 and the urea mixing pipe 39 are the same as the arrangement structure of the first case 28 and the second case 29 and the connecting structure of the SCR inlet pipe 36 and the urea mixing pipe 39 according to the fifteenth embodiment.

Figure 44:
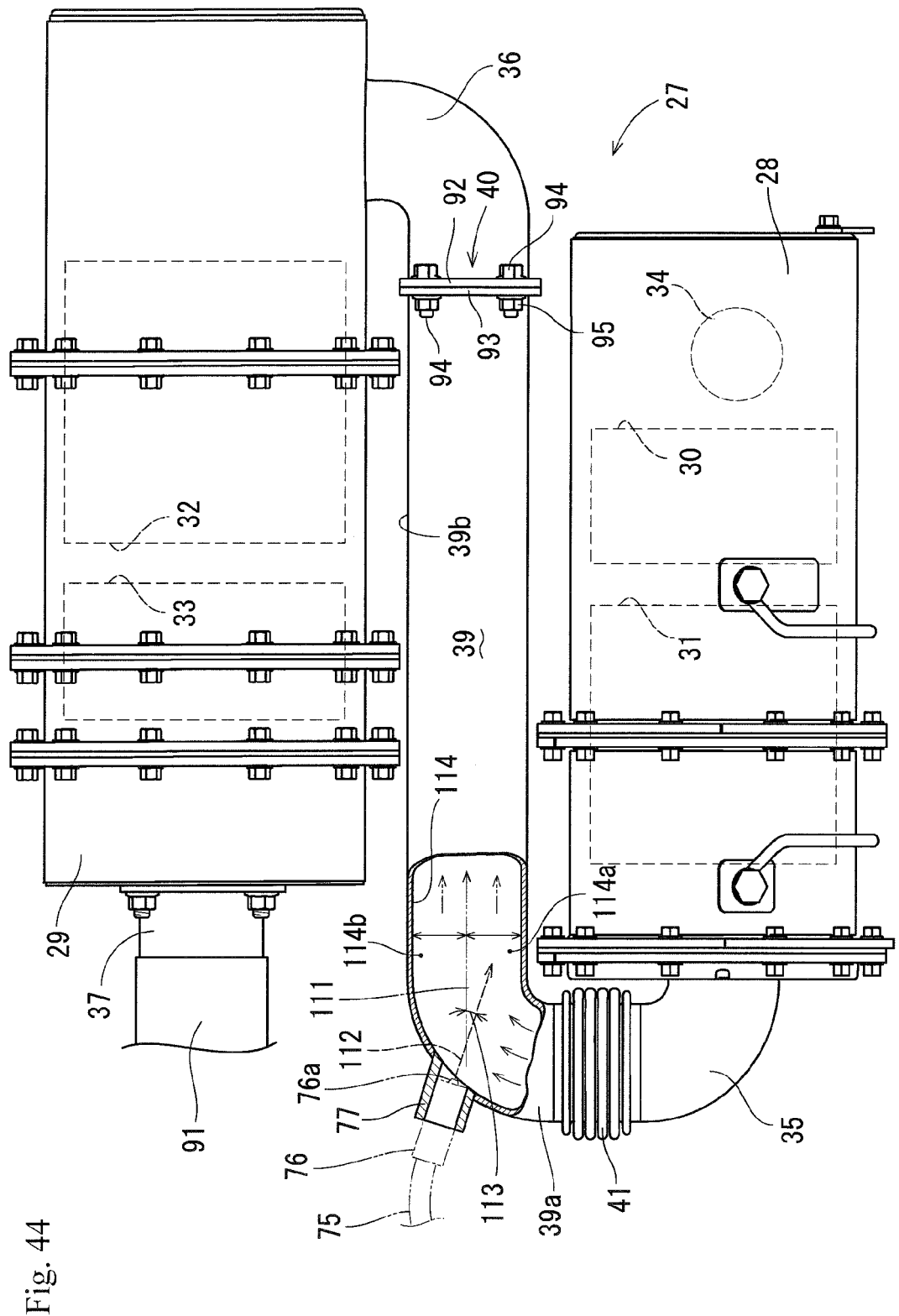
FIG. 44 is an explanatory view of a connection portion between a DPF outlet pipe and an urea mixing pipe showing a fifteenth embodiment.
Figure 45:
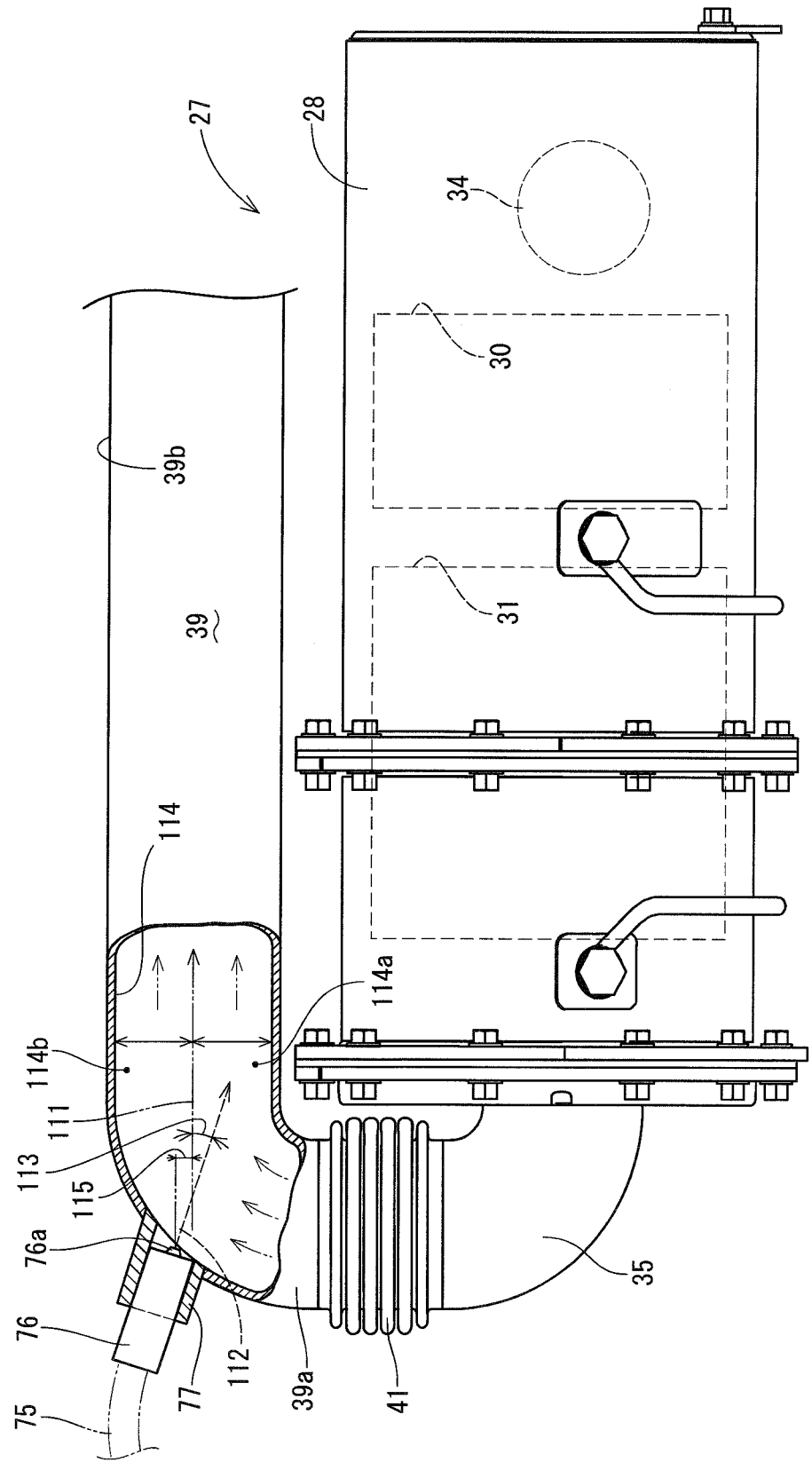
FIG. 45 is an enlarged view of FIG. 44.

As shown in FIGS. 44 and 45, the urea mixing pipe 39 has the elbow pipe portion 39a which is connected to the bellows-like connection pipe 41, and the long cylindrical straight pipe portion 39b which is connected to the SCR inlet pipe 36 via the pipe bracket 40. The injection pedestal 77 is fixed by welding to the elbow pipe portion 39a near the joint between the elbow pipe portion 39a and the straight pipe portion 39b, and the urea water injection nozzle 76 is open toward the inner hole of the straight pipe portion 39b from the elbow pipe portion 39a side.

Further, as shown in FIGS. 44 and 45, the urea water injecting direction 112 of the urea water injection nozzle 76 is inclined at a predetermined angle of inclination 113 (about 2 to 20 degrees, for example, about 12 degrees, about 8 degrees or about 4 degrees) to the exhaust gas downstream side of the elbow pipe portion 39a in relation to the cylindrical axis line 111 of the cylindrical straight pipe portion 39b (the exhaust gas flowing direction within the straight pipe portion 39b), and the urea water is injected from the urea water injection nozzle 76 toward an inner side of the curve of the elbow pipe portion 39a in relation to the center axis (the cylindrical axis line 111) of the straight pipe portion 39b. In addition, an injection port 76a of the urea water injection nozzle 76 is arranged at a position which is a fixed displacement dimension 115 deviated to an outer side of the curve from the cylindrical axis line 111 (the center axis) of the straight pipe portion 39b, the urea water injection nozzle 76 is arranged in an outer side of the curve of the elbow pipe portion 39a, and the injection port 76a of the urea water injection nozzle 76 is formed so that the urea water can be injected toward an inner wall surface 114a in the straight pipe portion 39b side in the inner wall surface 114a near a boundary between the inner side of the curve of the elbow pipe portion 39a and a start end of the straight pipe portion 39b.

In other words, the urea water is injected from the injection port 76a of the urea water injection nozzle 76 toward the inner wall surface 114a side in the inner diameter side of the curve of the elbow pipe portion 39a in the inner wall surface 114 of the straight pipe portion 39b. The urea water injected from the injection port 76a of the urea water injection nozzle 76 is diffused by the cylindrical axis line 111 toward the inner wall surface 114b in the outer diameter side of the curve of the elbow pipe portion 39a in the inner wall surface 114 of the straight pipe portion 39b, on the basis of the discharge pressure of the exhaust gas moving from the elbow pipe portion 39a to the straight pipe portion 39b, and is mixed as the ammonia into the exhaust gas which is supplied to the second case 29, on the basis of hydrolysis of the urea water.

The angle of inclination 113 (the urea water injecting direction 112) of the urea water injection nozzle 76 in relation to the cylindrical axis line 111 of the straight pipe portion 39b is decided on the basis of the inner diameters of the elbow pipe portion 39a and the straight pipe portion 39b or the flow rate of the exhaust gas under the standard operation (the operation in the rated rotation of the diesel engine 1). For example, when the angle of inclination 113 is too large, the urea water is attached to the inner wall surface 114a in the inner diameter side of the curve of the elbow pipe portion 39a and there is the defect that the urea tends to be crystallized in the inner wall surface 114a portion in the inner diameter side of the curve. Further, when the angle of inclination 113 is too small, the urea water is attached to the inner wall surface 114b in the outer diameter side of the curve of the elbow pipe portion 39a, and there is the defect that the urea tends to be crystallized in the inner wall surface 114b portion in the outer diameter side of the curve.

Figure 46:
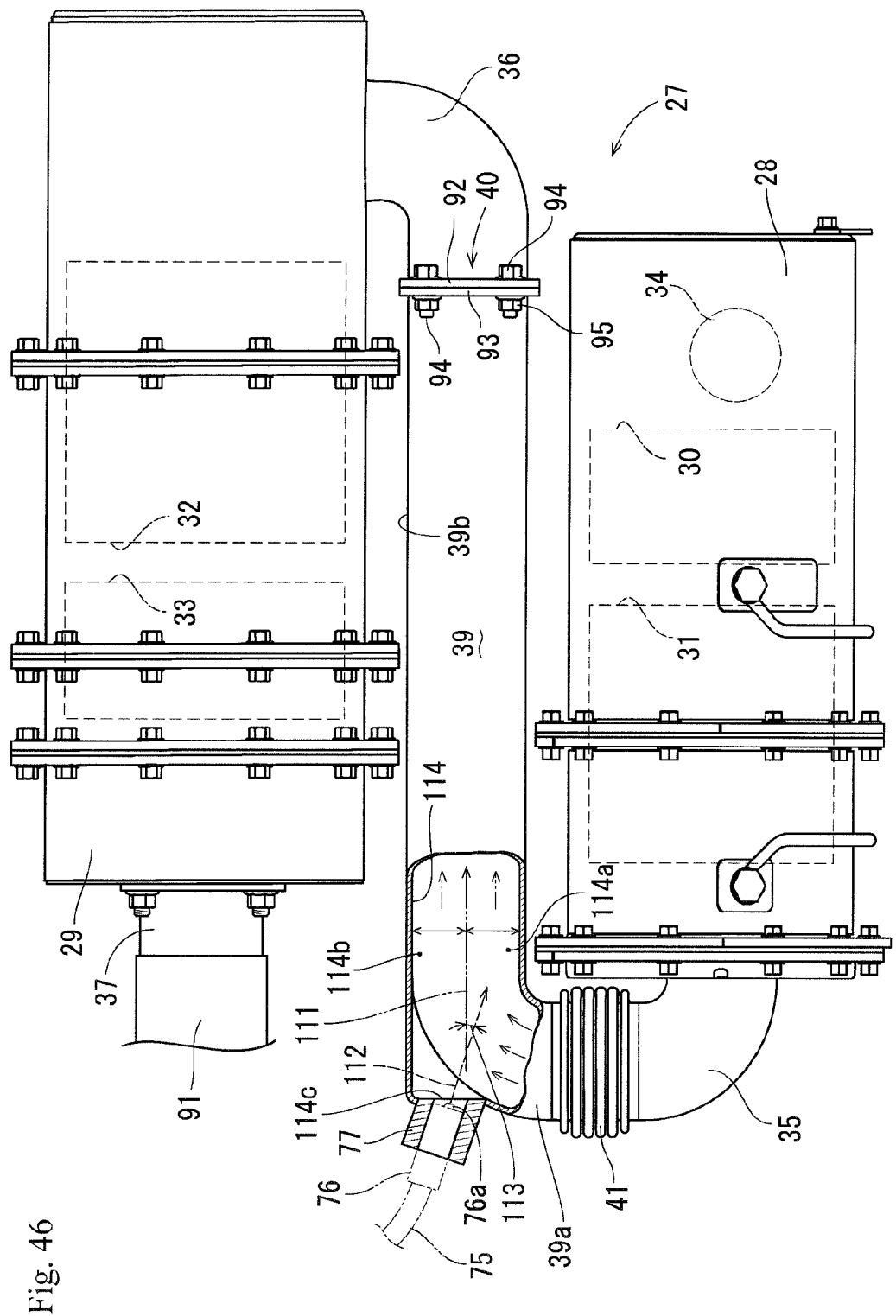
FIG. 46 is an explanatory view of a connection portion between a DPF outlet pipe and an urea mixing pipe showing a sixteenth embodiment.
Figure 47:
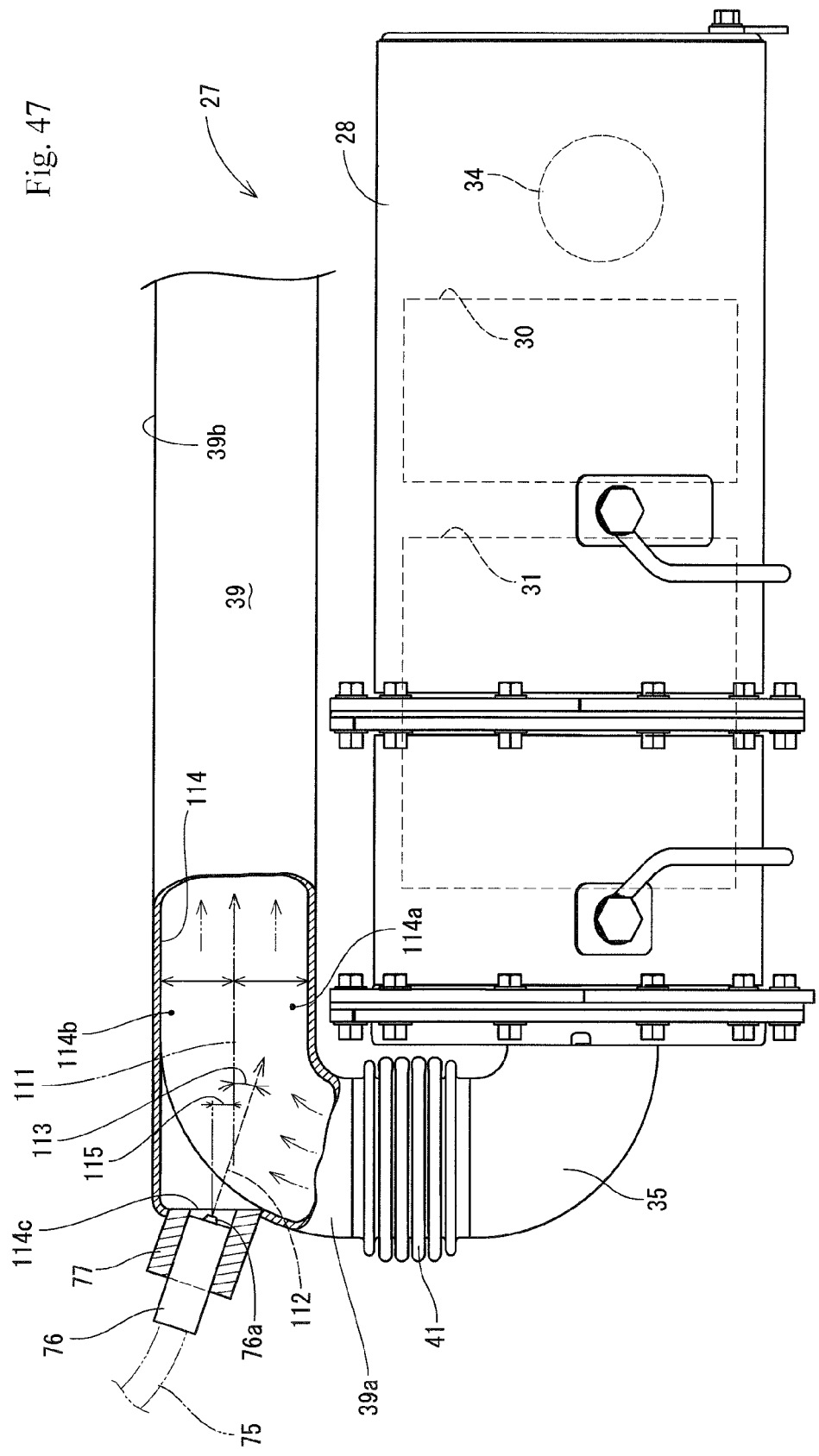
FIG. 47 is an enlarged view of FIG. 46.

Next, a description will be given of a structure of the urea mixing pipe 39 portion showing a sixteenth embodiment with reference to FIGS. 46 and 47. In the fifteenth embodiment shown in FIG. 45, the injection port 76a of the urea water injection nozzle 76 is arranged in the inner peripheral surface in the outer diameter side of the curve of the elbow pipe portion 39a. Meanwhile, the sixteenth embodiment is structured, as shown in FIGS. 46 and 47, such as to reduce the pressure of the exhaust gas near the injection port 76a by forming a retreating surface 114c in an outer diameter side of the curve at a position of an inner peripheral surface closer to an outer side of the curve (an inner peripheral surface in the outer diameter side of the curve) than the cylindrical axis line 111 (the center axis) of the straight pipe portion 39b, in the inner peripheral surface in the outer side of the curve (the outer diameter side of the curve) of the elbow pipe portion 39a, and arranging the injection port 76a of the urea water injection nozzle 76 in the retreating surface 114c. The urea water injection nozzle 76 is attached by firmly fixing the injection pedestal 77 to the retreating surface 114c, and the injection port 76a of the urea water injection nozzle 76 is open toward the inner wall surface 114a in the straight pipe portion 39b side in the inner wall surface 114a near the boundary between the inner side of the curve of the elbow pipe portion 39a and the start end side of the straight pipe portion 39b. In other words, the injection port 76a of the urea water injection nozzle 76 is supported to the retreating surface 114c in the outer diameter side of the curve formed in the elbow pipe portion 39a, thereby reducing direct action of the exhaust gas flowing pressure moving within the elbow pipe portion 39a onto the injection port 76a.

As shown in FIGS. 44 to 47, in the engine device having the urea mixing pipe 39 which injects the urea water into the exhaust gas of the diesel engine 1, and the second case 29 serving as the exhaust gas purification case which removes the nitrogen oxide in the exhaust gas of the diesel engine 1, and structured such that the urea mixing pipe 39 has the elbow pipe portion 39a which introduces the exhaust gas from the diesel engine 1, and the straight pipe portion 39b which derives the exhaust gas to the second case 29, the engine device is provided with the urea water injection nozzle 76 which injects the urea water toward the inner side of the curve of the elbow pipe portion 39a in relation to the cylindrical axis line 111 (the center axis) of the straight pipe portion 39b, and the injection port 76a of the urea water injection nozzle 76 is arranged at the position which is deviated to the outer side of the curve from the cylindrical axis line 111 of the straight pipe portion 39b. Therefore, it is possible to easily bring an urea water flying direction from the injection port 76a of the urea water injection nozzle 76 into line with the cylindrical axis line 111 of the straight pipe portion 39b, and it is possible to reduce an amount of the urea water attached to the inner peripheral surface of the elbow pipe portion 39a or the straight pipe portion 39b. For example, since the injection port 76a of the urea water injection nozzle 76 is open to the position where the fixed displacement dimension 115 is deviated to the outer side of the curve from the cylindrical axis line 111 of the straight pipe portion 39b, it is possible to reduce the amount of the urea water injected to the inner side of the curve of the elbow pipe portion 39a even when the flow rate of the exhaust gas is lowered together with the reduction of the rotation of the engine 1, and it is possible to suppress the attachment of the urea water to the inner peripheral surface of the elbow pipe portion 39a or the straight pipe portion 39b.

As shown in FIGS. 44 to 47, the urea water injection nozzle 76 is arranged in the outer side of the curve of the elbow pipe portion 39a, and the injection port 76a of the urea water injection nozzle 76 is formed so that the urea water can be injected toward the boundary between the inner side of the curve of the elbow pipe portion 39*a* and the start end side of the straight pipe portion 39*b*. Therefore, even if the flow rate or the flow amount of the exhaust gas changes, it is possible to maintain the urea water injection position approximately at the fixed position of the center axis (the cylindrical axis line 111) of the straight pipe portion 39*b*, and it is possible to easily inhibit the urea crystalline lump from being formed.

As shown in FIGS. 46 and 47, the retreating surface 114*c* in the outer diameter side of the curve is formed at the position of the inner peripheral surface closer to the outer side of the curve than the center axis (the cylindrical axis line 111) of the straight pipe portion 39*b* in the inner peripheral surface of the outer side of the curve of the elbow pipe portion 39*a*, and the injection port 76*a* of the urea water injection nozzle 76 is supported to the retreating surface 114*c*. Therefore, in spite of the matter that the straight pipe portion 39*b* can be formed compactly by making a bending radius of the elbow pipe portion 39*a* small, it is possible to reduce the amount of the urea water attached to the support portion of the urea water injection nozzle 76 (near the injection port 76*a*), and it is possible to easily prevent the formation of the urea crystalline lump in the support portion of the urea water injection nozzle 76.

REFERENCE SIGNS LIST

1 Diesel engine
29 Second case (exhaust gas purification case)
36 SCR inlet pipe (exhaust gas inlet pipe)
39 Urea mixing pipe
39*a* Elbow pipe portion
39*b* Straight pipe portion
40 Pipe bracket (flange body)
76 Urea water injection nozzle
76*a* Injection port
84 Thin plate support body
85 Heat insulating support body
86 Outer pipe of SCR inlet pipe
87 Inner pipe of SCR inlet pipe
88 Outer pipe of urea mixing pipe
88*a* Convex ring-like projection-shaped support body
89 Inner pipe of urea mixing pipe
89*a* Fitting small-diameter portion of inner pipe
90 Fitting small-diameter pipe
92 Inlet side flange (flange body)
93 Outlet side flange (flange body)
111 Cylindrical axis line of straight pipe portion (center axis)
114*c* Retreating surface in outer diameter side of curve

The invention claimed is:

1. An engine device comprising:
a urea injection nozzle which injects urea water into exhaust gas of an engine;
a urea mixing pipe configured to mix the urea water from the urea injection nozzle into exhaust gas of the engine;
an exhaust gas purification case which removes nitrogen oxide in the exhaust gas of the engine; and
the engine device being structured such that an exhaust gas inlet pipe of the exhaust gas purification case is connected to an outlet of the urea mixing pipe via a flange body,
wherein exhaust gas outlet side end portions of an outer pipe and an inner pipe of the urea mixing pipe having a double-pipe structure are connected to exhaust gas inlet side end portions of an outer pipe and an inner pipe of the exhaust gas inlet pipe having a double-pipe structure, a fitting small-diameter portion is formed in an end portion of the inner pipe of the urea mixing pipe, and the fitting small-diameter portion is inward insert to an inner portion of the inner pipe of the exhaust gas inlet pipe.

2. The engine device according to claim 1, wherein the outer pipe of the exhaust gas inlet pipe and the outer pipe of the urea mixing pipe are formed by a pipe having the same diameter, and the inner pipe of the exhaust gas inlet pipe and the inner pipe of the urea mixing pipe are formed by a pipe having the same diameter.

3. The engine device according to claim 1, wherein a pipe thickness of the inner pipe of the urea mixing pipe is formed thinner than a pipe thickness of the outer pipe of the urea mixing pipe.

4. An engine device comprising:
a urea injection nozzle which injects urea water into exhaust gas of an engine;
a urea mixing pipe configured to mix the urea water from the urea injection nozzle into exhaust gas of the engine;
an exhaust gas purification case which removes nitrogen oxide in the exhaust gas of the engine; and
the engine device being structured such that an exhaust gas inlet pipe of the exhaust gas purification case is connected to an outlet of the urea mixing pipe via a flange body,
wherein exhaust gas outlet side end portions of an outer pipe and an inner pipe of the urea mixing pipe having a double-pipe structure are connected to exhaust gas inlet side end portions of an outer pipe and an inner pipe of the exhaust gas inlet pipe having a double-pipe structure, an exhaust gas inlet side end portion of the inner pipe of the exhaust gas inlet pipe is fitted to an exhaust gas outlet side end portion of the inner pipe of the urea mixing pipe, and an exhaust gas outlet side end portion of the inner pipe of the urea mixing pipe is supported to the outer pipe of the urea mixing pipe.

5. The engine device according to claim 4, wherein the exhaust gas outlet side end portion of the urea mixing pipe is provided with a support body which connects an outer peripheral surface of the inner pipe to an inner peripheral surface of the outer pipe of the urea mixing pipe.

6. The engine device according to claim 4, wherein an inner diameter of the inner pipe of the exhaust gas inlet pipe is formed larger than an outer diameter of the inner pipe of the urea mixing pipe, the outer pipe and the inner pipe of the exhaust gas inlet pipe are firmly fixed to an inlet side flange body serving as the flange body, the outer pipe of the urea mixing pipe is firmly fixed to an outlet side flange body serving as the flange body, and the inlet side flange body and the outlet side flange body are fastened.

7. An engine device comprising:
a urea injection nozzle which injects urea water into exhaust gas of an engine;
a urea mixing pipe configured to mix the urea water from the urea injection nozzle into exhaust gas of the engine;
an exhaust gas purification case which removes nitrogen oxide in the exhaust gas of the engine; and
the engine device being structured such that an exhaust gas inlet pipe of the exhaust gas purification case is connected to an outlet of the urea mixing pipe via a flange body,
wherein exhaust gas outlet side end portions of an outer pipe and an inner pipe of the urea mixing pipe having a double-pipe structure are connected to exhaust gas inlet side end portions of an outer pipe and an inner pipe of the exhaust gas inlet pipe having a double-pipe structure, a ring-like pinching piece portion is formed in the exhaust gas inlet side end portion of the inner pipe of the exhaust gas inlet pipe by folding the exhaust gas inlet side end portion of the inner pipe of the exhaust gas inlet pipe toward an outer side, and a ring-like pinching piece portion is formed in the exhaust gas outlet side end portion of the inner pipe of the urea mixing pipe by folding the exhaust gas outlet side end portion of the inner pipe of the urea mixing pipe toward an outer side.

8. The engine device according to claim 7, wherein ring-like pinching piece portions are formed in the exhaust gas inlet side end portions of the outer pipe and the inner pipe of the exhaust gas inlet pipe by folding the exhaust gas inlet side end portions of the outer pipe and the inner pipe of the exhaust gas inlet pipe toward outer sides, and ring-like pinching piece portions are formed in the exhaust gas outlet side end portions of the outer pipe and the inner pipe of the urea mixing pipe by folding the exhaust gas outlet side end portions of the outer pipe and the inner pipe of the urea mixing pipe.

9. The engine device according to claim 7, wherein the exhaust gas inlet side end portion of the outer pipe of the exhaust gas inlet pipe or the exhaust gas outlet side end portion of the outer pipe of the urea mixing pipe is brought into contact with an outer peripheral surface of the inner pipe by being folded toward an inner side.

\* \* \* \* \*